(12) United States Patent
Lemons

(10) Patent No.: US 7,538,265 B2
(45) Date of Patent: May 26, 2009

(54) APPARATUS AND METHOD FOR VISUALIZING MUSIC AND OTHER SOUNDS

(75) Inventor: Kenneth R. Lemons, Indianapolis, IN (US)

(73) Assignee: Master Key, LLC, Indianapolis, IN (US)

( * ) Notice: Subject to any disclaimer, the term of this patent is extended or adjusted under 35 U.S.C. 154(b) by 0 days.

(21) Appl. No.: 11/827,264

(22) Filed: Jul. 11, 2007

(65) Prior Publication Data
US 2008/0022842 A1 Jan. 31, 2008

Related U.S. Application Data

(60) Provisional application No. 60/830,386, filed on Jul. 12, 2006.

(51) Int. Cl.
G09B 15/02 (2006.01)
A63J 17/00 (2006.01)
A63J 5/10 (2006.01)
G10H 1/00 (2006.01)

(52) U.S. Cl. .................. 84/483.2; 84/464 R
(58) Field of Classification Search ............ 84/464 R, 84/470 R, 471 R, 472, 483.2
See application file for complete search history.

(56) References Cited

U.S. PATENT DOCUMENTS

| | | | |
|---|---|---|---|
| 4,526,168 A | 7/1985 | Hassler et al. | |
| 4,887,507 A | 12/1989 | Shaw | |
| 4,907,573 A | 3/1990 | Nagasaki | |
| 5,207,214 A | 5/1993 | Romano | |
| 5,370,539 A * | 12/1994 | Dillard | 434/405 |
| 5,415,071 A * | 5/1995 | Davies | 84/471 SR |
| 5,741,990 A * | 4/1998 | Davies | 84/423 R |
| 6,031,172 A * | 2/2000 | Papadopoulos | 84/470 R |
| 6,111,755 A | 8/2000 | Park | |
| 6,137,041 A | 10/2000 | Nakono | |

(Continued)

FOREIGN PATENT DOCUMENTS

EP 0349686 A1 1/1990

(Continued)

OTHER PUBLICATIONS

"Time-line of the Music Animation Machine (and related experiments)", Music Animation Machine: History, http://www.musanim.com/mam/mamhist.htm pp. 1-5, p. 1, pp. 1-2, pp. 1-2 & p. 1, printed Aug. 30, 2007.

(Continued)

Primary Examiner—Jeffrey Donels
(74) Attorney, Agent, or Firm—Woodard, Emhardt, Moriarty, McNett & Henry LLP

(57) ABSTRACT

The present disclosure relates to a system and method for visualization of music and other sounds. In one embodiment, the twelve notes of an octave are labeled around a circle. When notes are played, the intervals between the notes are visualized by displaying a line between the labels corresponding to the note labels on the circle. In some embodiments, the lines representing the intervals are color coded with a different color for each of the six intervals. In other embodiments, the music and other sounds are visualized upon a helix that allows an indication of absolute frequency to be displayed for each note or sound.

42 Claims, 61 Drawing Sheets
(60 of 61 Drawing Sheet(s) Filed in Color)

U.S. PATENT DOCUMENTS

| | | | |
|---|---|---|---|
| 6,201,769 B1* | 3/2001 | Lewis | 368/10 |
| 6,245,981 B1* | 6/2001 | Smith | 84/474 |
| 6,392,131 B2* | 5/2002 | Boyer | 84/424 |
| 6,411,289 B1 | 6/2002 | Zimmerman | |
| 6,448,487 B1* | 9/2002 | Smith | 84/669 |
| 6,841,724 B2 | 1/2005 | George | |
| 6,930,235 B2* | 8/2005 | Sandborn et al. | 84/483.2 |
| 7,030,307 B2 | 4/2006 | Wedel | |
| 7,096,154 B1 | 8/2006 | Adrade-Cetto | |
| 7,153,139 B2 | 12/2006 | Wen et al. | |
| 7,182,601 B2 | 2/2007 | Donnan | |
| 2005/0190199 A1 | 9/2005 | Brown et al. | |
| 2005/0241465 A1* | 11/2005 | Goto | 84/616 |

FOREIGN PATENT DOCUMENTS

| | | |
|---|---|---|
| EP | 1354561 A1 | 10/2003 |
| JP | 05-232856 | 9/1993 |
| JP | 2004-226556 A | 8/2004 |
| KR | 10-2006-0110988 | 10/2006 |

OTHER PUBLICATIONS

Ashton, Anthony, "Harmonograph: A Visual Guide to the Mathematics of Music," ISBN 0-8027-1409-9, Walker Publishing Company, 2003, pp. 1-58.

Bourke, Paul, "Harmonograph", Aug. 1999, http://local.wasp.uwa.edu.au/~pbourke/surfaces_curves/harmonograph/, pp. 1-6, printed Aug. 30, 2007.

Dunne, Gabriel, "Color/Shape/Sound Ratio & Symmetry Calculator", Quilime.com—Symmetry Calculator, https://www.quilime.com/conent/colorcalc/, pp. 1-6, printed Jul. 3, 2007.

Patent Application Search Report mailed on Aug. 18, 2008 for PCT/US2008/005126.

Patent Application Search Report mailed on Aug. 1, 2008 for PCT/US2008/59126.

Patent Application Search Report mailed on Aug. 14, 2008 for PCT/US2008/004989.

Patent Application Search Report mailed on Aug. 18, 2008 for PCT/US2008/005069.

Patent Application Search Report mailed on Aug. 18, 2008 for PCT/US2008/005073.

Patent Application Search Report mailed on Aug. 21, 2008 for PCT/US2008/005076.

Patent Application Search Report mailed on Aug. 27, 2008 for PCT/US2008/5075.

Patent Application Search Report mailed on Aug. 28, 2008 for PCT/US2008/005077.

Patent Application Search Report mailed on Jul. 31, 2008 for PCT/US2008/005070.

Patent Application Search Report mailed on Sep. 18, 2008 for PCT/US2008/005072.

Patent Application Search Report mailed on Sep. 18, 2008 for PCT/US2008/005124.

Patent Application Search Report mailed on Sep. 24, 2008 for PCT/US2008/005125.

Patent Application Search Report mailed on Sep. 29, 2008 for PCT/US2008/005074.

Rabiner, Huang, "Fundamentals of Speech Recognition," PTR Prentice Hall, Inc., 1993, ISBN 0-13-285826-6, pp. 21-31; 42-68 and Fig. 2.17, 2.32.

Notification of Transmittal International Preliminary Report on Patentability for International Application No. PCT/US07/15822, dated Oct. 23, 2008.

* cited by examiner

APPARATUS AND METHOD FOR VISUALIZING MUSIC AND OTHER SOUNDS

CROSS-REFERENCE TO RELATED APPLICATIONS

The present application claims the benefit of U.S. Provisional Patent Application Ser. No. 60/830,386 filed Jul. 12, 2006 entitled "Apparatus and Method for Visualizing Musical Notation" which is hereby incorporated by reference in its entirety.

TECHNICAL FIELD OF THE DISCLOSURE

The present disclosure generally relates to sound analysis and, more specifically, to an apparatus and method for visualizing music and other sounds.

BACKGROUND OF THE DISCLOSURE

The first painters who ever walked the earth must have had a very limited palette of color at their disposal. The hues of paint found on cave walls, after all, are few and were certainly related to the nearby flora and fauna. It must have taken literally thousands of years before there were enough pigments gathered together in one place to complete the color spectrum and what's more, someone had to make that 'magical' connection to the rainbow along the way, first discovering that color itself is a circle. Retrospectively, this was a groundbreaking moment in the evolution of human kind, for only afterwards did it become possible to generate such eventual advances as color photography, X-rays, infrared, and more-accurate maps of the heavens (the exact wavelength of light being a necessary ingredient in calculating the distance, size, and composition of a visible star).

The evolution of musical understanding has followed a notably similar route; for, in the beginning, music was obviously not written, but sung. Our current system of musical notation is a relatively recent development when placed in the evolutionary context of humanity. Thousands and thousands of years must have passed before that first written note: a huge expanse of time during which people simply sang what sounded good to their ear, not paying any attention at all, to the fact that music was actually circular by nature.

Lopsided shapes have a "root" or a tendency towards stability: a lopsided sound (the Major triad, for example) likes to "sit" in a certain way. Symmetrical shapes, contrarily, have no root: every point of the shape being inherently equal to every other point. Symmetrical sounds (the fully diminished seventh chord, for example) have no place to sit and are thus "strange" or unstable. Because of this phenomenon, it is (retrospectively) no wonder that the master musical patterns, evolved over the centuries, ended up being lopsided by nature.

Out of this period of time there evolved three main scales or 'patterns' of musical tone, each pattern allowing for a complex layering of internal structure. These three scales, each made up of 7 notes, would eventually become the foundation for virtually all musical education in the modern world. There are, of course, other scales, and it is possible to create any arbitrary pattern of notes that one might desire; but the vast majority of musical sound can still be traced back to these three primary scales. Although the systems and methods disclosed herein can be used to encompass any possible scale or pattern, without exception, the present description of the musical language is, for clarity of description, based upon the three primary scales.

Each of the three main scales is a lopsided conglomeration of seven intervals:

| | |
|---|---|
| Major scale: | 2 steps, 2 steps, 1 step, 2 steps, 2 steps, 2 steps, 1 step |
| Harmonic Minor scale: | 2, 1, 2, 2, 1, 3, 1 |
| Melodic Minor scale: | 2, 1, 2, 2, 2, 2, 1 |

Upon first recognizing these archetypal patterns of seven notes, these beautiful lines of tone that allow for complex musical layering, the first developers of musical notation decided to use the seven note scale as a foundation for music's written language. Therefore, our entire musical system has been based upon the use of seven letters (or note names) to correspond with the seven notes of the scale: A, B, C, D, E, F. These first developers of musical notation would have had no way of knowing that the musical scales were, themselves, lopsided entities; that, instead of seven tones, the true musical circle had twelve tones. Because of this discrepancy, the traditional system of musical notation has been inherently lopsided at its root. With a circle of twelve tones and only seven note names, there are (of course) five missing note names. Just as the first painters did not have all of the colors of the rainbow at their disposal, the first singers and musicians had no way of knowing that sound was also circular by nature.

Why is reading and writing music such a difficult skill to master? It would certainly be challenging enough, without the fact that the traditional system uses only seven letter names to try to encompass twelve notes. But the remaining five notes are then covered using a convention referred to as sharps (#'s) and flats (b's). What this leads to is a relatively complex method of reading and writing notes on the staff, where one has to mentally juggle a key signature with seemingly arbitrary accidentals (sharps and flats) that are then added one note at a time. The result is that the seven-note scale, which is a lopsided entity, is presented as a straight line on the traditional musical notation staff. On the other hand, a pattern that is truly symmetrical within the circle (one that is actually a straight line, such as the chromatic scale, for example) is presented in a lopsided manner on the traditional musical staff. In our traditional system of musical notation we never see what we hear; there are significantly more ways than one to write the same musical idea; and patterns that are lopsided look straight, while straight patterns look lopsided. All of this inefficiency stems from the inherent flaw of the traditional written system being based upon the seven note scales instead of the twelve-tone circle.

Yet it is commonly understood and accepted that music is, indeed, a circle. Such a concept is not new; it has been around for at least a few hundred years, perhaps coming to prominence in the mid 1700's. It was then that Johann Sebastian Bach became one of the champions of the new 'Well-Temperament' movement (i.e., circular tuning of the piano.) This new method of tuning the 'clavier' (an early version of the piano) made it suddenly possible to play the instrument in every possible 'key' of the twelve-tone circle.

There is therefore a need for different systems and methods of musical notation that allow music to be visualized in its true circular form.

SUMMARY OF THE DISCLOSURE

Accordingly, in one aspect, method for visualizing music is disclosed, comprising the steps of: (a) labeling the perimeter of a circle with twelve labels corresponding to twelve respective notes in an octave, such that moving clockwise or counter-clockwise from a first label to an adjacent second label represents a musical half-step; (b) identifying an occurrence of a first one of the twelve notes; (c) identifying an occurrence of a second one of the twelve notes; (d) identifying a first label corresponding to the first note; (e) identifying a second label corresponding to the second note; (f) creating a first line connecting the first label and the second label, wherein: (1) each line is a first color if the first note and the second note are separated by a half step; (2) each line is a second color if the first note and the second note are separated by a whole step; (3) each line is a third color if the first note and the second note are separated by a minor third; (4) each line is a fourth color if the first note and the second note are separated by a major third; (5) each line is a fifth color if the first note and the second note are separated by a perfect fourth; and (6) each line is a sixth color if the first note and the second note are separated by a tri-tone.

In another aspect, a method for visualizing music is disclosed, comprising the steps of: (a) providing a helix having a plurality of turns; (b) labeling the perimeter of the helix with labels, wherein: (1) each turn of the helix has a respective group of twelve labels corresponding to twelve respective notes in a respective octave; and (2) moving clockwise or counter-clockwise on the helix from any label to an adjacent label represents a musical half-step; (c) identifying an occurrence of a first note; (d) identifying which of the twelve respective notes and which respective octave corresponds to the first note; (e) identifying an occurrence of a second note; (f) identifying which of the twelve respective notes and which respective octave corresponds to the second note; (g) identifying a first label corresponding to the first note; (h) identifying a second label corresponding to the second note; (i) creating a first line connecting the first label and the second label, wherein: (1) each line is a first color if the first note and the second note are separated by a half step; (2) each line is a second color if the first note and the second note are separated by a whole step; (3) each line is a third color if the first note and the second note are separated by a minor third; (4) each line is a fourth color if the first note and the second note are separated by a major third; (5) each line is a fifth color if the first note and the second note are separated by a perfect fourth; and (6) each line is a sixth color if the first note and the second note are separated by a tri-tone.

According to another aspect, a method for visualizing music is disclosed, comprising the steps of: (a) providing a helix having a plurality of turns; (b) labeling the perimeter of the helix with labels, wherein: (1) each turn of the helix has a respective plurality of labels corresponding to a plurality of respective notes in a respective octave; and (2) moving clockwise or counter-clockwise on the helix from any label to an adjacent label represents a first interval; (c) identifying an occurrence of a first note; (d) identifying which of the plurality of respective notes and which respective octave corresponds to the first note; (e) identifying an occurrence of a second note; (f) identifying which of the plurality of respective notes and which respective octave corresponds to the second note; (g) identifying a first label corresponding to the first note; (h) identifying a second label corresponding to the second note; (i) creating a first line connecting the first label and the second label, wherein: (1) each line is a first color if the first note and the second note are separated by the first interval; (2) each line is a second color if the first note and the second note are separated by a second interval; (3) each line is a third color if the first note and the second note are separated by a third interval; (4) each line is a fourth color if the first note and the second note are separated by a fourth interval; (5) each line is a fifth color if the first note and the second note are separated by a fifth interval; and (6) each line is a sixth color if the first note and the second note are separated by a sixth interval.

According to another aspect, a method for visualizing sound is disclosed, comprising the steps of: (a) providing a helix having a plurality of turns; (b) labeling the perimeter of the helix with labels, wherein: (1) each turn of the helix has a respective plurality of labels corresponding to a plurality of respective sounds in a respective plurality of frequency ranges; and (2) moving clockwise or counter-clockwise on the helix from any label to an adjacent label represents a first frequency interval; (c) identifying an occurrence of a first sound; (d) identifying which of the plurality of respective sounds and which respective plurality of frequency ranges corresponds to the first sound; (e) identifying an occurrence of a second sound; (f) identifying which of the plurality of respective sounds and which respective plurality of frequency ranges corresponds to the second sound; (g) identifying a first label corresponding to the first sound; (h) identifying a second label corresponding to the second sound; (i) creating a first line connecting the first label and the second label, wherein: (1) each line is a first color if the first note and the second note are separated by the first frequency interval; (2) each line is a second color if the first note and the second note are separated by a second frequency interval; (3) each line is a third color if the first note and the second note are separated by a third frequency interval; (4) each line is a fourth color if the first note and the second note are separated by a fourth frequency interval; (5) each line is a fifth color if the first note and the second note are separated by a fifth frequency interval; and (6) each line is a sixth color if the first note and the second note are separated by a sixth frequency interval.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE VARIOUS EMBODIMENTS

Figure 1:
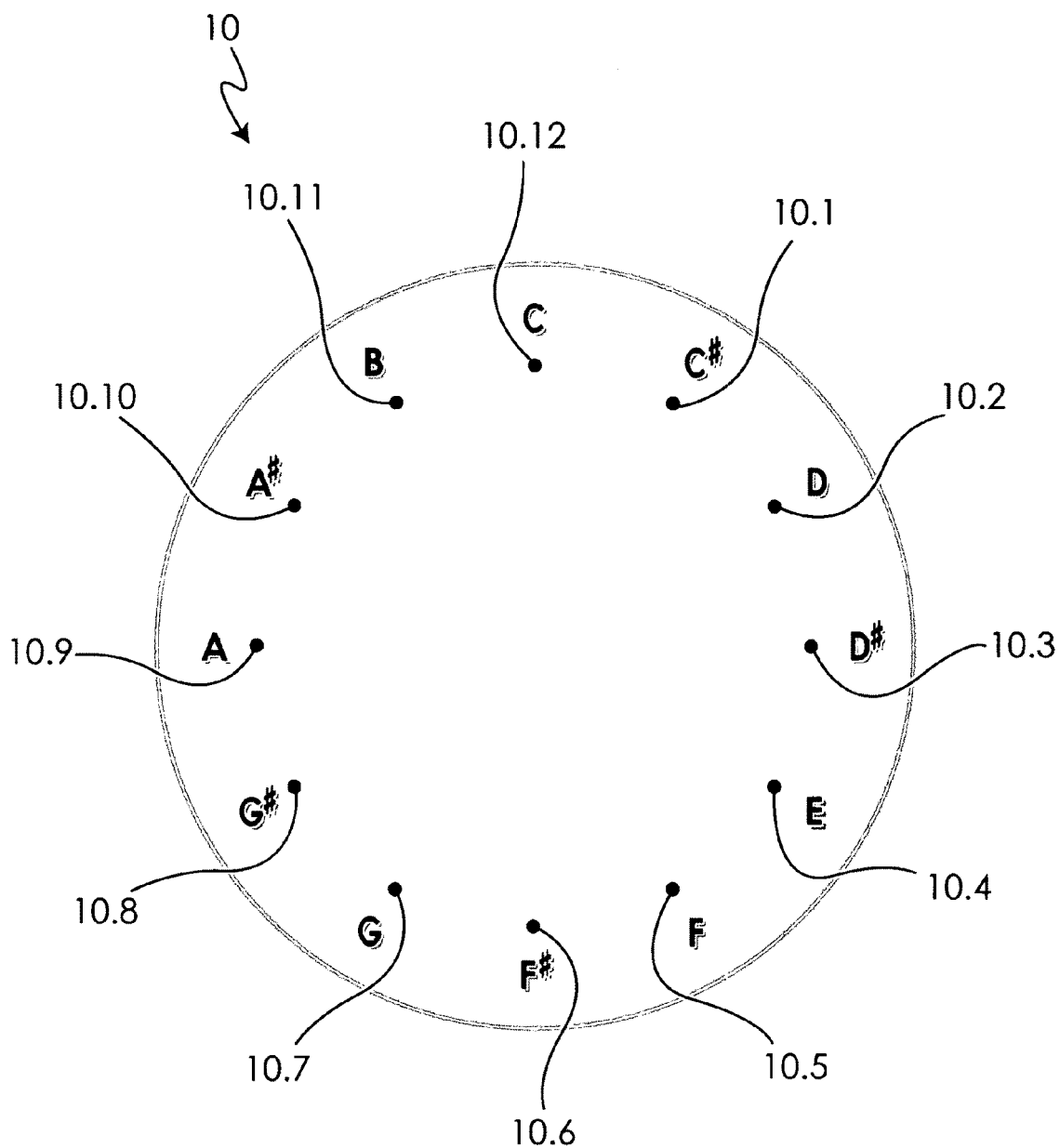
FIG. 1 is a diagram of a twelve-tone circle according to one embodiment.

For the purposes of promoting an understanding of the principles of the disclosure, reference will now be made to certain embodiments thereof and specific language will be used to describe the same. It will nevertheless be understood that no limitation of the scope of the disclosure is thereby intended, such alterations, further modifications and further applications of the principles of the invention as described herein being contemplated as would normally occur to one skilled in the art to which the disclosure relates.

As will be apparent from the disclosure contained herein, the present invention will find application in any field where the identification and analysis of sound is useful. Most of the described embodiments relate to the use of the systems and methods of the present invention for the visualization of music, as that is a significant application for the present invention. However, the repeated references to music are for convenience of description, and those with ordinary skill in the art will recognize that the present invention may be applied to many other fields besides music, some of which are enumerated in the description.

What is described in the main embodiments herein is a set of mathematically based, color-coded diagrams that can be used to explain and teach the theory and structures of music from the most basic understanding to the most complex, as well as to visualize music for entertainment purposes. Both geometric form and the color spectrum are used to present the building blocks of music (the basic shapes) in a way never before seen. The result is that, for the first time, it becomes possible to view the interweaving layers of patterns within patterns that exist in our musical language; that is, to see while listening to music in real time, an exact visual translation of the accompanying musical sound.

The following description and accompanying geometric, color-coded MASTER KEY™ diagrams will reveal the true single key of tonal music in a clear manner. In accordance with this disclosure, these diagrams portray the visual representation of musical sound and, as such, they are incredibly efficient learning tools. The language of music (like the written language, or the mathematical language) has a necessary vocabulary and basic structure that must first be deciphered and then absorbed in order to gain true mastery. The following description and figures will break down the complexity of all possible musical structures into their most simple forms. The structures these diagrams represent can then be used to effectively master any instrument based on the twelve tone circle. Furthermore, these structures can be used to visualize music for entertainment and edification purposes.

If we were to take it upon ourselves to learn the piano, without the help of a teacher, then we might begin our efforts by simply pressing down the various keys—one at a time—thus experimenting with the multitude of different sounds that can be produced. After enough persistence in this effort, we would eventually be led to the discovery that some of these sounds 'matched up' with one another—the only difference being in how 'high' or 'low' these relative matches were. Once we could visually identify these 'matches in sound,' (once we could see which keys to press) we would quickly realize that the matches came in regularly calculated intervals. A closer look at this pattern—counting how many keys (steps) there were between matches—would reveal the 'master circle' of twelve tones. There are twelve equal steps between matches.

As shown in FIG. 1, the twelve-tone circle, indicated generally at 10, is the basis of all western, as well as much of the world's, music. It used for virtually every genre of music in the western hemisphere, from Jazz, to Blues, to Rock, to Country, to R&B, to Punk, to Classical. Every orchestral instrument, from the violin, to the trumpet, to the piano, revolves around this same twelve tone circle. It is also the true foundation of virtually all written music.

The twelve-tone circle 10 is the first of the MASTER KEY™ diagrams. It is the template upon which all of the other diagrams are built. Twelve points 10.1-10.12 are geometrically placed in equal intervals around the perimeter of the circle 10 in the manner of a clock; twelve points, each thirty degrees apart (although the present disclosure comprehends the positioning of points 10.1-10.12 at positions that are not exactly, but are substantially, thirty degrees apart). Each of the points 10.1-10.12 on the circle 10 represents one of the twelve pitches. The names of the various pitches can then be plotted around the circle 10. It will be appreciated that in traditional musical notation there are more than one name for each pitch (e.g., $A^\#$ is the same as $B^b$). This causes much inefficiency and eventual confusion, as identical pieces of music can be 'spelled' in a number of different ways. In the illustrated embodiment, the circle 10 has retained these traditional labels, although the present disclosure comprehends that alternative labels could be used, such as the letters A through L, the numbers 1 through 12, or other more arbitrary symbols. Furthermore, the circle 10 of FIG. 1 uses the sharp notes as labels; however, it will be understood that some or all of these sharp notes could be labeled with their flat equivalents and that some of the non-sharp and non-flat notes could be labeled with the sharp or flat equivalents.

Furthermore, it will be appreciated by those skilled in the art that the present invention is in no way limited to visualization of music using only a twelve note division of the notes. There are other musical systems around the world that are not based upon twelve notes, such as the 24 (or 22) note system of much eastern music. The systems and methods disclosed herein may utilize any desired segmentation of the range of sounds being visualized. For example, in the non-musical applications of the present invention, it may be desirable to divide the analyzed spectrum into division as small as possible, perhaps billions of them. Furthermore, the notes or sounds do not have to be arranged on a circle, and the present invention comprehends the arrangement of notes or sounds on any surface (two or three dimensional), such as on a polyhedron or on an image of a human mouth, just to name two non-limiting examples. Therefore, it should be understood that the twelve-tone circle 10 is used herein only for convenience of illustration.

Figure 2:
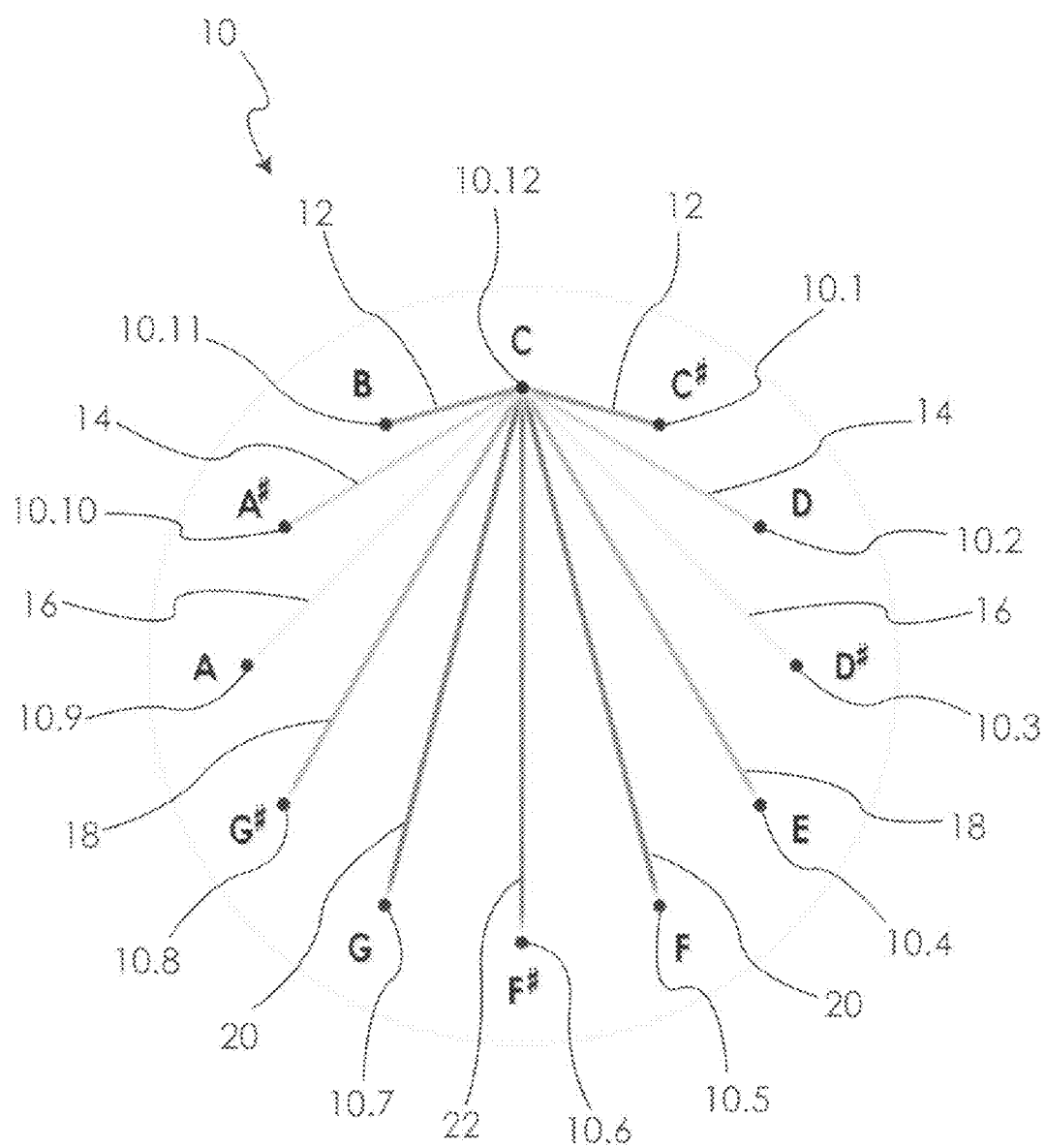
FIG. 2 is a diagram of a twelve-tone circle showing the six intervals.

The basic twelve-tone circle 10 represents the first 'generation' of the MASTER KEY™ diagrams and it is created by focusing on one note at a time. The next 'generation' of the MASTER KEY™ diagrams involves thinking in terms of two notes. In music, shapes of two connected notes are referred to as 'intervals.' The Interval diagram, shown in FIG. 2, is the second of the MASTER KEY™ diagrams, and is formed by connecting the top point 10.12 of the twelve-tone circle 10 to every other point 10.1-10.11. The ensuing lines—their relative length and color—represent the various 'intervals.' Beginning at the top (point 10.12), as we travel one point away from our point of origin (clockwise in this instance), we encounter the first of the intervals: the half step 12. Two points away, in our continuing clockwise motion, and we encounter the whole step 14. Three points away and we find the minor third interval 16. Four points away: the major third interval 18. Five points away: the perfect fourth 20. Six points away: the tri-tone interval 22. The next step is important: as we proceed to the seventh point 10.7 in a clockwise direction around the circle 10, we find that we have passed the maximum distance away from our point of origin 10.12. Traveling seven points in a clockwise direction is the same as traveling five points in a counter-clockwise direction. Each successive step takes us back to our starting point in descending fashion—the left side of the circle 10 effectively mirroring the right side—which means that there are no more new intervals to be discovered. Thus, there are only six basic intervals in all of music.

Each of these six intervals (each line 12-22) has a different and totally unique sound. What's more, when any two pitches on the twelve-tone circle 10 are generated at the same time, one of these six intervals 12-22 can always be traced. Most importantly, the two-note shapes (the intervals 12-22) are the effective building blocks of all larger musical structures.

Now we should discuss the relevance of color within the MASTER KEY™ diagrams. It is only a striking coincidence, but it turns out that the six basic intervals 12-22 of music overlap with the six basic colors of the rainbow (counting blue and indigo as the same color). Color adds a wonderful dimension and will remain very significant throughout the rest of the description and diagrams, providing yet another way (aside from spatial recognition) to comprehend the basic structures of music. As the structures continue to get larger and more complicated, each interval (each line) will continue to remain the same color. In a preferred embodiment, the interval line 12 for a half step is colored red, the interval line 14 for a whole step is colored orange, the interval line 16 for a minor third is colored yellow, the interval line 18 for a major third is colored green, the interval line 20 for a perfect fourth is colored blue, and the interval line 22 for a tri-tone is colored purple.

Although the six intervals in the illustrated embodiment are colored to correspond to the colors of the rainbow, it will be appreciated that the particular colors used may change in various embodiments. The order of colors assigned to the different intervals may change, or a completely different set of colors may be used. For example, each interval could be colored with a unique shade of red, from a light red to a dark brick red. What is desirable is that there is a gradated color spectrum assigned to the intervals so that they may be distinguished from one another by the use of color, which the human eye can detect and process very quickly. By assigning colors whose frequency increases with the increasing separation between the notes defining an interval, the viewer is able to make an intuitive connection between the color and the interval.

Figure 3:
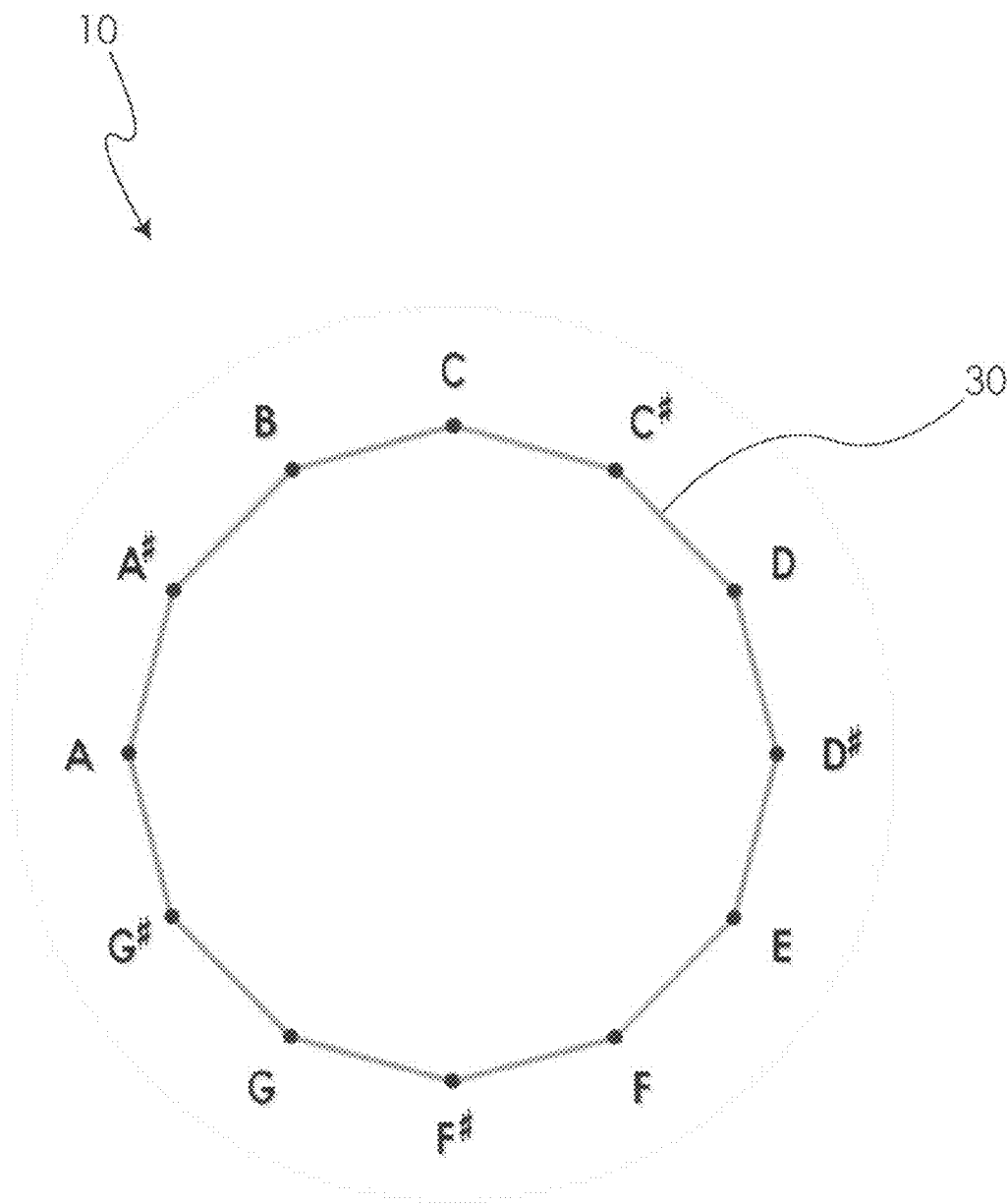
FIG. 3 is a diagram of a twelve-tone circle showing the chromatic scale.
Figure 4:
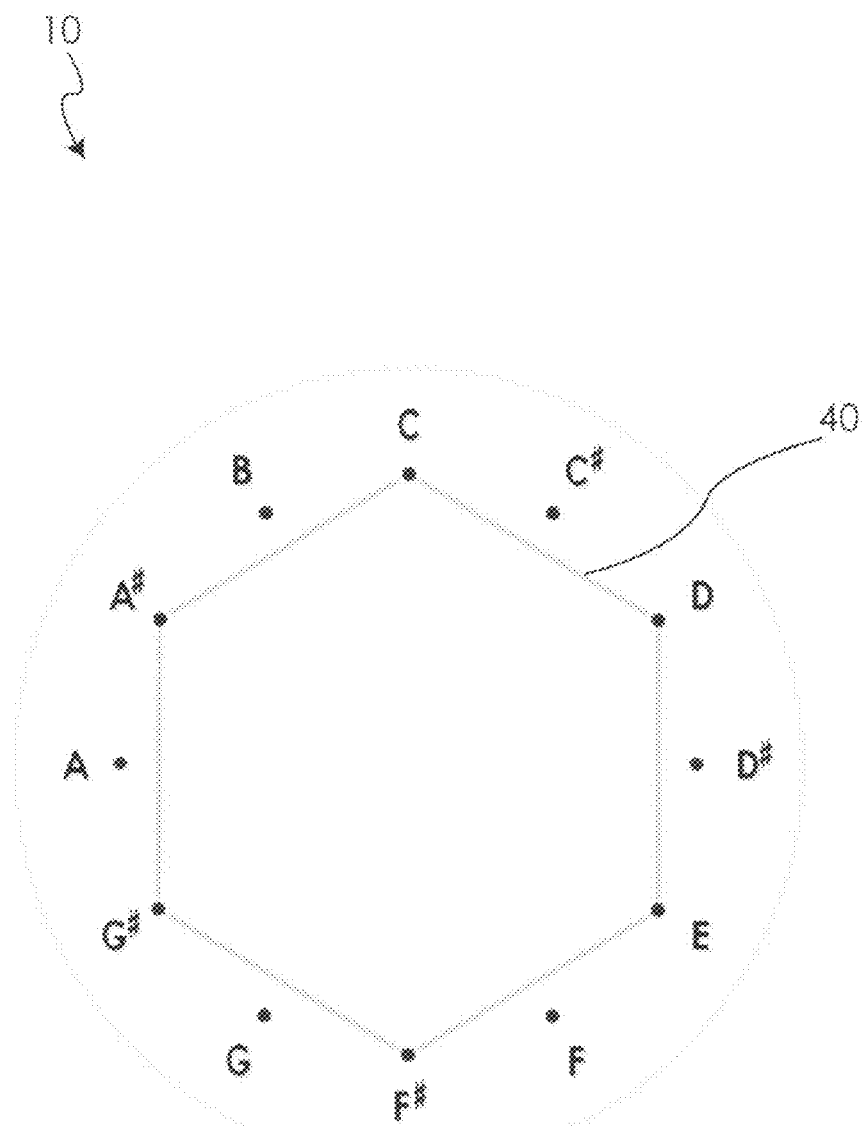
FIG. 4 is a diagram of a twelve-tone circle showing a first whole-tone scale.

The next group of MASTER KEY™ diagrams pertain to extending the various intervals 12-22 to their completion around the twelve-tone circle 10. This concept is illustrated in FIG. 3, which is the diagram of the chromatic scale. The chromatic scale takes the initial interval—the half step 12—and extends it all the way around the circle 10 until it finally returns to its point of origin. As shown in FIG. 4, we are left with a twelve-pointed circle 30 etched in red (since the half step interval 12 is red in the preferred embodiment). In musical terms, this pattern 30 is referred to as the chromatic scale.

The chromatic scale is important for one very significant reason: it touches each of the twelve possible notes 10.1-10.12. As described hereinbelow, there is only one other pattern that shares this characteristic.

Before continuing with the other five intervals, the relevance of extending the intervals to their completion around the circle should be explained. Since our musical system is based almost entirely from a small group of seven note patterns, the resulting method of musical notation is asymmetrical. In fact, this unevenness is cause for virtually all of the complication and misunderstanding experienced by musical newcomers. The scales themselves are lopsided patterns combining more than one interval. The major scale, for example, follows this pattern: starting on any note of the circle 10, move forward a whole step 14-another whole step 14-a half step 12-a whole step 14-a whole step 14-a whole step 14-and finally another half step 12. In traditional musical notation (music written on the staff) this pattern (W-W-H-W-W-W-H) is portrayed as a straight line. This is an example of how our traditional musical system is extremely inefficient. The scales are not straight lines, but are, instead, asymmetrical combinations of multiple intervals. One cannot truly understand an asymmetrical combination of multiple intervals before one understands the symmetrical nature of the individual patterns. This is why it is desirable to take the intervals 12-22 to their completion around the circle 10. It is simply to acquire a groundwork of the symmetrical patterns, so that one can have a true foundation with which to build one's eventual understanding. This allows one to make better sense of the subsequent, more complicated patterns.

Figure 5:
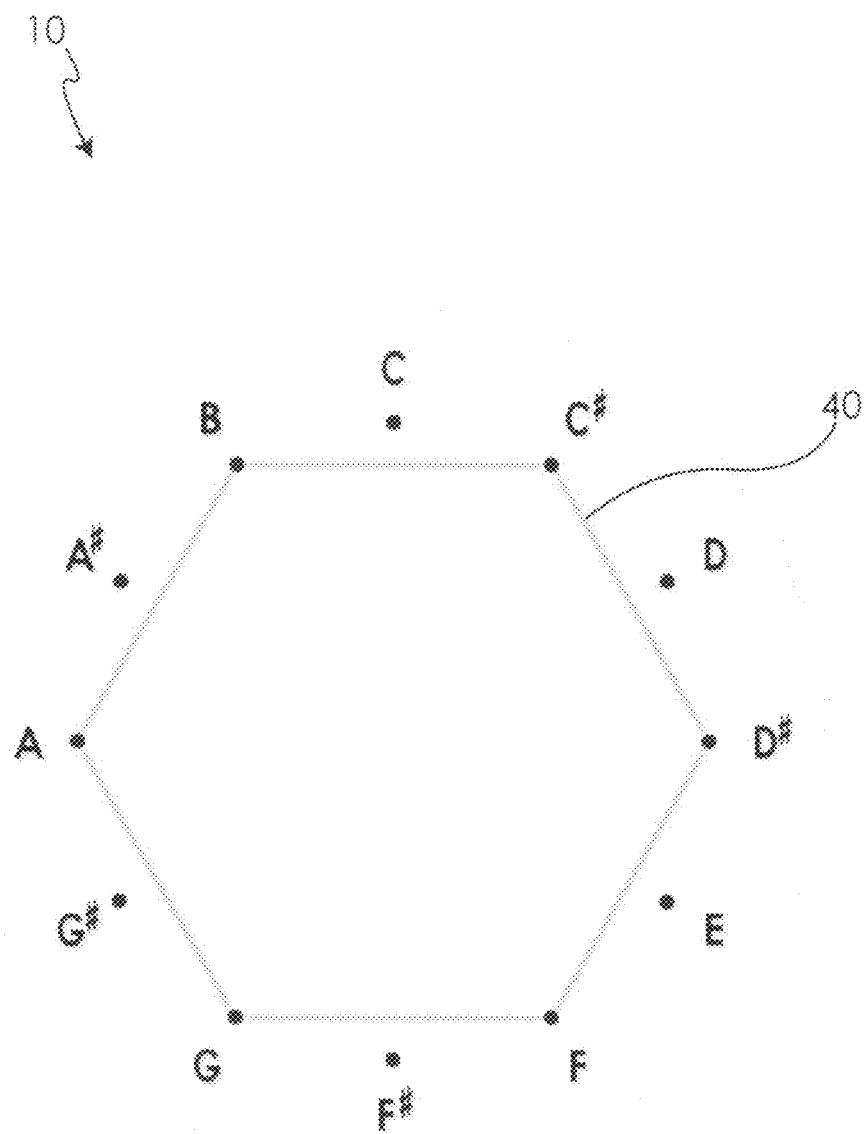
FIG. 5 is a diagram of a twelve-tone circle showing a second whole-tone scale.
Figure 6:
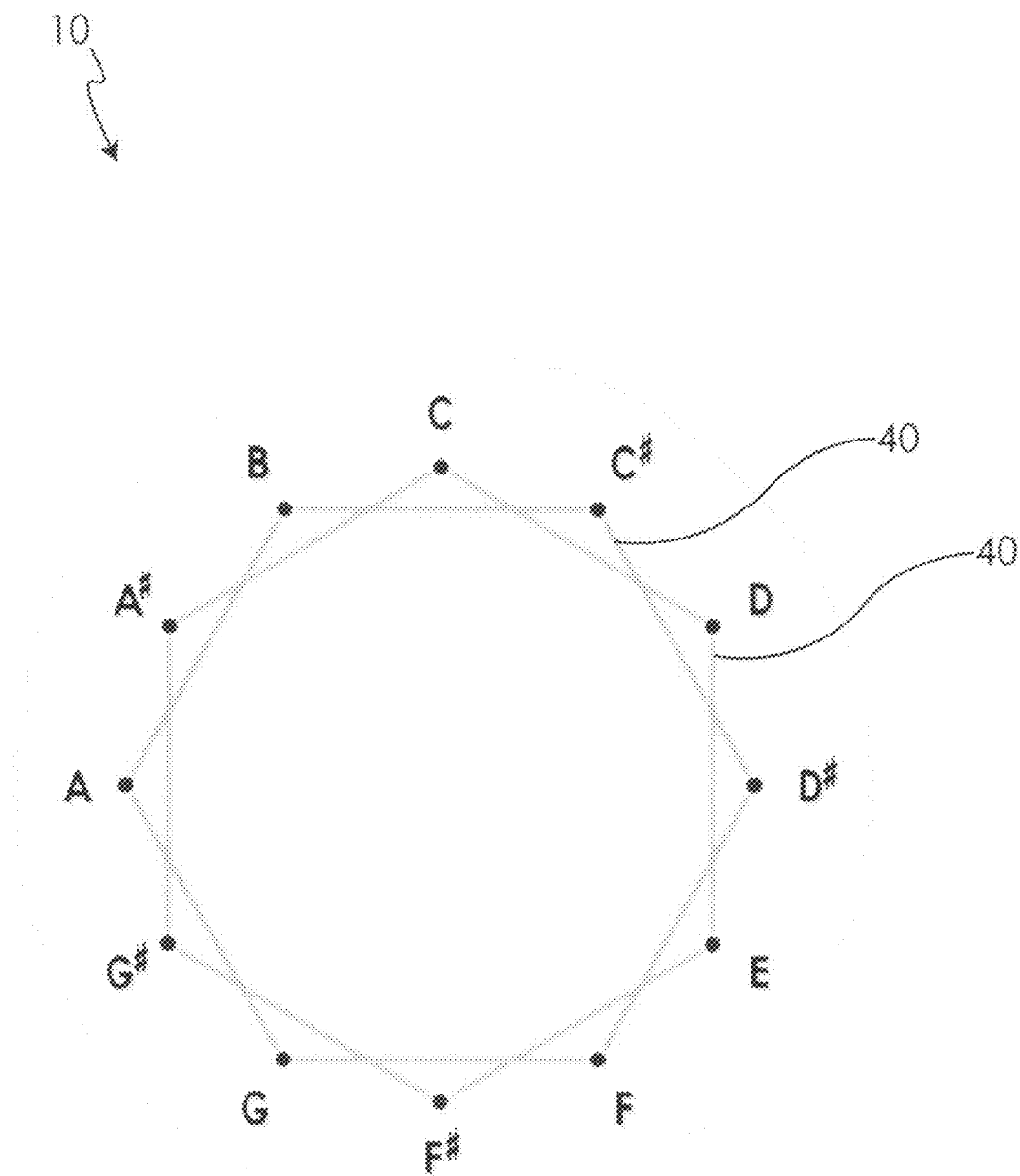
FIG. 6 is a diagram of a twelve-tone circle showing the first and second whole-tone scales.
Figure 7:
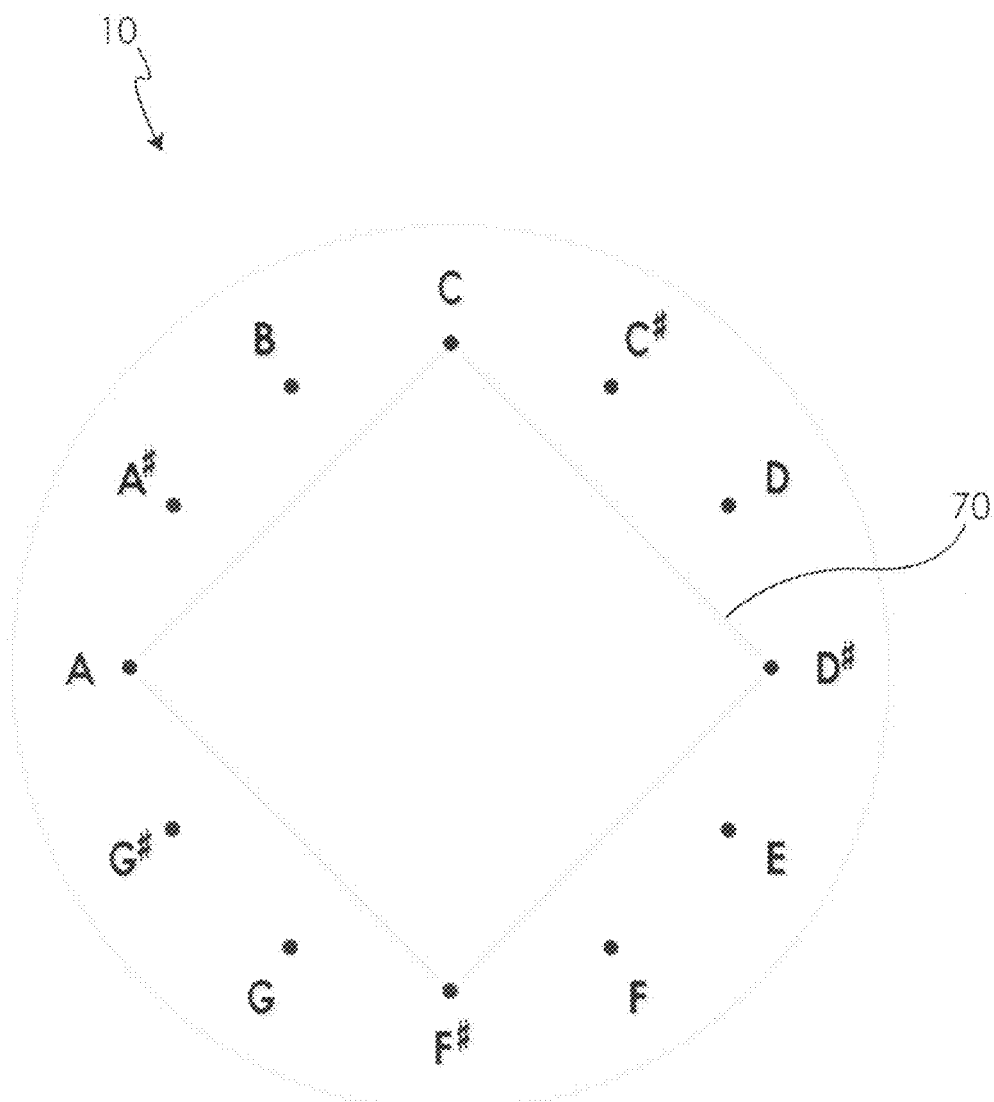
FIG. 7 is a diagram of a twelve-tone circle showing a first diminished scale.
Figure 8:
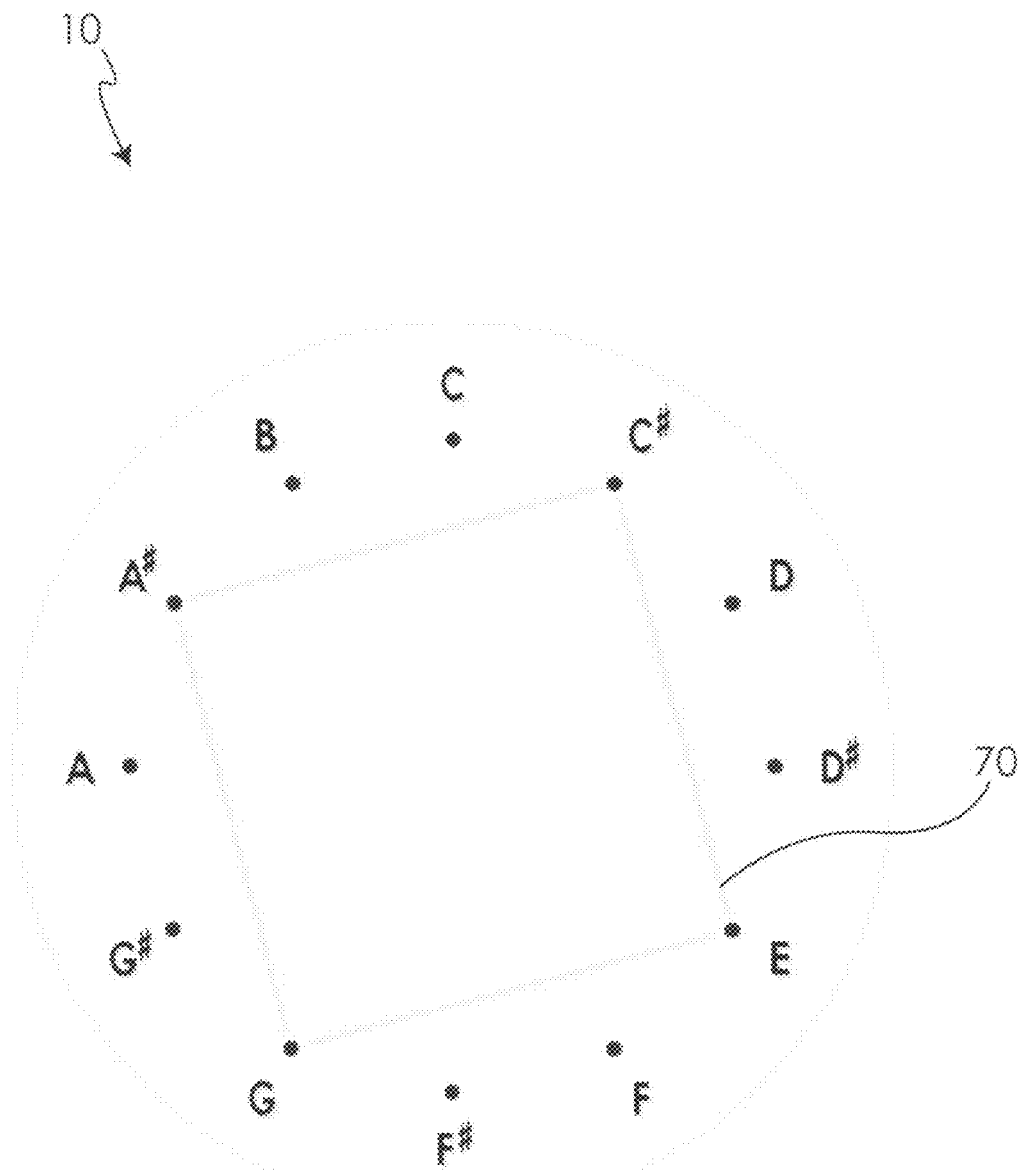
FIG. 8 is a diagram of a twelve-tone circle showing a second diminished scale.
Figure 9:
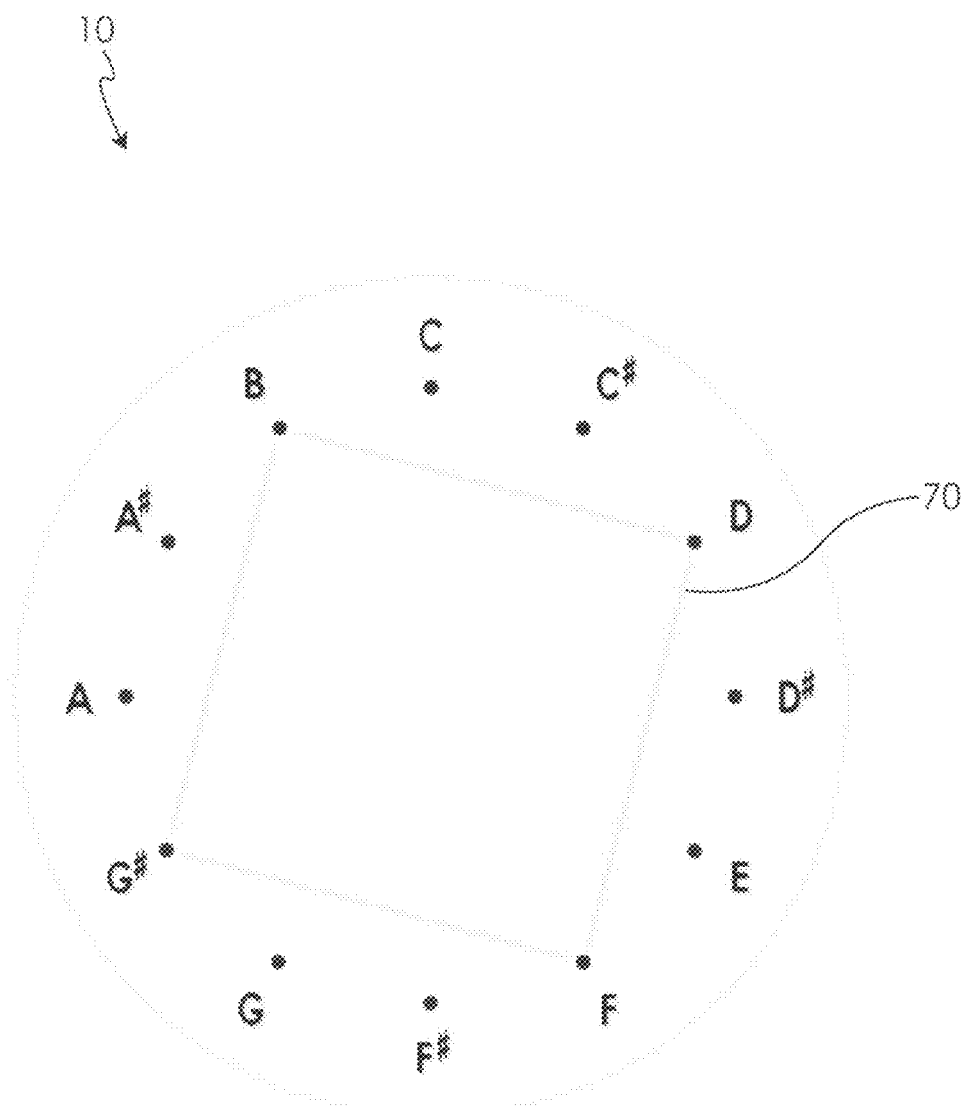
FIG. 9 is a diagram of a twelve-tone circle showing a third diminished scale.
Figure 10:
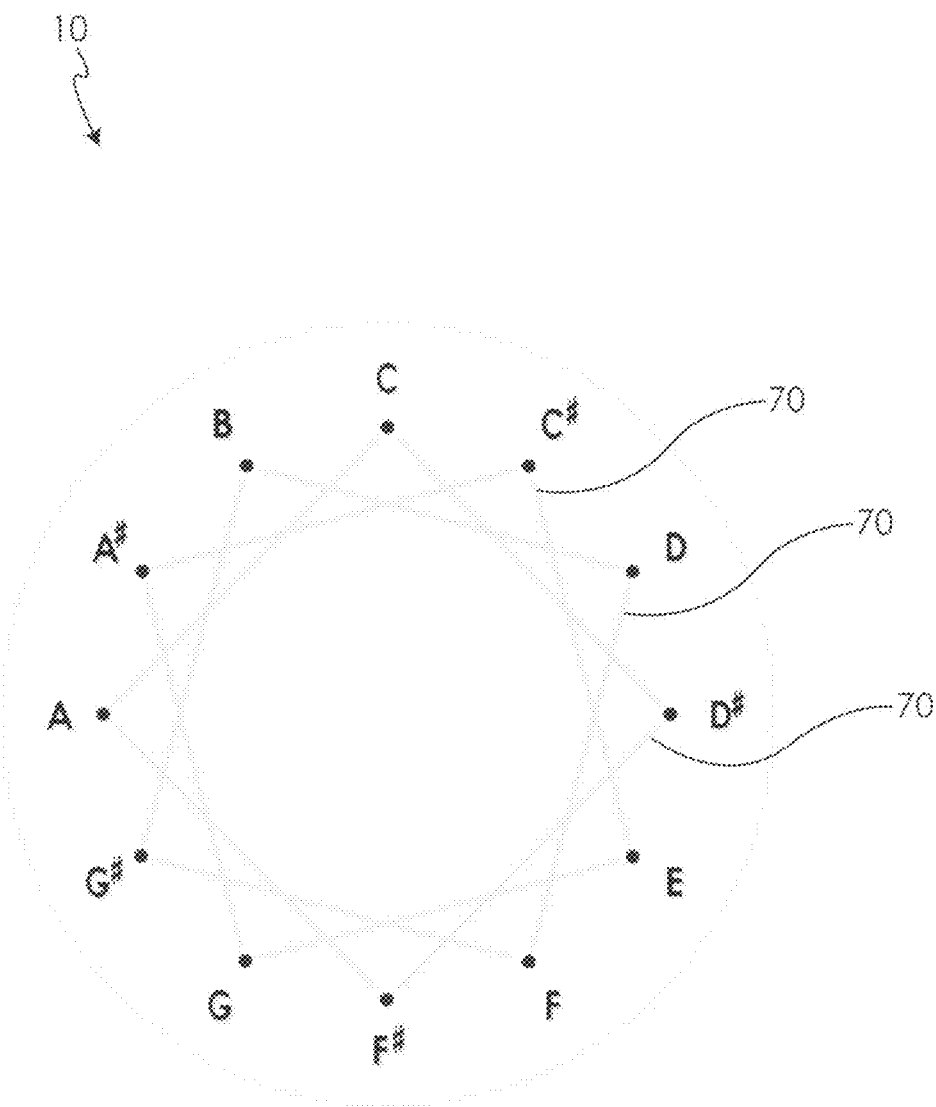
FIG. 10 is a diagram of a twelve-tone circle showing the first through third diminished scales.
Figure 11:
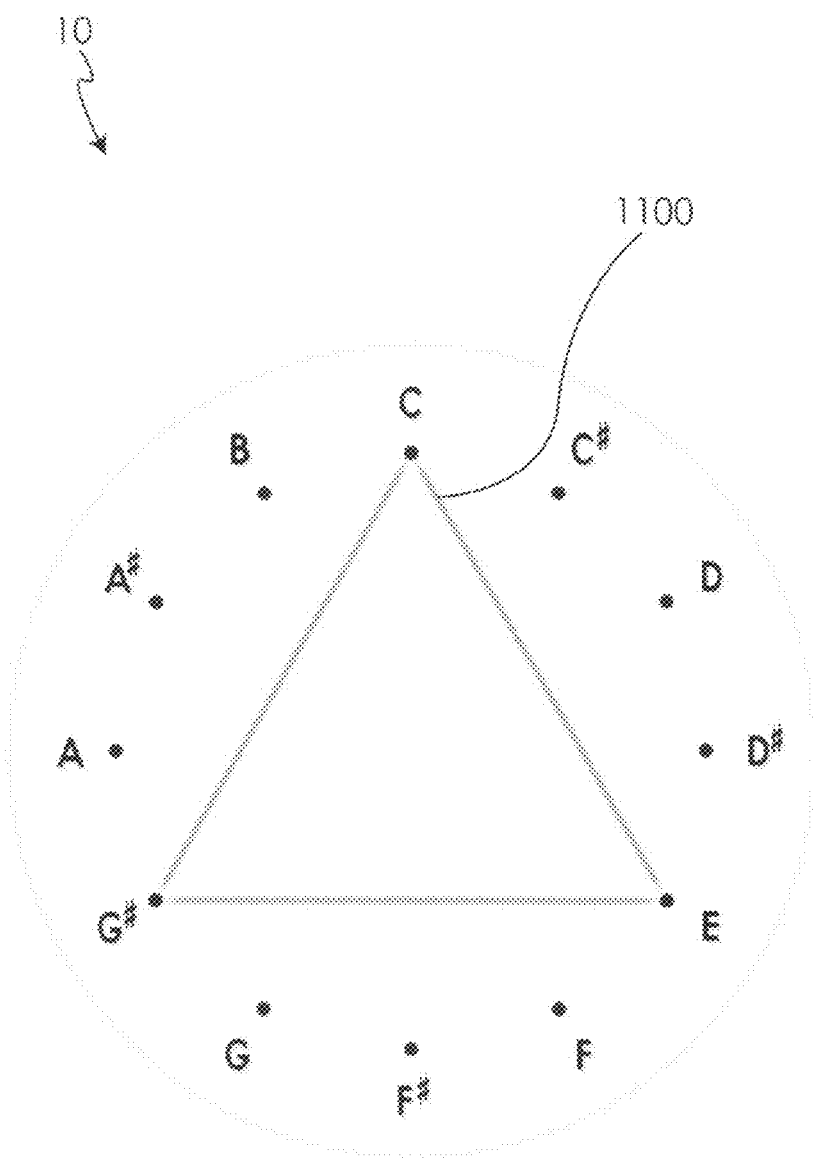
FIG. 11 is a diagram of a twelve-tone circle showing a first augmented scale.
Figure 12:
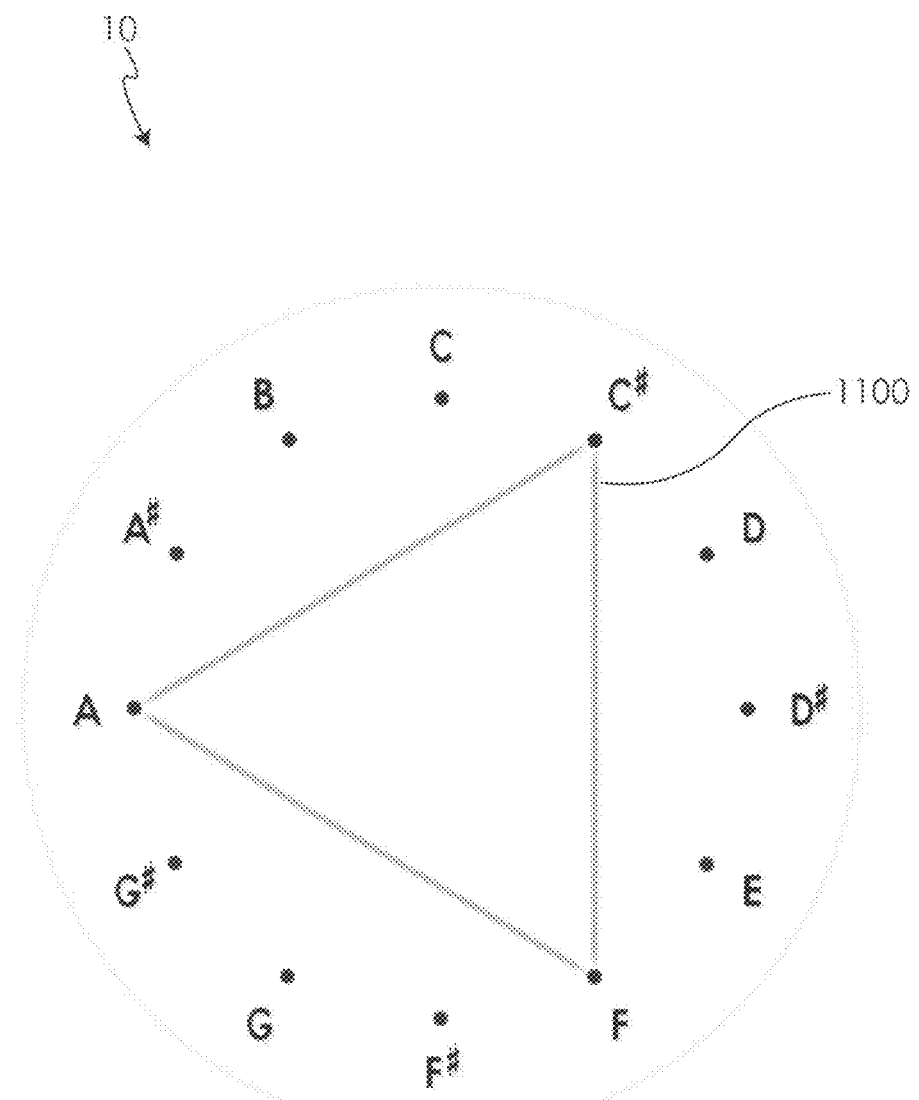
FIG. 12 is a diagram of a twelve-tone circle showing a second augmented scale.
Figure 13:
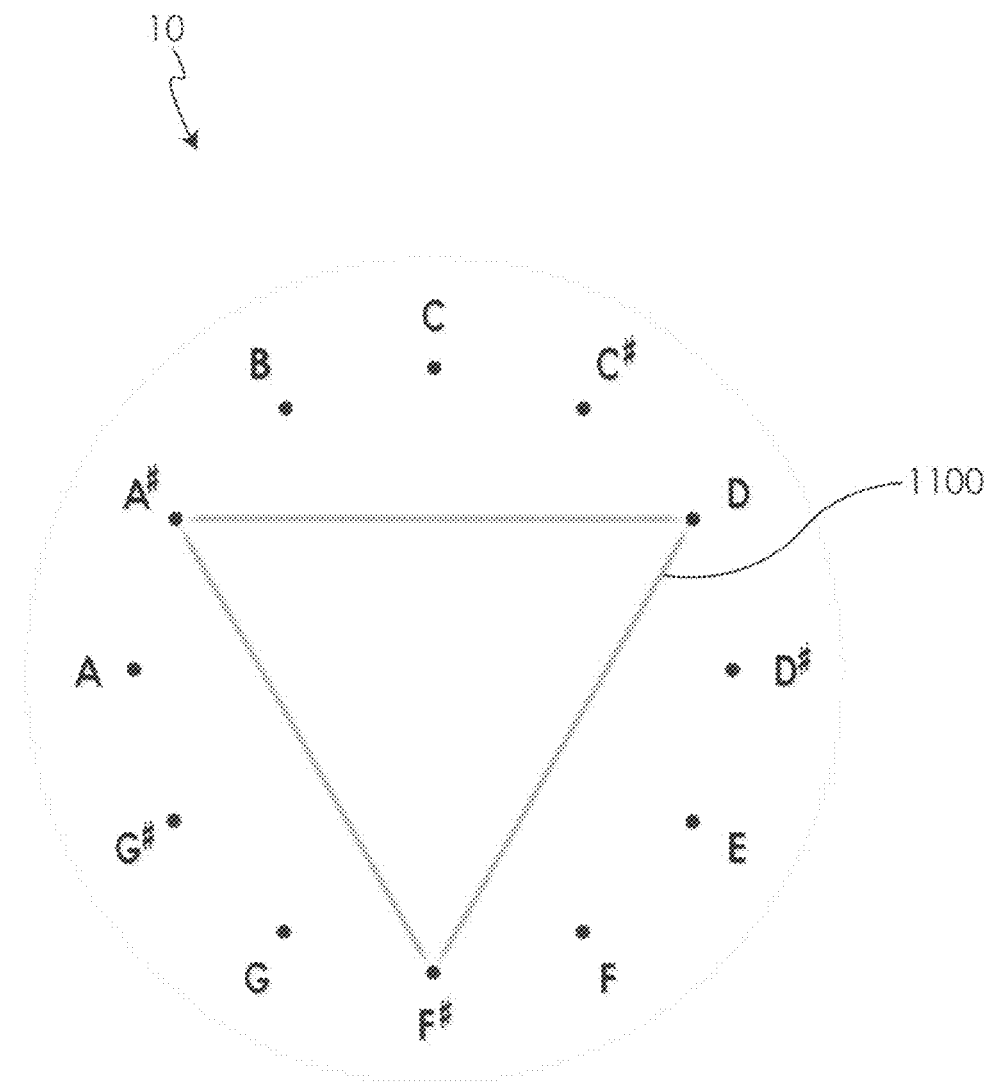
FIG. 13 is a diagram of a twelve-tone circle showing a third augmented scale.
Figure 14:
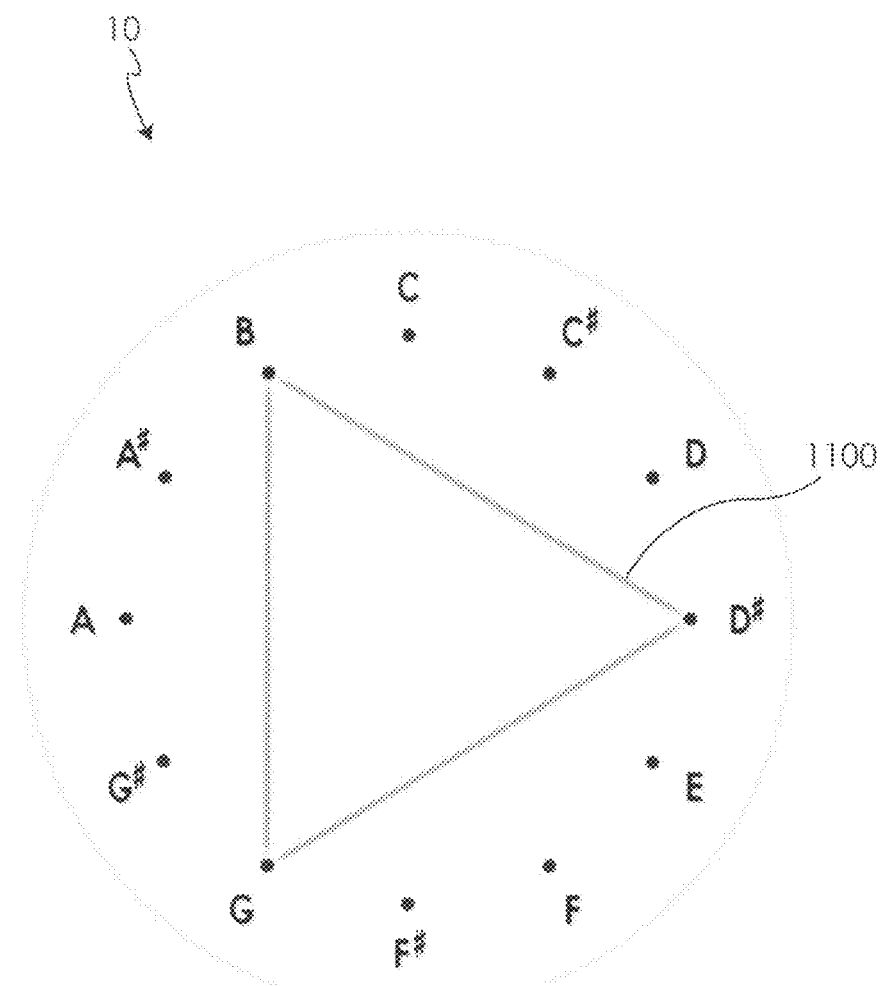
FIG. 14 is a diagram of a twelve-tone circle showing a fourth augmented scale.
Figure 15:
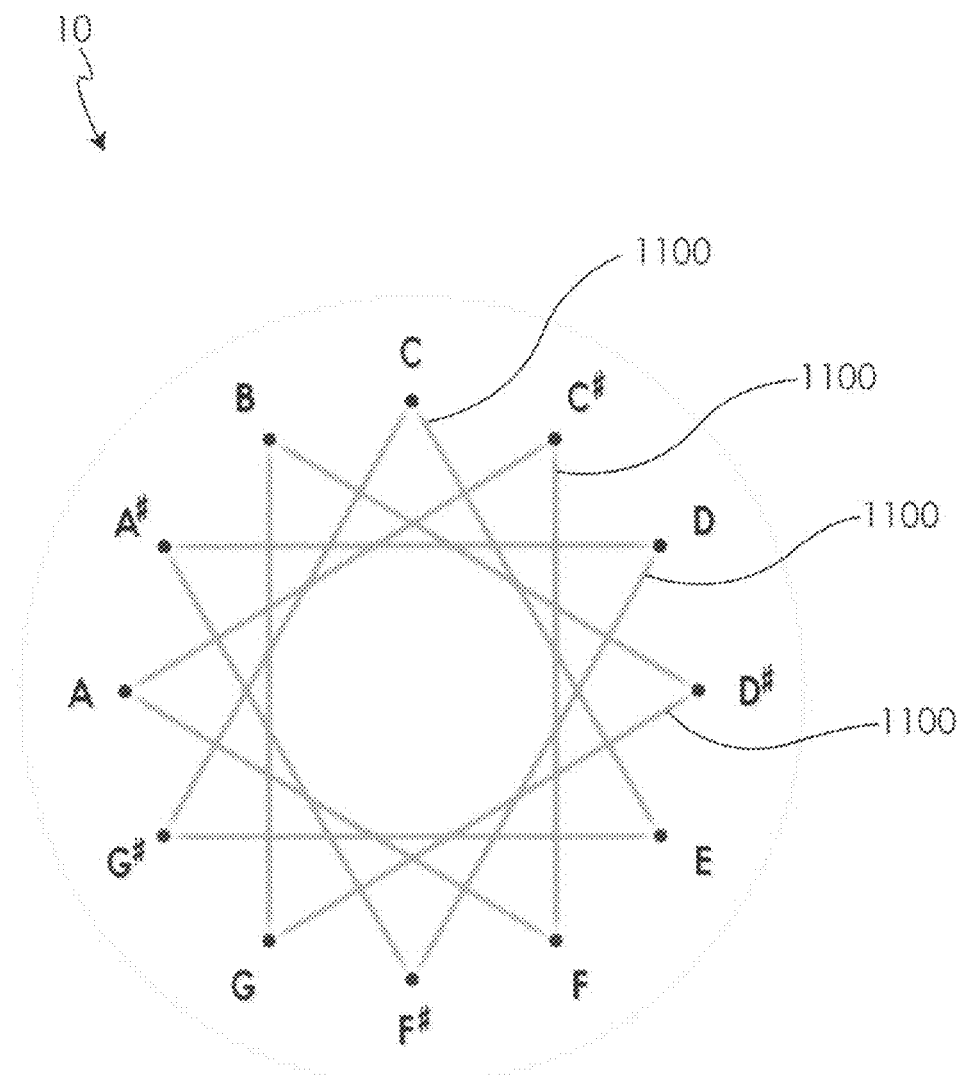
FIG. 15 is a diagram of a twelve-tone circle showing the first through fourth augmented scales.

Referring now to FIG. 4, the second interval to be extended around the circle is the whole step 14. Connecting a line 14 to every other point on the twelve-tone circle 10 creates the recognizable shape of a hexagon 40. Colored in orange, this hexagonal pattern is musically referred to as the whole-tone scale 40. Taking up only six of the twelve points 10.1-10.12 on the circle 10, however, one whole-tone scale 40 won't fill all of the twelve possible points 10.1-10.12. A second hexagon 40, as shown in FIG. 5, is needed for the circle 10 to be complete, and thus, there are two whole tone scales 40 in the completed musical spectrum, as can be seen in FIG. 6.

Referring now to FIGS. 7-10, extending the minor third interval 16 around the twelve-tone circle 10 gives us the image of a square 70. Yellow in color, this square, produced by consecutive minor thirds 16, gives us the sound of the diminished scale 70. Since a square is made by connecting four points, and since four goes into twelve three times, it takes three squares 70 to fill in all possible points in the twelve-tone circle 10. Thus, there are three diminished scales 70 that must be learned in order to complete the spectrum.

Referring to FIGS. 11-15, the major third interval 18 is green in color, and extending it in consecutive lines around the twelve-tone circle 10 leaves us with a three-pointed triangle 1100. The shape of the triangle is referred to, in music, as the augmented scale 1100. Sticking to the previously demonstrated pattern, three goes into twelve four times. Thus, there are four possible augmented scales 1100 (four triangles) within the circle 10 of twelve notes.

Figure 16:
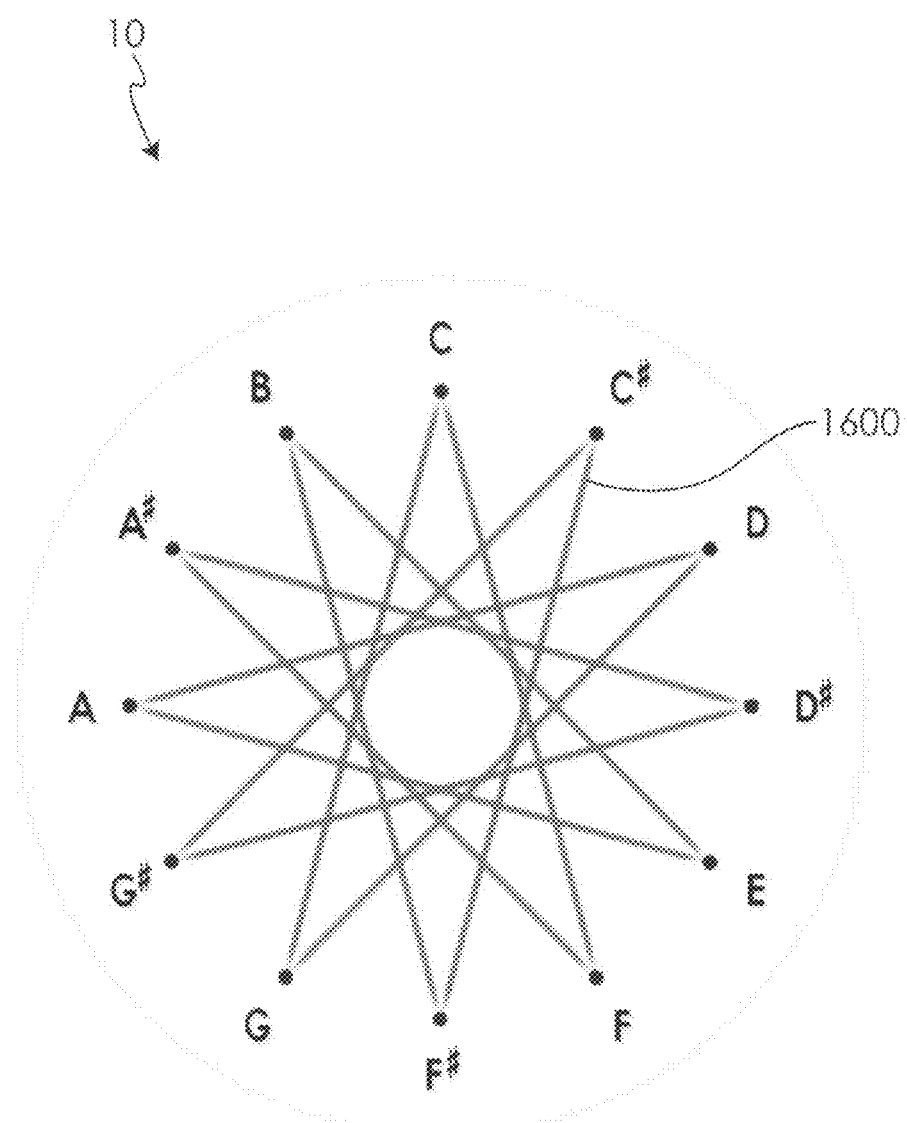
FIG. 16 is a diagram of a twelve-tone circle showing the circle of fifths.

Arriving at the perfect fourth interval 20, as shown in FIG. 16, we encounter something special. Connecting every fifth point around the circle 10 creates a very interesting shape. Star-like in structure, blue in color, this pattern of connected perfect fourths is referred to, in musical terms, as the circle of fifths 1600. It is perhaps the most important pattern in all of music. Not only is this pattern the basis of the various key signatures (the coding of 'flats' and 'sharps' which is used to communicate which scale a particular piece is centered around), but it is also, arguably, the most powerful training pattern that exists. The circle of fifths 1600, like the chromatic scale 30, touches each of the twelve possible notes 10.1-10.12 of the twelve-tone circle 10 before returning to its point of origin. Following the circle of fifths 1600 during training exercises will insure that each musical structure has been played in every possible key. The importance of the circle of fifths 1600 is encountered again and again throughout the study of music.

Figure 17:
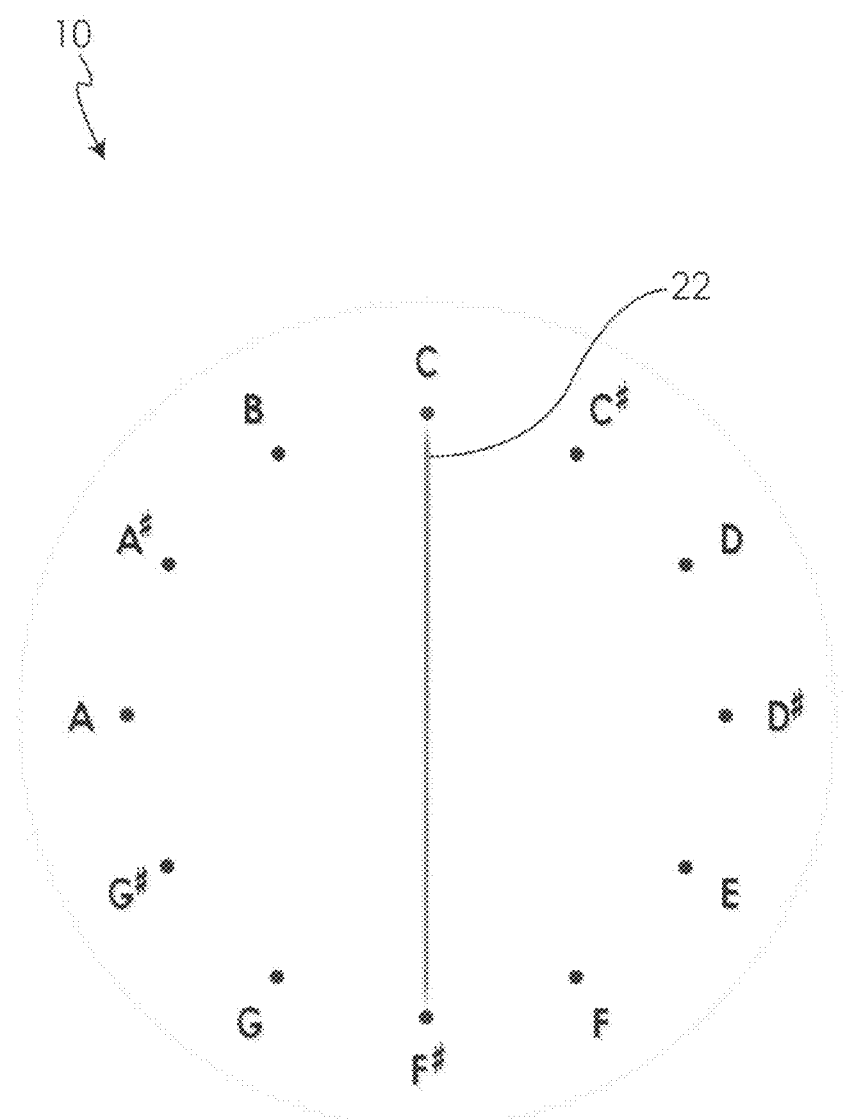
FIG. 17 is a diagram of a twelve-tone circle showing a first tri-tone.
Figure 18:
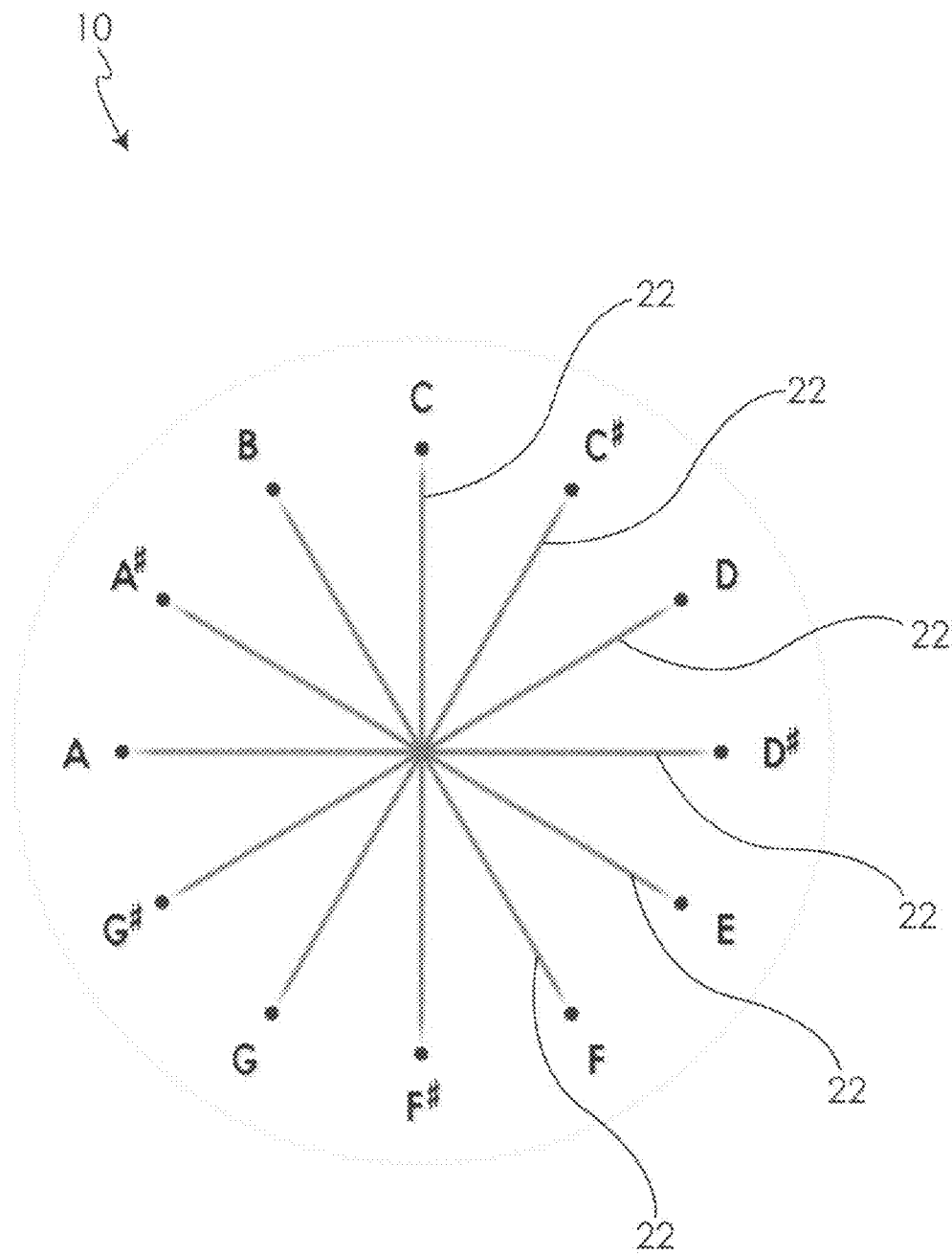
FIG. 18 is a diagram of a twelve-tone circle showing all six tri-tones.

The last of the intervals, the tri-tone interval 22, is without-a-doubt the most important of the two-note shapes. Referring to FIGS. 17 and 18, extending the tri-tone interval 22 around the circle 10 takes us to the circle's opposite pole. In other words, the tri-tone interval 22 cuts the twelve-tone circle 10 exactly in half. Purple in color, the extended tri-tone interval 22 remains a two note shape (leaping six notes at a time takes you back to your starting point in only two jumps) and, since two goes into twelve six times, six tri-tones are needed before the circle of twelve points is completely filled in. The tri-tone is the keystone of the twelve-tone circle 10. Sticking to the previously demonstrated pattern, two goes into twelve six times. Thus, there are six possible tri-tones 22 (six diameter lines) within the circle 10 of twelve notes. Musically speaking, the tri-tone is dissonant (clashing) and is, for most people, very difficult to learn, but learning to accurately sing and hear the tri-tone will result in one's acquisition of 'perfect intonation' (keeping every note 'in tune') and eventual 'perfect pitch' (knowing exactly which notes have been played or sung just from having heard them). The tri-tone is so dissonant that early musicians called it the 'devil tone' and tried to avoid it at all costs.

The next generation of MASTER KEY™ diagrams is based upon musical shapes that are built with three notes. In musical terms, three note structures are referred to as triads. There are only four triads in all of diatonic music, and they have the respective names of major, minor, diminished, and augmented. These four, three-note shapes are represented in the MASTER KEY™ diagrams as different sized triangles, each built with various color coded intervals. Triads are very important in music, as they form the basic structures of musical sound upon which all else is added.

Figure 19:
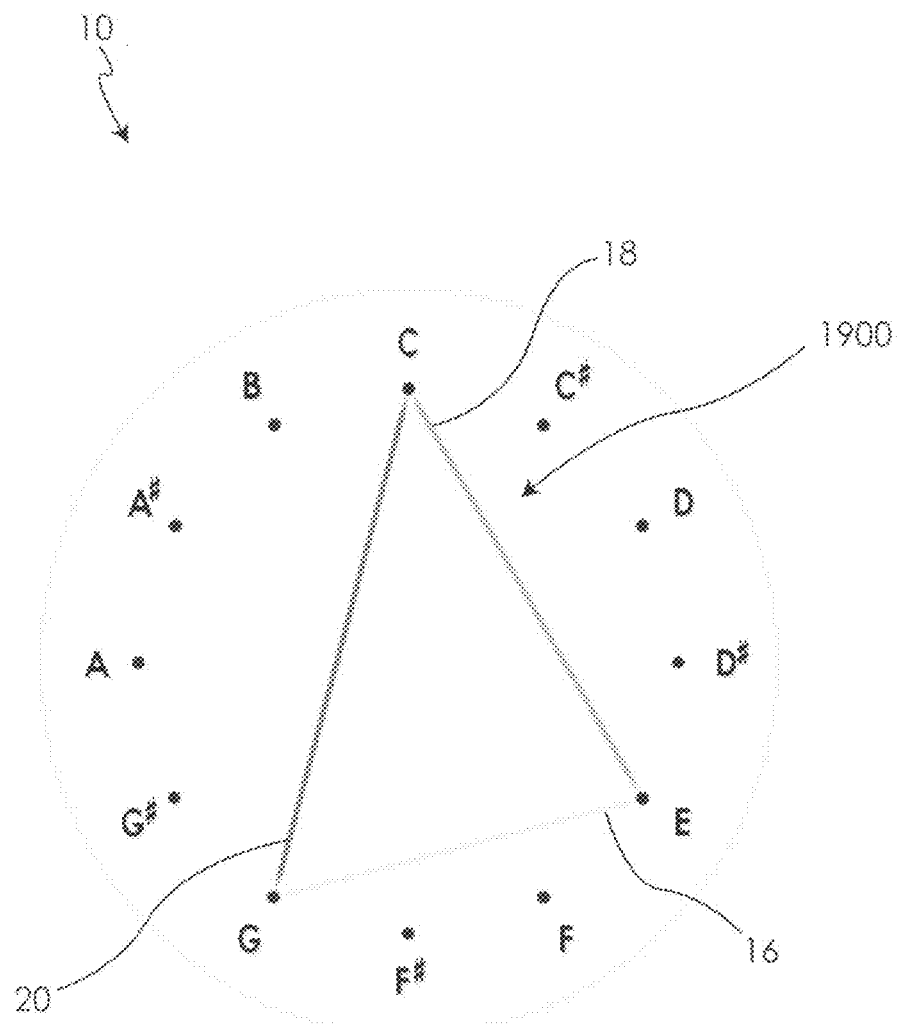
FIG. 19 is a diagram of a twelve-tone circle showing a major triad.

As can be seen in FIG. 19, the first of the triads, the major triad 1900, is built by stacking (in a clockwise direction) a major third 18, a minor third 16, and then a perfect fourth 20. In the major triad 1900 diagram, the shape is represented by a triangle with three sides in the respective colors of green, yellow, and blue. The spacing of the lines is also constant and predictable, following the already stated guidelines of the six possible intervals. As played, the major triad sounds 'happy.'

Figure 20:
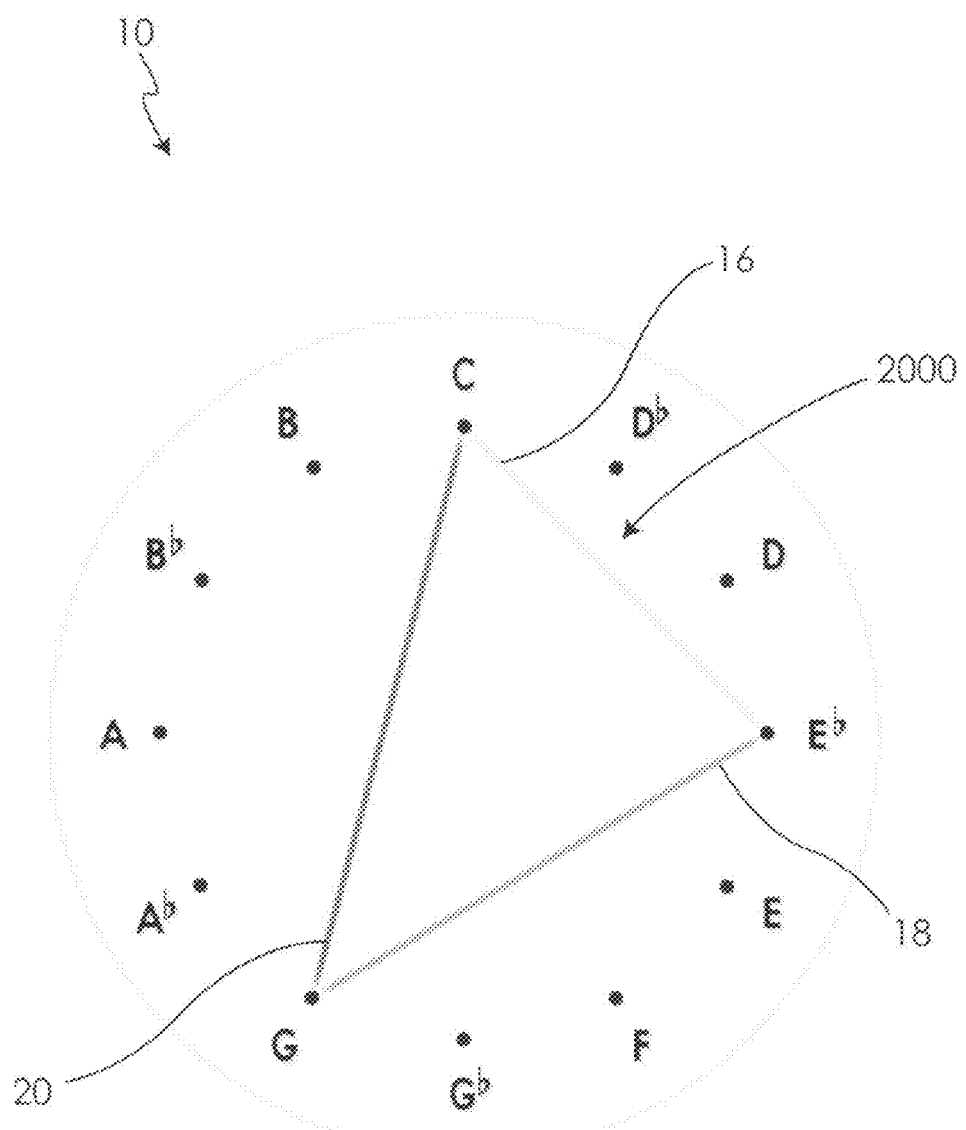
FIG. 20 is a diagram of a twelve-tone circle showing a minor triad.

The second triad, as seen in FIG. 20, is the minor triad 2000, and is built by stacking a minor third 16, a major third 18, and then a perfect fourth 20 (also in a clockwise order.) The respective colors of the sides of this triangle are yellow, then green, and then blue. As played, the minor triad 2000 sounds 'sad.'

Figure 21:
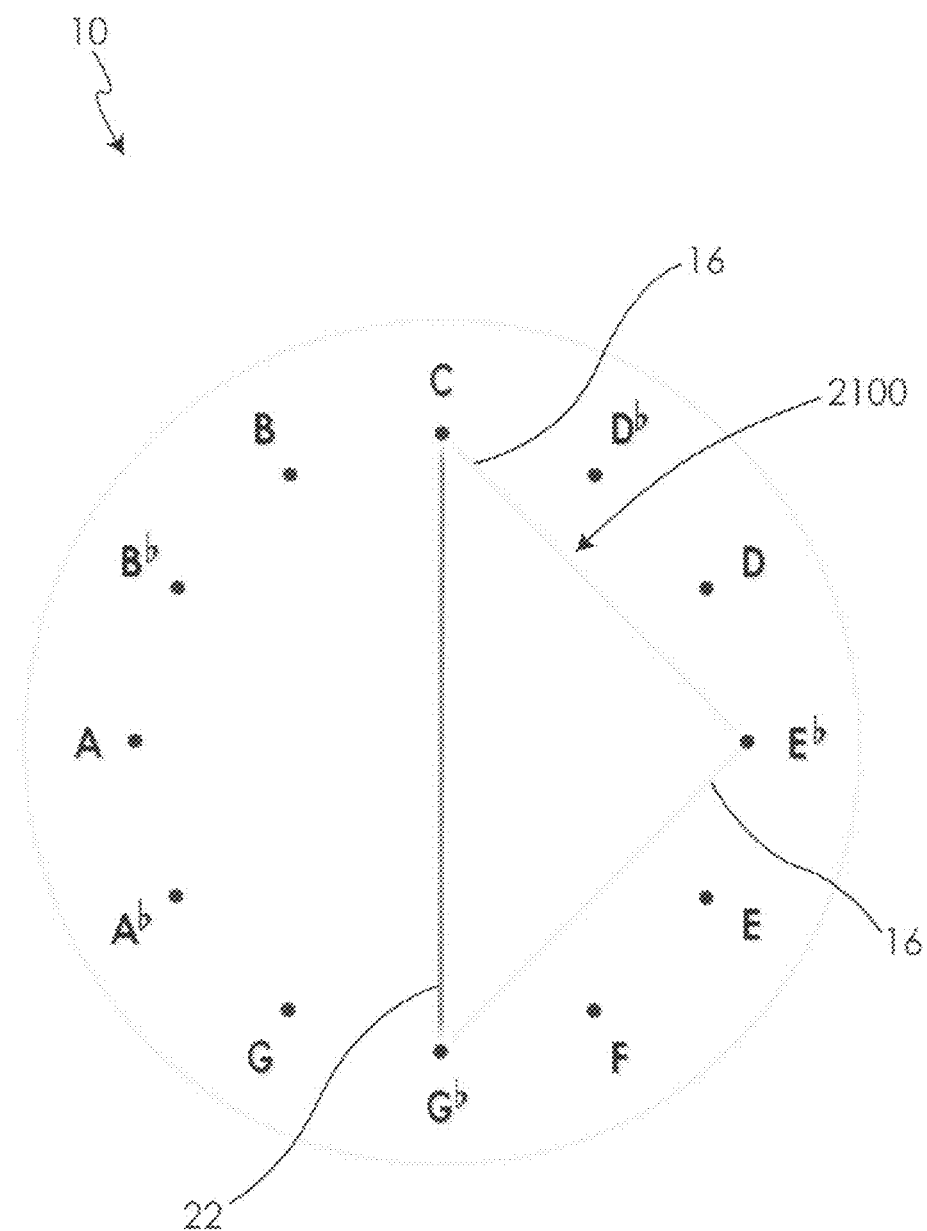
FIG. 21 is a diagram of a twelve-tone circle showing a diminished triad.

The third triad, the diminished triad 2100, is shown in FIG. 21 and is created by stacking two minor thirds 16, followed by a tri-tone 22. The colors of this triangle are respectively yellow, yellow, and purple. As played, the sound of the diminished triad 2100 is perhaps best described as 'scary.' The diminished triad 2100 was often used in silent movies at points of dramatic climax.

Figure 22:
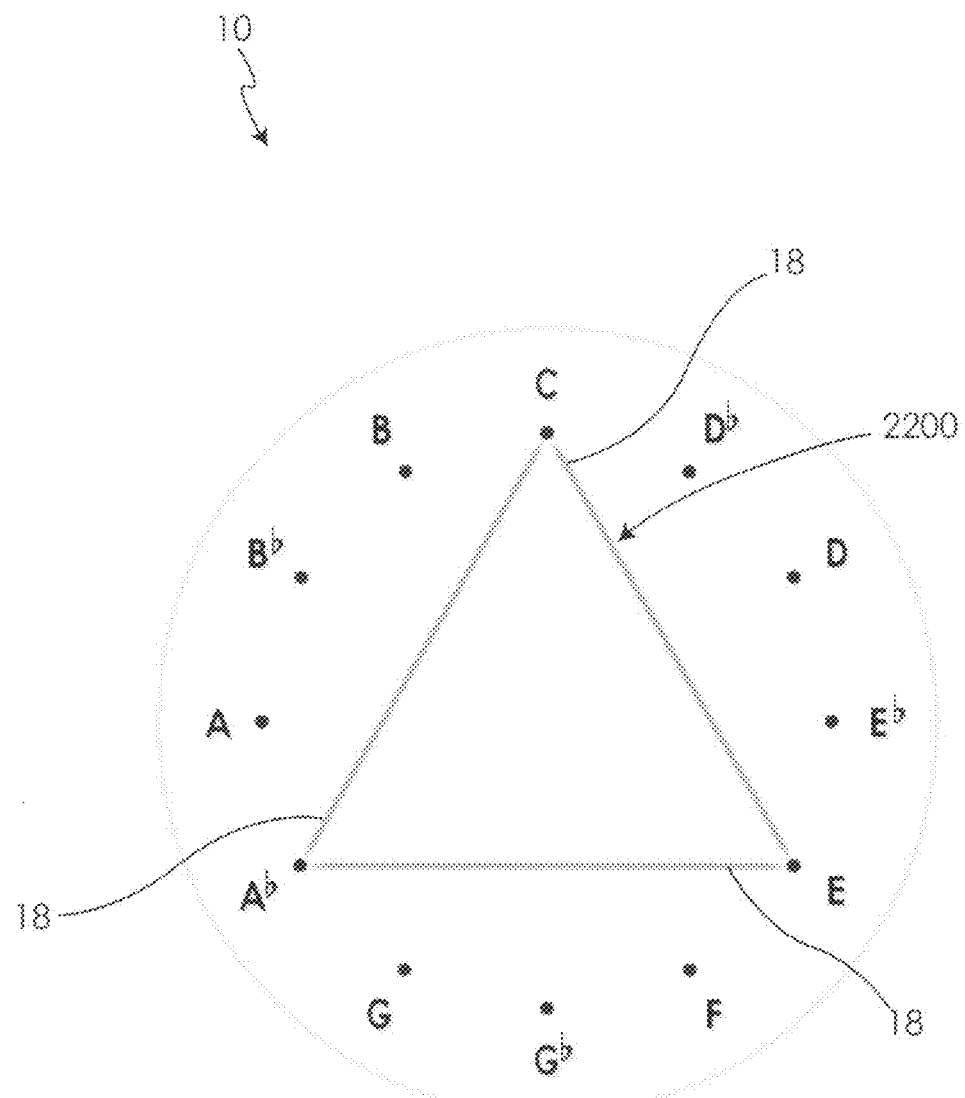
FIG. 22 is a diagram of a twelve-tone circle showing an augmented triad.

The last triad, the augmented triad 2200, is shown in FIG. 22 and is created by stacking three consecutive major thirds 18. A perfect equilateral triangle, the augmented triad 2200 is exactly the same as the augmented scale 1100. As seen in FIG. 22, the augmented triad 2200 is totally green in color. When played, the sound of the augmented chord 2200 can perhaps best be related to the world of cartoons. The augmented chord/scale 2200/1100 is frequently played while a cartoon character is 'seeing stars' after being hit on the head. The word 'dreamy' might best describe its sound.

The next group of MASTER KEY™ diagrams is developed from four notes at a time. Four note chords, in music, are referred to as seventh chords. There are nine types of seventh chords presented in the MASTER KEY™ diagrams. While there are jazz chords that are five, six, and even seven note chords, the four note chords act as a true basis for understanding music. Combining the four-note shapes in various ways can generate any larger jazz chord. The respective names of the seventh chords are as follows: major seventh, dominant seventh, minor seventh, half-diminished seventh, fully-diminished seventh, minor-major seventh, augmented-major seventh, augmented flat-seventh, and flat-five seventh.

Figure 23:
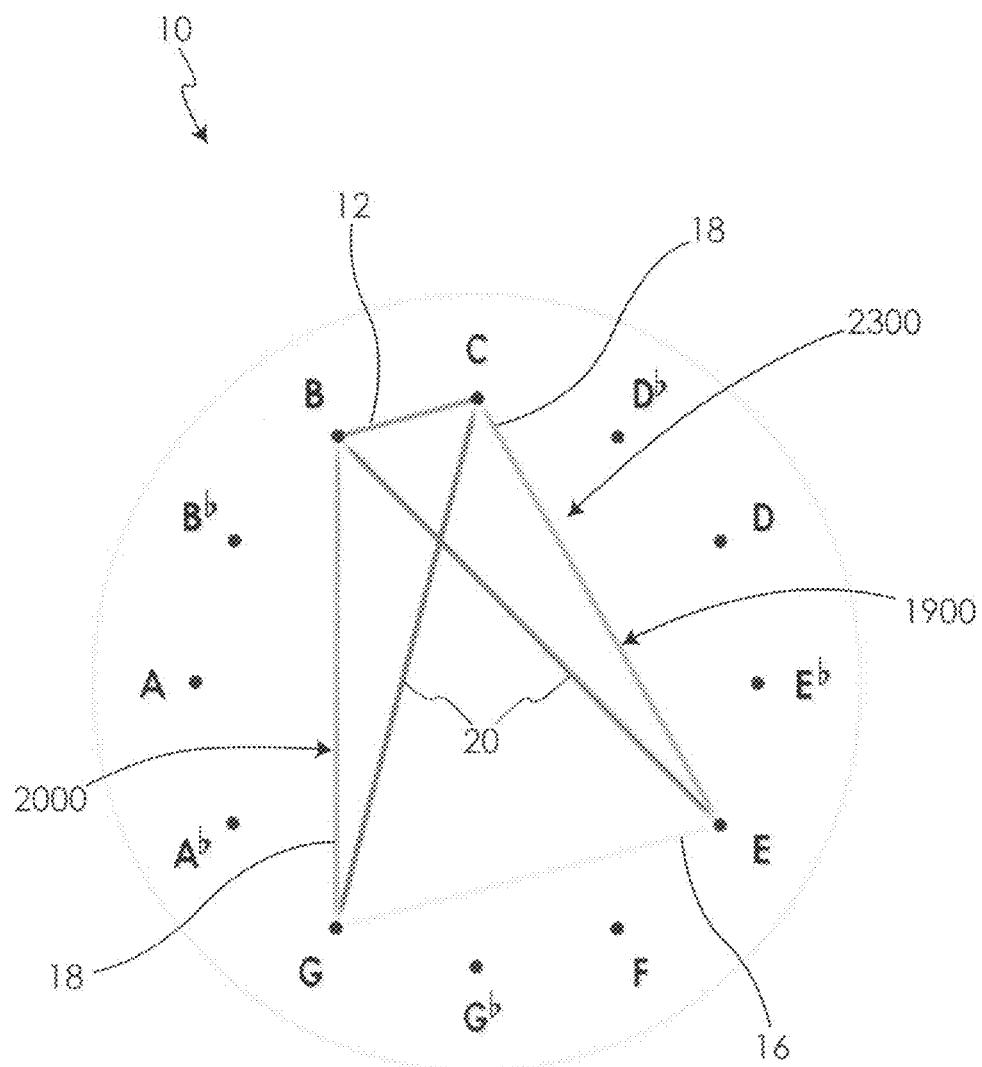
FIG. 23 is a diagram of a twelve-tone circle showing a major seventh chord.

FIG. 23 shows the diagram of the first seventh chord, the major seventh chord 2300, which is created by stacking the following intervals (as always, in a clockwise manner): a major third, a minor third 16, another major third 18, and a half step 12. The above description reveals the outer shell of the major seventh chord 2300 (a four-sided polyhedron); however, general observation will quickly reveal a new pair of 'internal' intervals, which haven't been seen in previous diagrams (in this instance, two perfect fourths 20). This is simply due to the nature of a four-sided pattern and the result of connecting every point to every other point. Closer inspection will reveal previously described three-note shapes now found in new combination with one another In this instance, a major triad 1900 and a minor triad 2000 are over-lapped to create the more advanced major seventh chord 2300. Each four note shape, like every other shape, has its own unique sound. However, the complexity of description now begins to increase. The major seventh chord 2300 has the 'happy' major triad 1900 as its base and an extra 'easing' tone that reduces clarity and stability, making the major seventh chord 2300 sound both 'pleasing' and 'wistful.'

Figure 24:
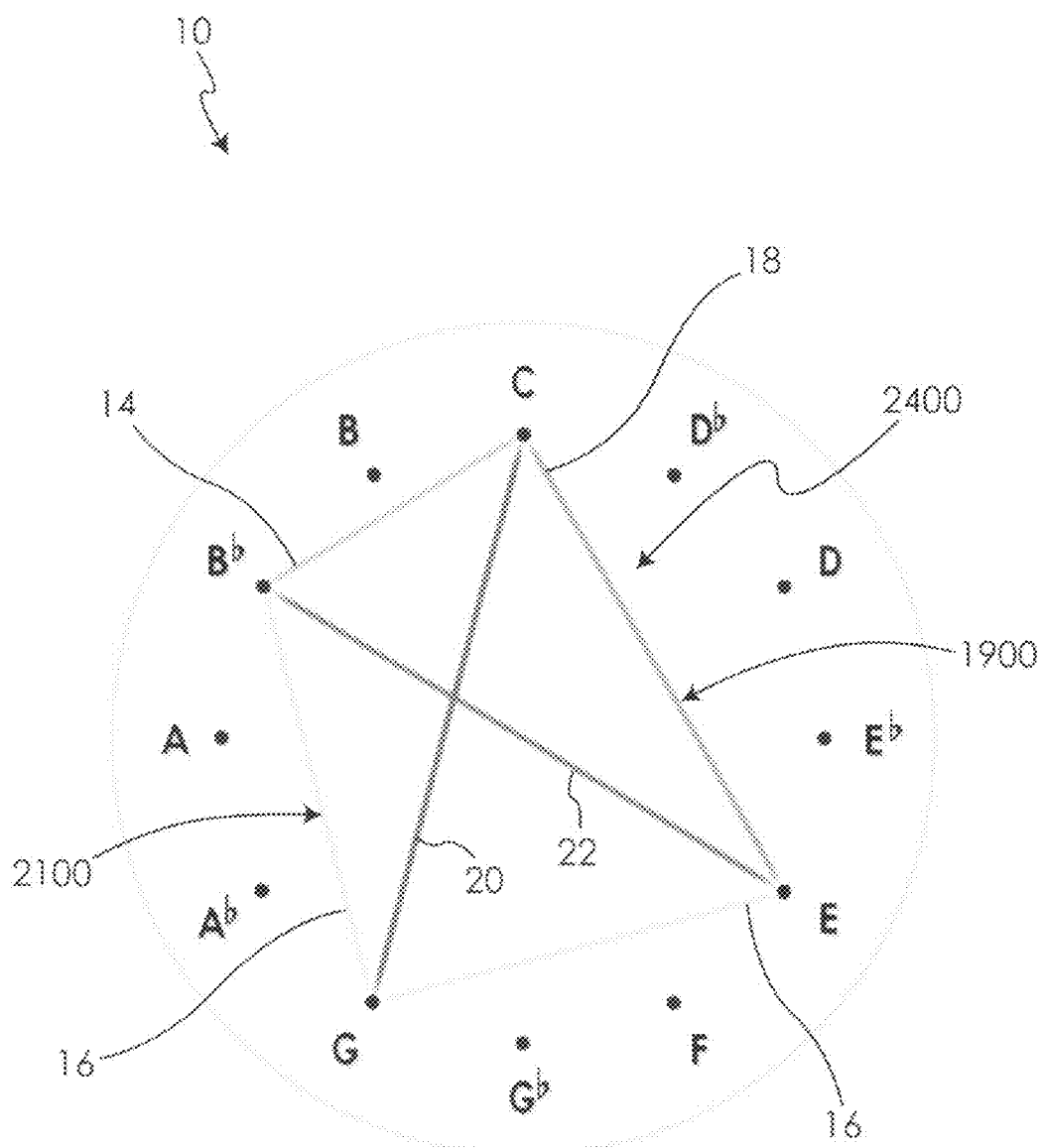
FIG. 24 is a diagram of a twelve-tone circle showing a dominant seventh chord.

The next diagram is the dominant seventh chord, as shown in FIG. 24 and indicated generally at 2400. This shape 2400 is created by consecutively stacking a major third 18, a minor third 16, another minor third 16, and a whole step 14. The internal intervals of this shape are the perfect fourth 20 and the tri-tone 22. This shape 2400 can also be understood as the overlapping of a major triad 1900 with a diminished triad 2100. As played, the resulting sound can perhaps best be described as 'happy,' and yet with a tendency towards motion. The dominant seventh chord 2400 is found very frequently in practically every genre of music. It is perhaps the most important of the seventh chords in that it is most often used as the second to last chord in musical endings. This transition, from a dominant seventh chord 2400 to either a major triad 1900 or minor triad 2000, is called a 'cadence.' The 'cadence' is how composers establish solidity in musical composition. On a more practical note, the sound of the dominant seventh chord is perhaps most readily associated with 'The Blues.'

Figure 25:
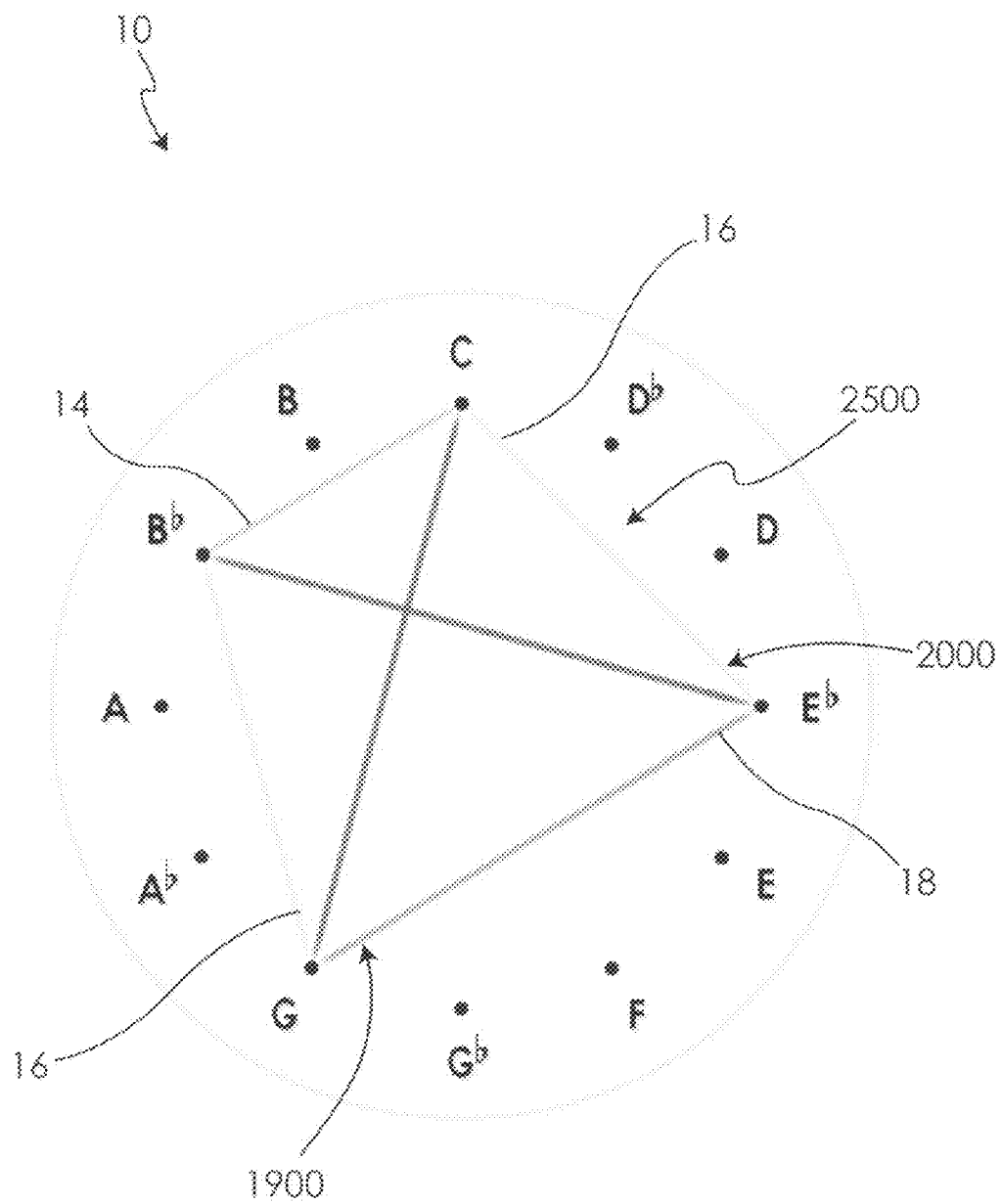
FIG. 25 is a diagram of a twelve-tone circle showing a minor seventh chord.

Now referring to FIG. 25, we next encounter the minor seventh chord, indicated generally at 25.00. Stacking the intervals of a minor third 16, a major third 18, another minor third 16, and a whole step 14 leaves us with the distinguishable shape of a minor seventh chord 2500. The internal intervals of this shape are, once again, two perfect fourths 20. A minor triad 2000 overlapped with a major triad 1900 will also suffice in describing this four note pattern. The minor seventh chord 2500 is mathematically the most frequently encountered seventh chord in music. The minor seventh chord 2500 has the minor triad 2000 as its foundation and, therefore, it is darker, less happy, and has a more-intense sound than either the major seventh chord 2300 or dominant seventh chord 2400. It is also found in practically every classification of music that exists. Like the dominant seventh chord 2400, the minor seventh chord 2500 also has a tendency to suggest motion.

Figure 26:
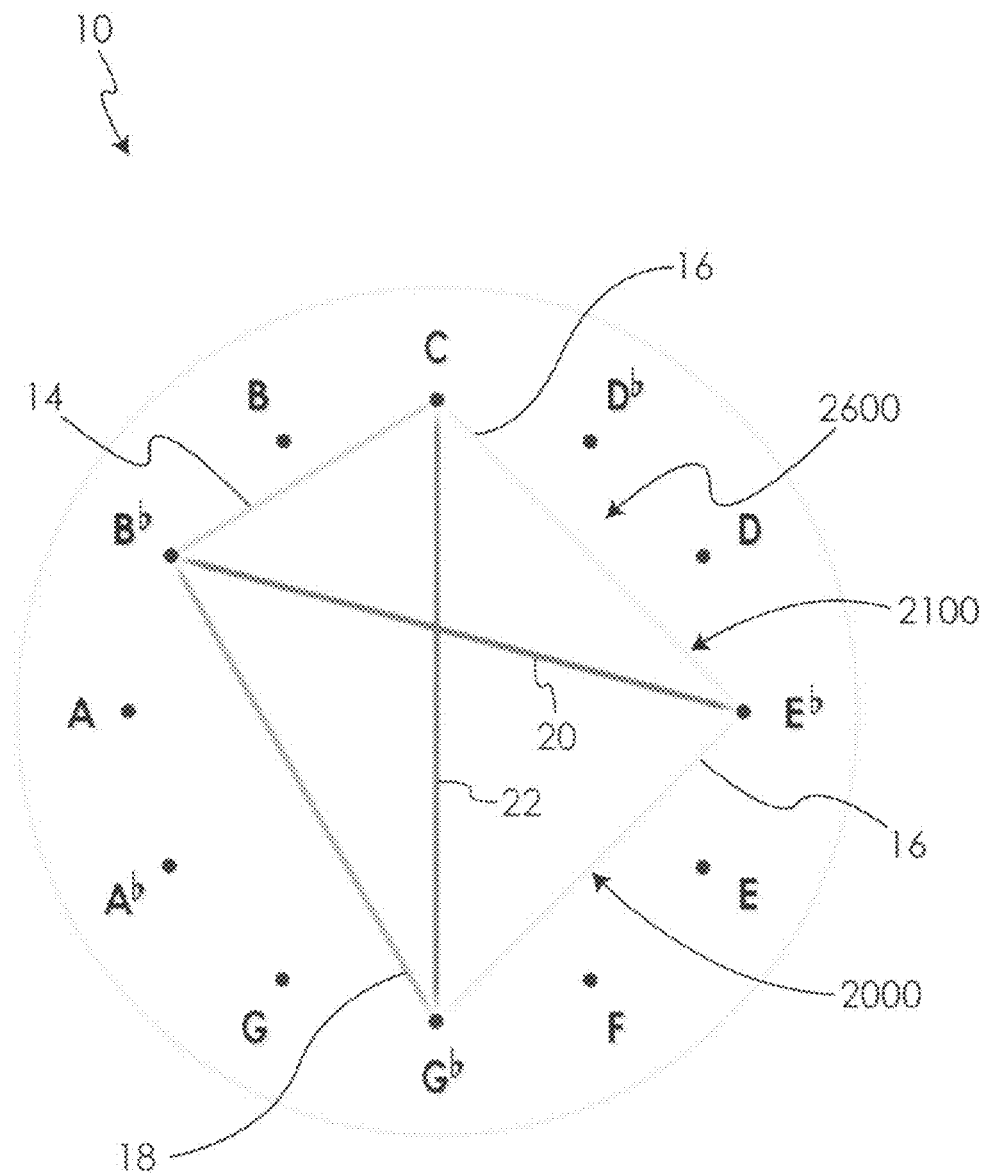
FIG. 26 is a diagram of a twelve-tone circle showing a half-diminished seventh chord.

The half-diminished seventh chord, as shown in FIG. 26 and indicated generally at 2600, is built by consecutively stacking two minor thirds 16, a major third 18, and a whole step 14. A tri-tone 22 and a perfect fourth 20 are its internal intervals, and its two recognizable three note shapes are the combined diminished triad 2100 and minor triad 2000. The half-diminished seventh chord 2600 is not as common as the three previously-described chords, yet it is still found in most musical genres. 'Delicate' and 'beautiful,' the sound of the half-diminished seventh chord 2600 wasn't commonplace in orchestral music until midway through the 1800's. At that point in time, the 'Romantic' era was ushering in the use of maximum color and diversity in music, and the half-diminished seventh chord 2600 came into vogue.

Figure 27:
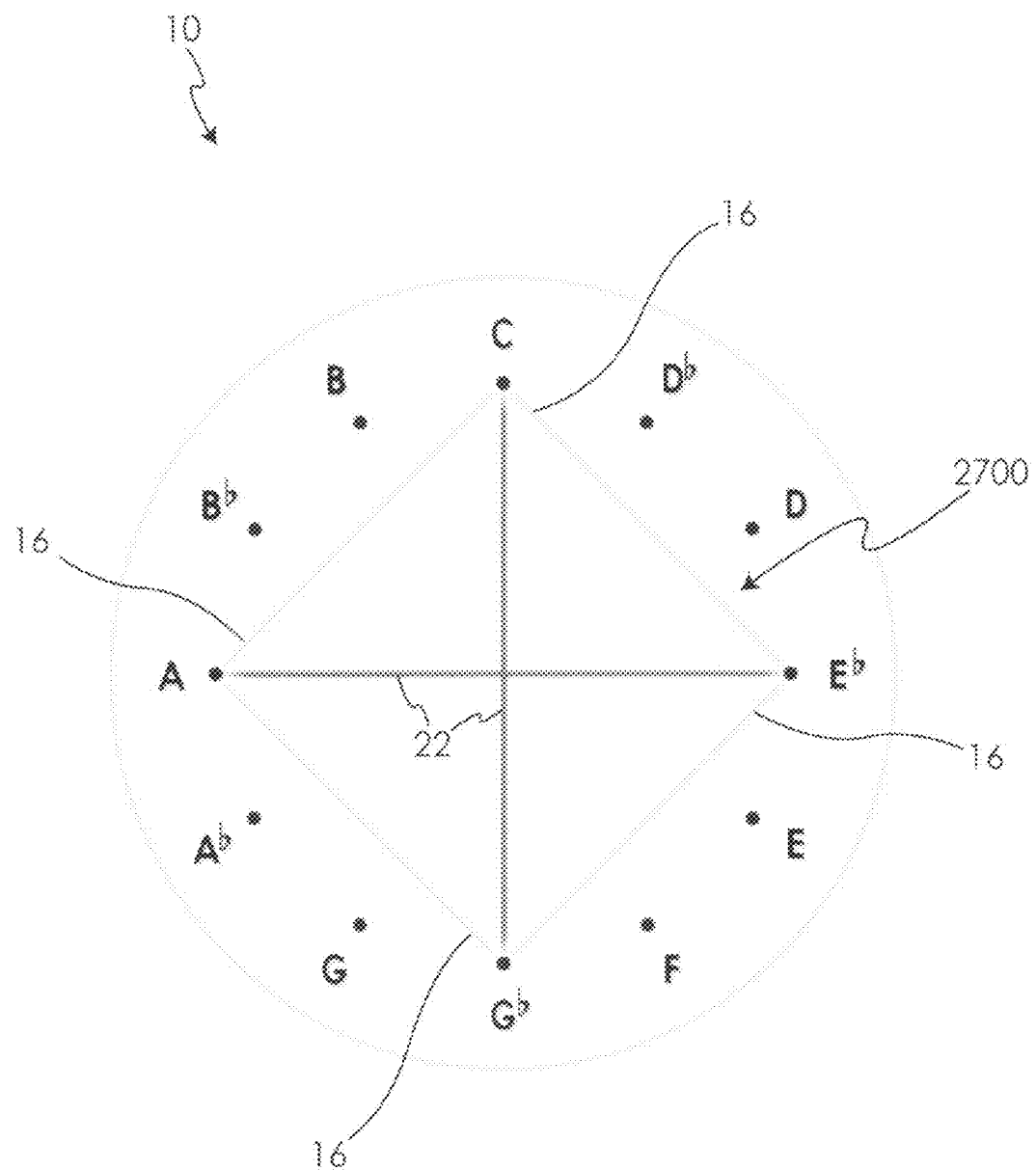
FIG. 27 is a diagram of a twelve-tone circle showing a fully-diminished seventh chord.

As can be seen in FIG. 27, stacking four consecutive minor thirds 16 gives us the fully-diminished seventh chord, indicated generally at 2700. The same pattern as the diminished scale, the fully diminished seventh chord 2700 is perfectly square in shape. The internal intervals of two tri-tones 22 effectively subdivide the square into four equal sections. The most important aspect of the shape of the fully-diminished seventh chord 2700 is that it is completely symmetrical in nature. Because of this balance, the fully diminished seventh chord 2700 has no "root" or bottom point and is completely unbiased in its direction of focus. In other words, after moving into a fully-diminished seventh chord 2700, a composer can leap in any possible direction around the twelve-tone circle 10. The fully diminished seventh chord 2700, then, is often used to pivot the larger patterns, like the scales, in this manner. The sound of the fully diminished seventh chord 2700 can, again, best be associated with its use during silent movies at critical moments of heightened tension, e.g., a woman tied to the railroad tracks. The fully-diminished seventh chord 2700 is almost always used to enhance the sense of motion, or movement, of music.

Figure 28:
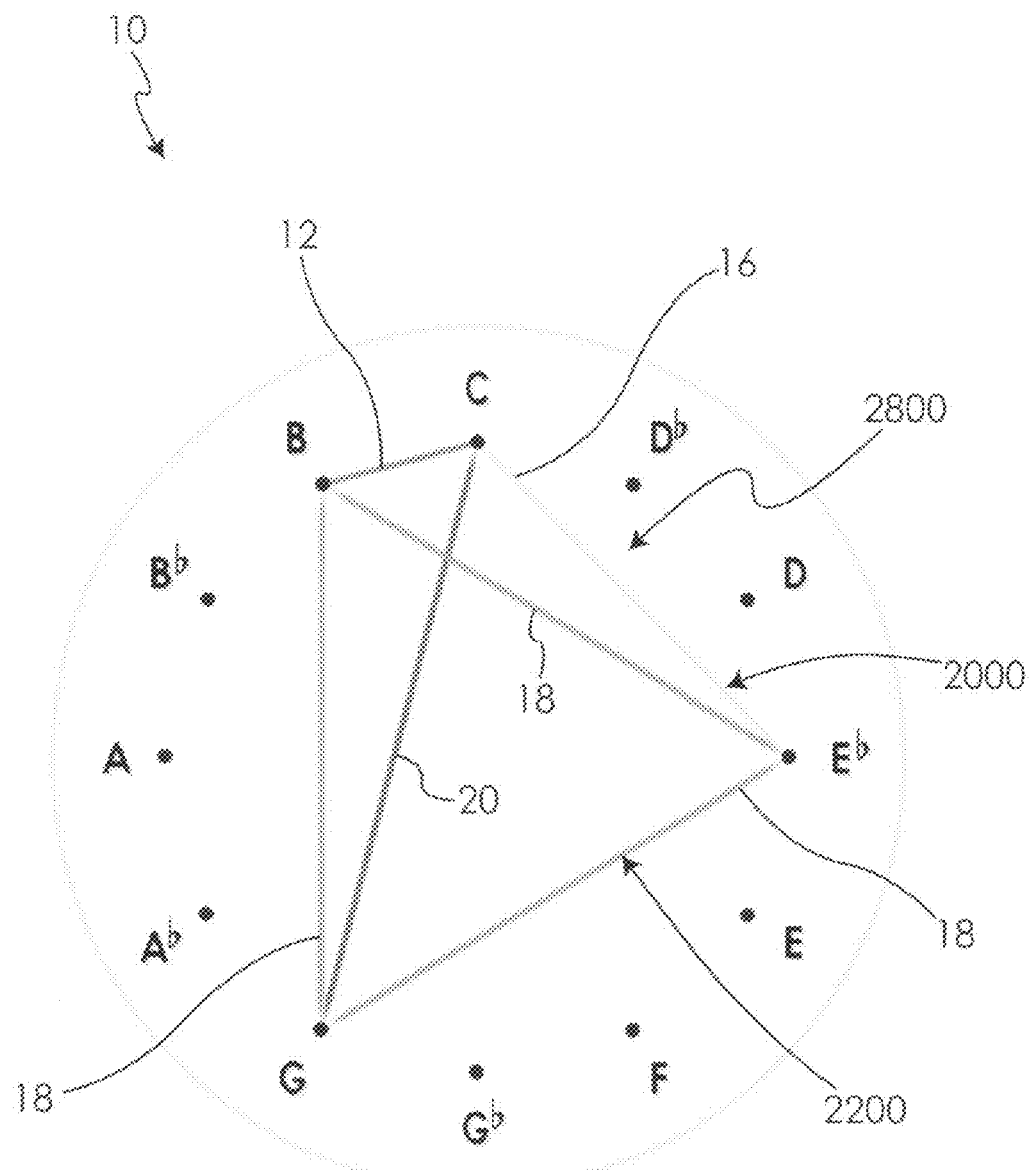
FIG. 28 is a diagram of a twelve-tone circle showing a minor-major seventh chord.

The sixth four note shape is that of the minor-major seventh chord. This chord, as shown in FIG. 28 and indicated generally at 2800, is built by consecutively stacking a minor third 16, two major thirds 18, and a half step 12. The internal intervals are a major third 18 and a perfect fourth 20. A minor triad 2000 and an augmented triad 2200 can easily be seen as the subcomponents of this larger, four note structure. The minor major seventh chord 2800 is much less commonly heard than the previously described seventh chords. Rather dissonant and 'unsettling' by nature, this four note structure has both the 'sad' sound of the minor triad 2000 combined with the 'dreamy' sound of the augmented triad 2200. Perhaps its most common affiliation is with the James Bond films, where it is used in a great many instances to mark a scene change, particularly after Bond has killed someone.

Figure 29:
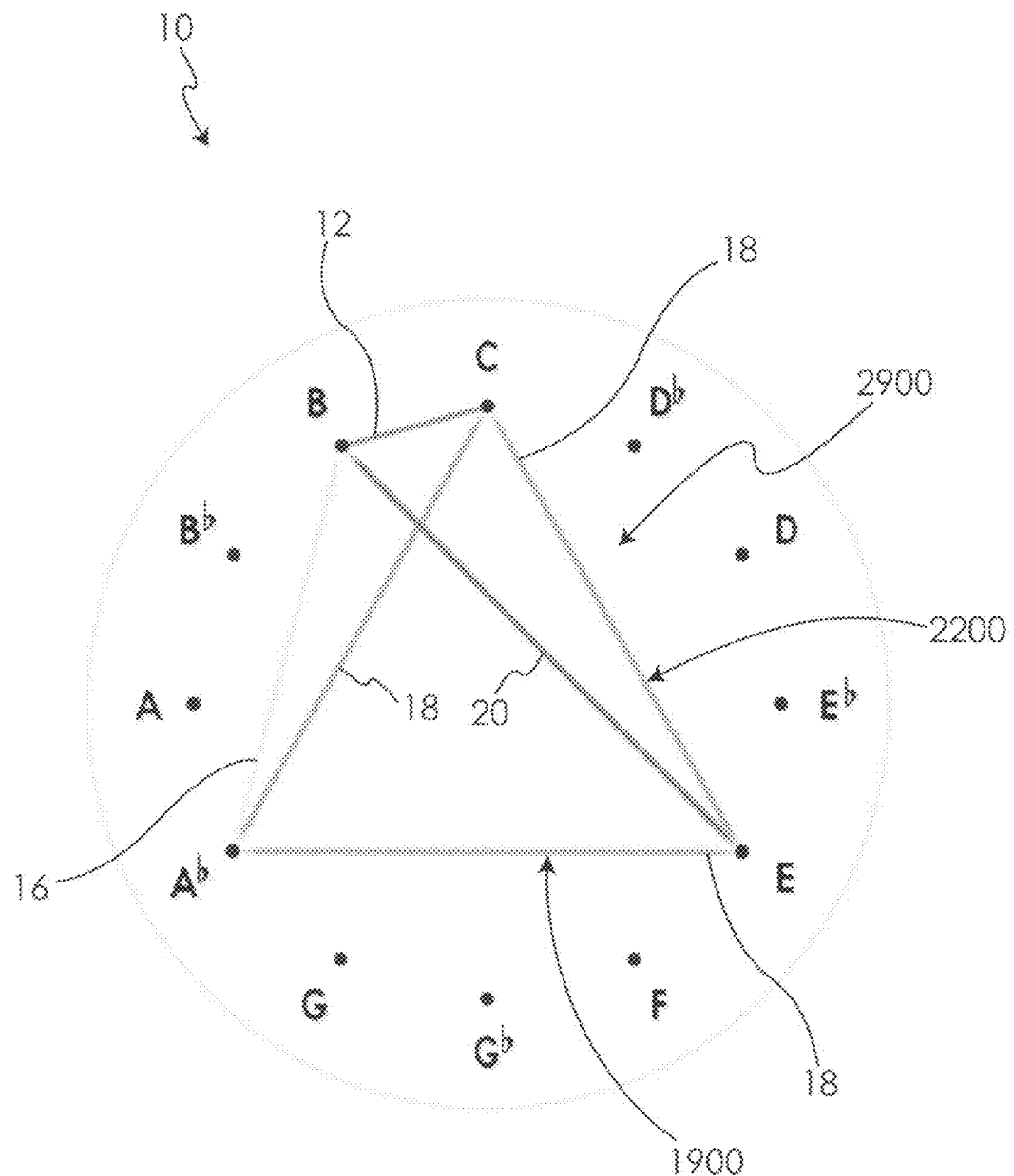
FIG. 29 is a diagram of a twelve-tone circle showing an augmented-major seventh chord.

The most unfamiliar, and least heard, of the four note shapes is definitely the augmented-major seventh chord. As is shown in FIG. 29, the augmented-major minor seventh chord

2900 is formed by stacking two major thirds 18, a minor third 16, and a half step 12. This results result in the most uncommon of the four note shapes. A perfect fourth 20 and a major third 18 make up the internal intervals, and an augmented triad 2200, overlapped with a less obvious major triad 1900, result in the sub-structure of this unique, four-sided polyhedron. The augmented-major seventh chord 2900 is very rare and is not often encountered in most music.

Figure 30:
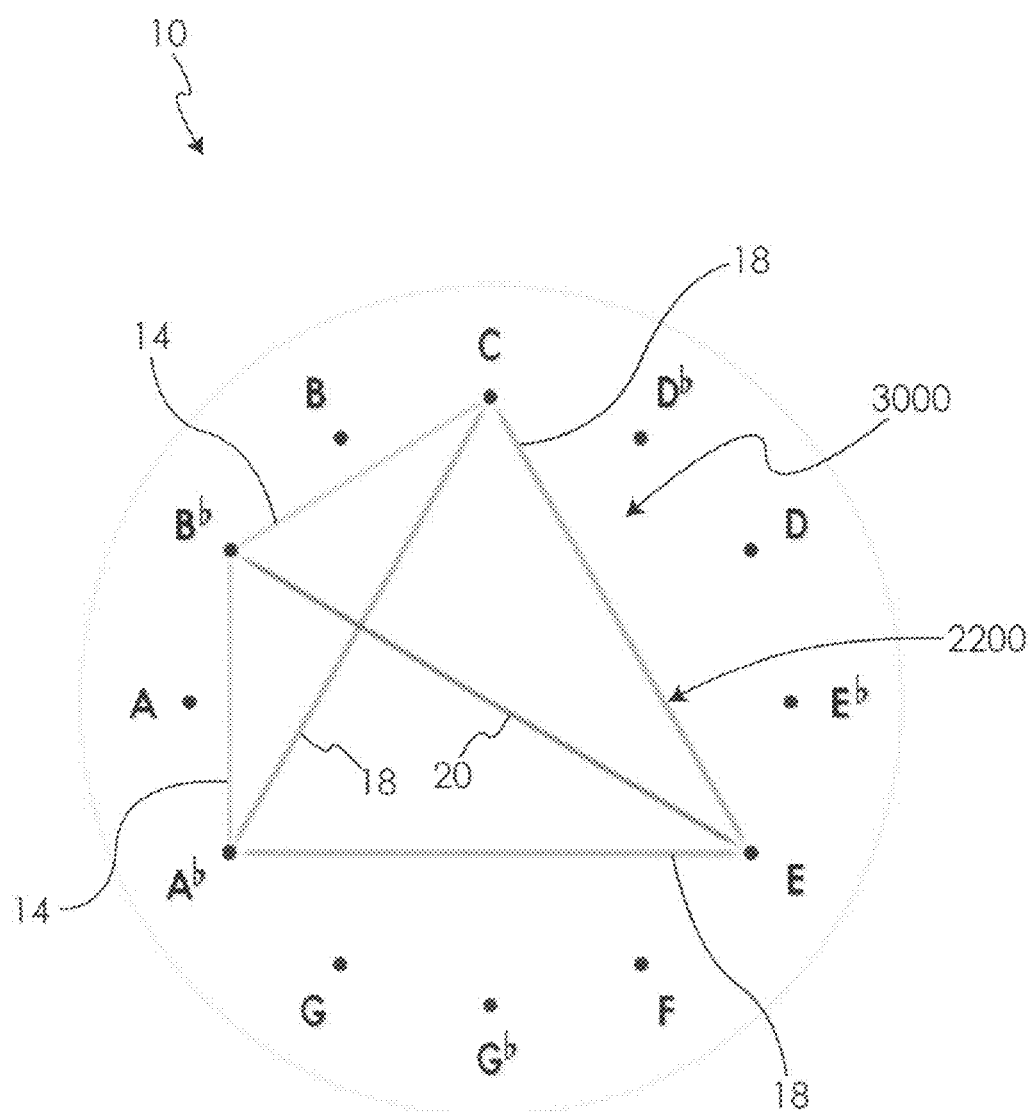
FIG. 30 is a diagram of a twelve-tone circle showing an augmented flat-seventh chord.
Figure 31:
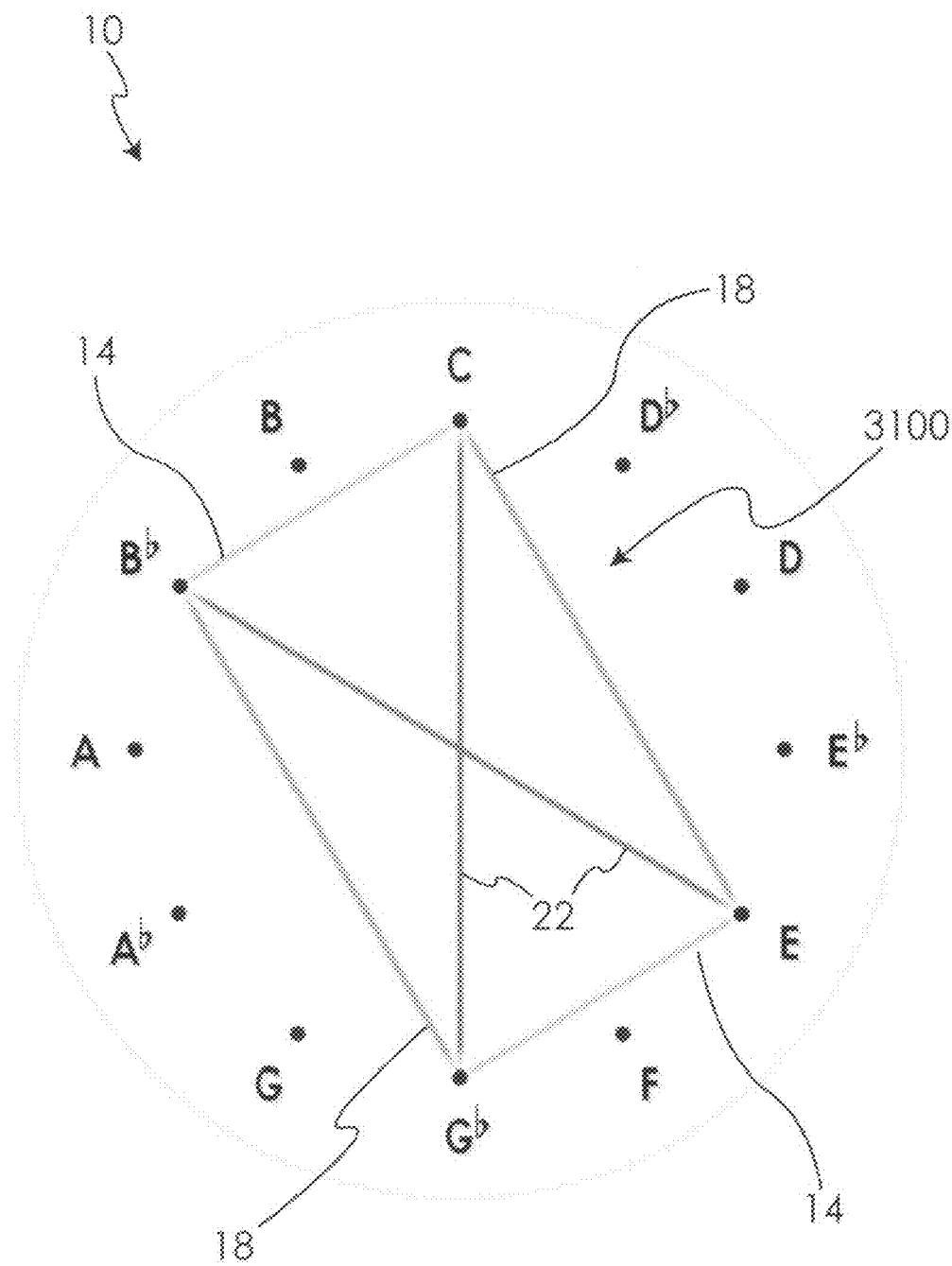
FIG. 31 is a diagram of a twelve-tone circle showing a flat five seventh chord.

The last two types of seventh chords are found primarily in jazz and twentieth century music and will be discussed together. The first of these chords, shown in FIG. 30 and indicated generally at 3000, is the augmented flat-seventh chord. It is made by consecutively stacking two major thirds 18 and two whole steps 14. Internal intervals are a major third 18 and a tri-tone 22. Shown in FIG. 31 and indicated generally at 3100, the flat five seventh chord is made by consecutively stacking a major third 18, a whole step 14, another major third 18, and another whole step 14. Internal intervals are two tri-tones 22. These last two seventh chords are unique, because they are not made, as were the seven previously described chords, by combining two triads. The augmented flat seventh chord 3000 obviously uses the augmented chord 2200 as its base, with the fourth note (the flat seventh) giving the chord a dominant seventh feel. The flat five seventh chord 3100 also has the dominant seventh feel and yet no specific triad can be traced to its foundation. Notice that both of these chords are more symmetrical in shape than the rest of the seventh-chords. These sounds are found primarily in jazz and in modern music as moments of highlight or emphasis. Stevie Wonder uses these chords frequently, as did George Gershwin.

Aside from their lopsided nature, the scales remain to this day the absolute foundation of the world's musical system. Every musical structure that has been presented thus far in the MASTER KEY™ diagrams of FIGS. 1-31, aside from the six basic intervals, has come directly out of the three main scales.

Scales are seven note patterns. These seven notes, also formulated by stacking various, consecutive intervals, are repeated over and over, in an endless cycle, thereby filling in the complete auditory range of any instrument. Three scales make up the virtual entirety of all diatonic music. Different scales can be found in places like India, the Middle East, and the Orient; but in most cases these 'foreign scales' can still be overlapped with the three main scales of the diatonic world. The three main scales are as follows: the Major Scale, the Harmonic-Minor Scale, and the Melodic-Minor Scale.

Figure 32:
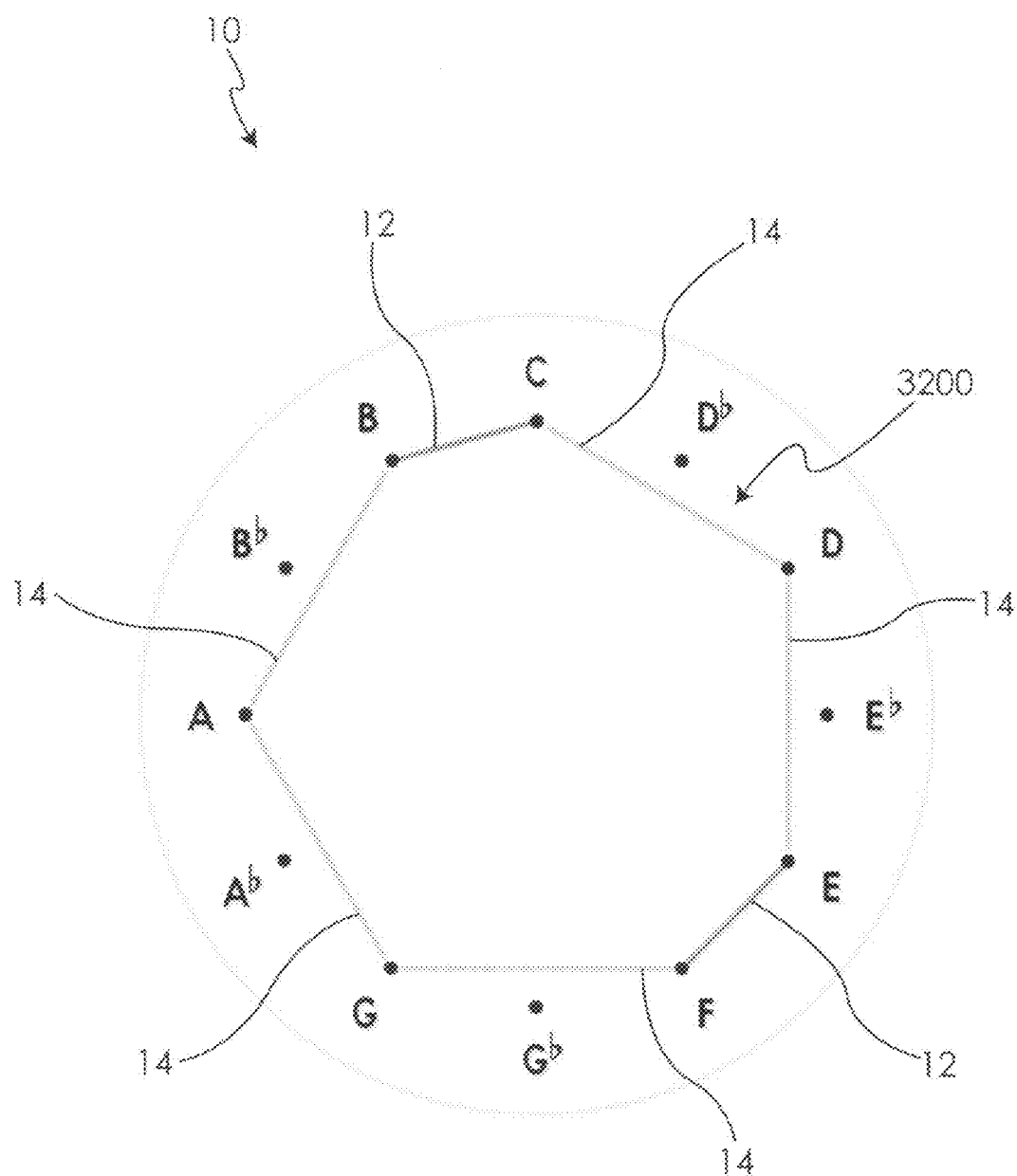
FIG. 32 is a diagram of a twelve-tone circle showing a major scale.

The major scale is the most common of the three main scales; it is heard virtually every time music is played or listened to in the western world. As shown in FIG. 32 and indicated generally at 3200, the MASTER KEY™ diagram clearly shows the major scale's 3200 makeup and its naturally lopsided nature. Starting at the top of the circle 10, one travels clockwise around the scale's outer shell. The following pattern of intervals is then encountered: whole step 14, whole step 14, half step 12, whole step 14, whole step 14, whole step 14, half step 12. The most important aspect of each scale diagram is, without a doubt, the diagram's outer 'shell.' Therefore, the various internal intervals in the scale's interior are not shown. Since we started at point 10.12, or C, the scale 3200 is the C major scale. Other major scales may be created by starting at one of the other notes on the twelve-tone circle 10. For example, if we start at point 10.4, which corresponds to the note E, and trace out the whole step and half step pattern of the major scale, we will create the E major scale (not shown).

Figure 33:
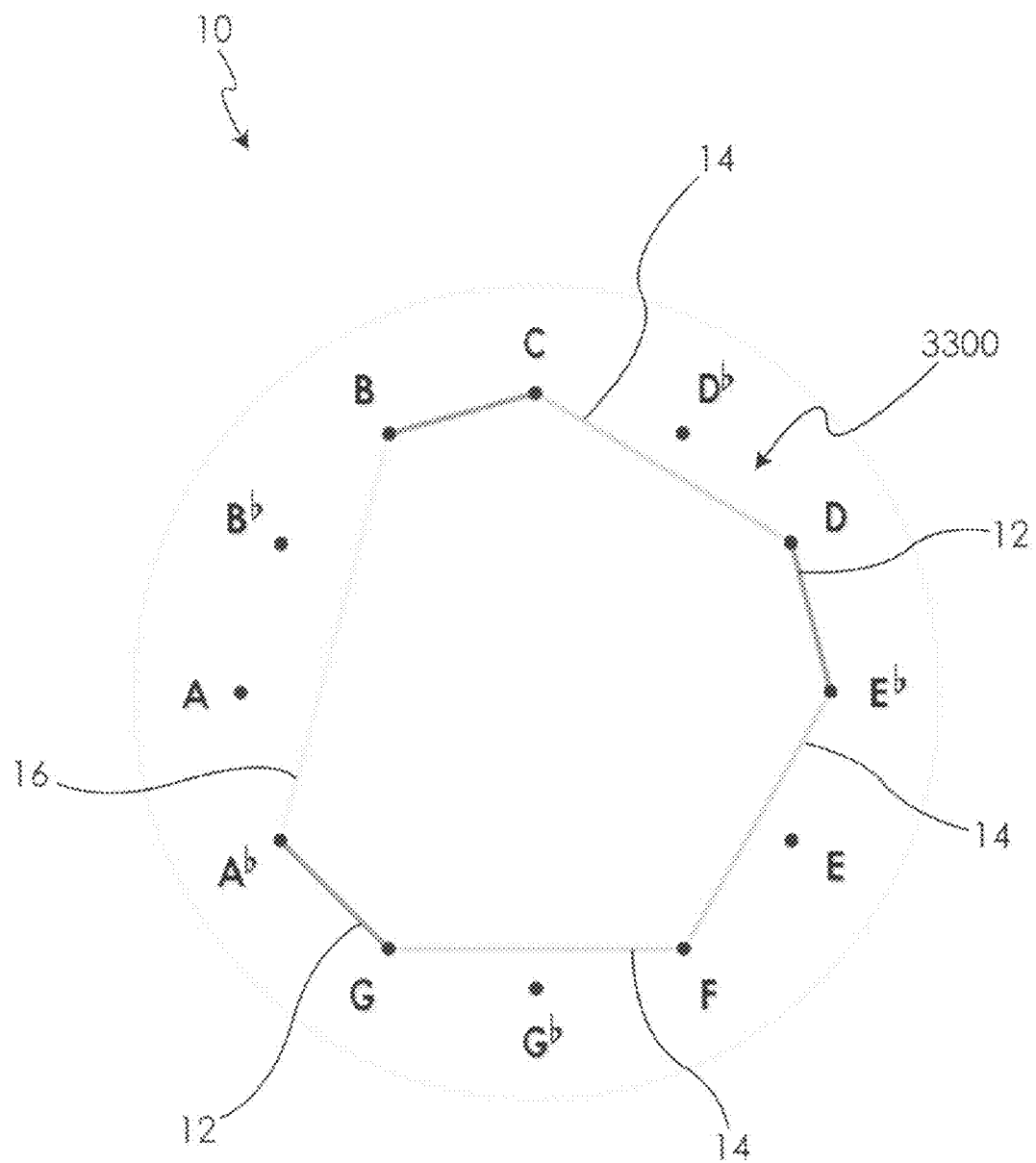
FIG. 33 is a diagram of a twelve-tone circle showing a harmonic minor scale.

The harmonic minor scale is shown in FIG. 33 and indicated generally at 3300. The harmonic minor scale 3300 is made up of the following, consecutively stacked intervals: whole step 14, half step 12, whole step 14, whole step 14, half step 12, minor third 16, half step 12. This pattern of notes is heard less frequently than that of its counterpart, the major scale 3200, but the harmonic-minor scale 3300 still fills an important role in most genres of music. Bach's Toccata and Fugue in D minor is based primarily upon the harmonic minor scale 3300, as is much Hispanic music.

Figure 34:
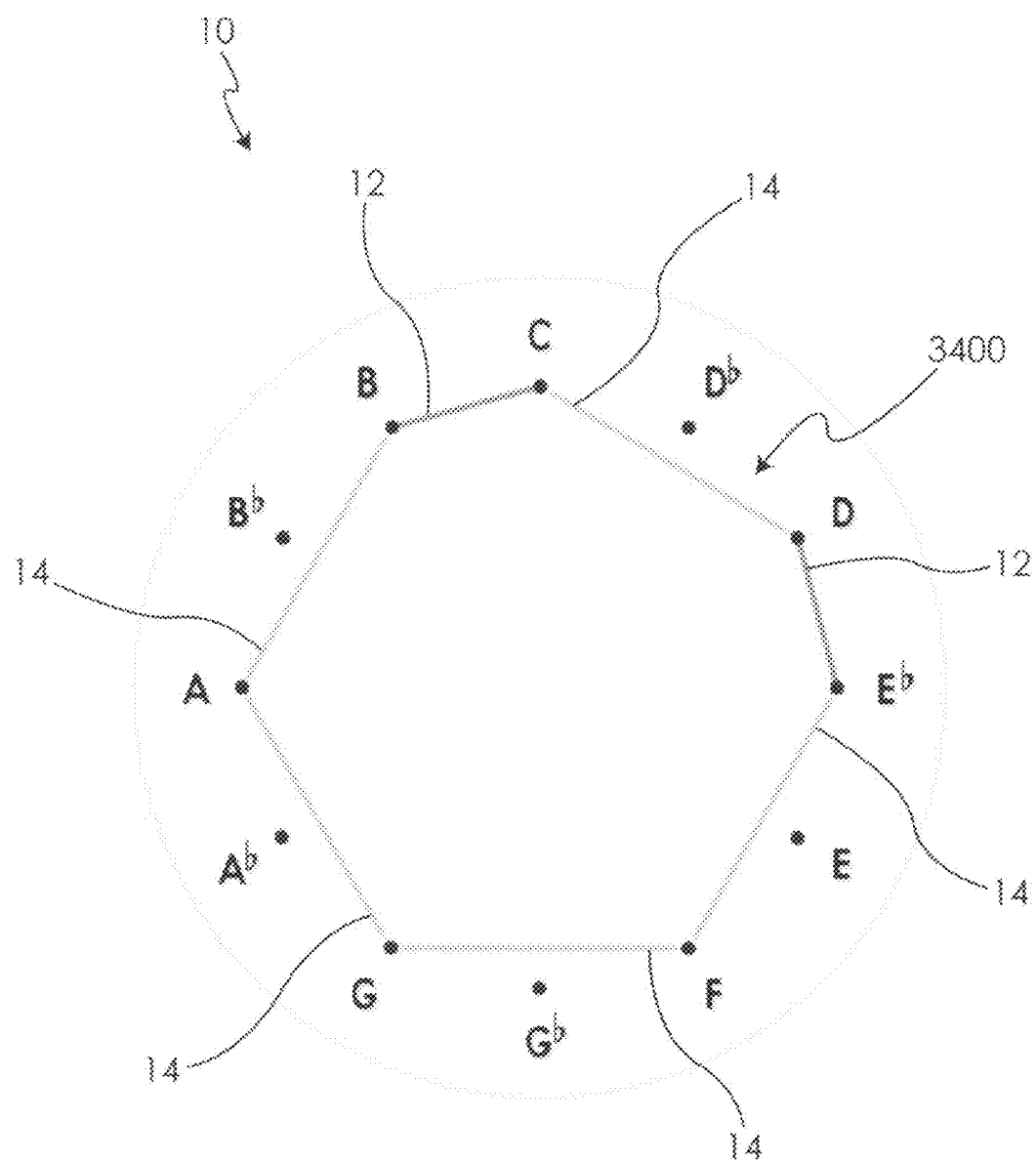
FIG. 34 is a diagram of a twelve-tone circle showing a melodic-minor scale.

Also one of the less frequently encountered scales, the melodic-minor scale still plays an important role in the musical world. The melodic minor scale is illustrated in FIG. 34 and indicated generally at 3400. The melodic-minor scale 3400 can be seen as an effective bridge between the major scale 3200 and the harmonic-minor scale 3300, combining noteworthy elements of each pattern. As can be seen in FIG. 34, the melodic-minor scale's 3400 framework is as follows: whole step 14, half step 12, whole step 14, whole step 14, whole step 14, whole step 14, half step 12. Composers often alternate between the harmonic-minor scale 3300 and the melodic-minor scale 3400 in their compositions. The melodic-minor scale 3400 has led to some interesting musical achievements; the theme song from The Simpsons, for example, comes directly out of the melodic-minor scale 3400.

The MASTER KEY™ diagrams previously described and shown represent virtually every shape that exists within the language of modern music. They are relatively few in number: six two-note shapes, four three-note shapes, nine four-note shapes, and three seven-note patterns. Why, however, are there only the above mentioned shapes? Why only six two-note shapes, four three-note shapes, nine four-note shapes, and three scales? The answer to this very important question is found by taking a closer look at the makeup of the three scales. A brief explanation of the scale modes will now be given.

As has already been stated, the scales are patterns of seven notes. Each of the seven notes of a scale can be numbered: . . . 1,2,3,4,5,6,7 . . .

A scale repeating itself over and over would then appear as such: . . . 1,2,3,4,5,6,7,1,2,3,4,5,6,7,1,2,3,4,5,6,7,1,2,3,4,5, 6,7 . . .

As a musician progresses with his or her musical learning, it eventually becomes apparent that a scale doesn't have to always begin on note number one, as . . . 1,2,34,5,6,7, 1,2,3,4,5,6,7,1 . . .

Indeed, keeping the basic pattern of seven consecutive intervals, and therefore keeping the same scale, one might want to begin at the second note of the scale, as . . . 2,3,4,5,6,7,1,2,3,4,5,6,7,1,2 . . . ; or perhaps the third note: . . . 3,4,5,6,7,1,2,3,4,5,6,7,1,2,3 . . . ; or perhaps the fourth, fifth, sixth, or even seventh note: . . . 4,5,6,7,1,2,3, 4,5,6,7,1,2,3,4 . . . . . . 5,6,7,1,2,3,4,5,6,7,1,2,3,4,5 . . . . . . 6,7,1,2,3,4,5,6,7,1,2,3,4,5,6 . . . . . . . 7,1,2,3,4,5,6, 7,1,2,3,4,5,6,7 . . .

Each of these respective starting points represents one of the various modes of the scale. Since a scale is a pattern of seven notes, there are seven modes within each scale. The most beautiful part about the modes is that each mode offers a completely unique musical sound. Indeed, if we take a closer look at one of the three scale diagrams, we will find that within each mode of the scale we can build a particular three-note and a particular four-note shape.

Figure 35:
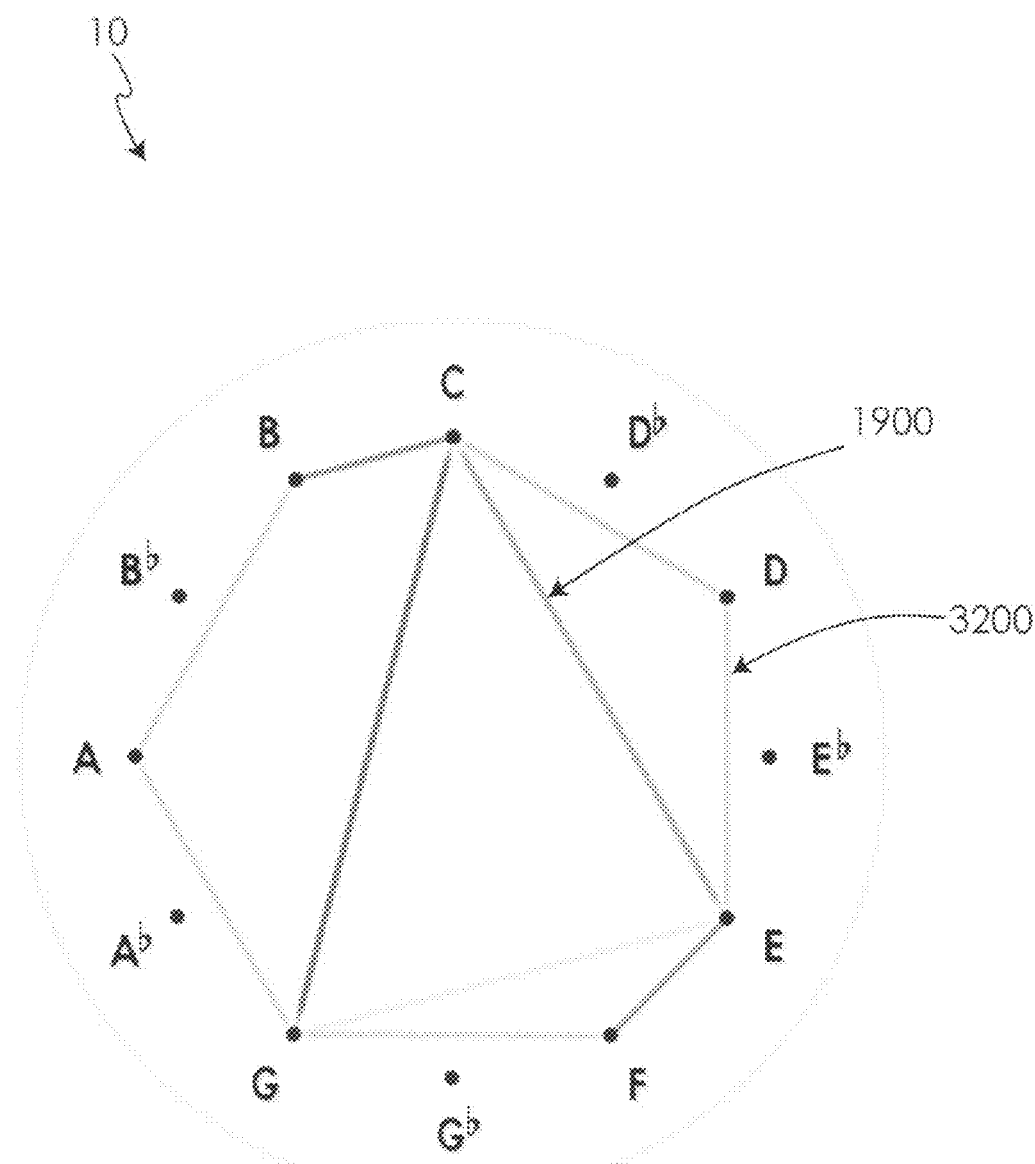
FIG. 35 is a diagram of a twelve-tone circle showing a C major triad within the C major scale.
Figure 36:
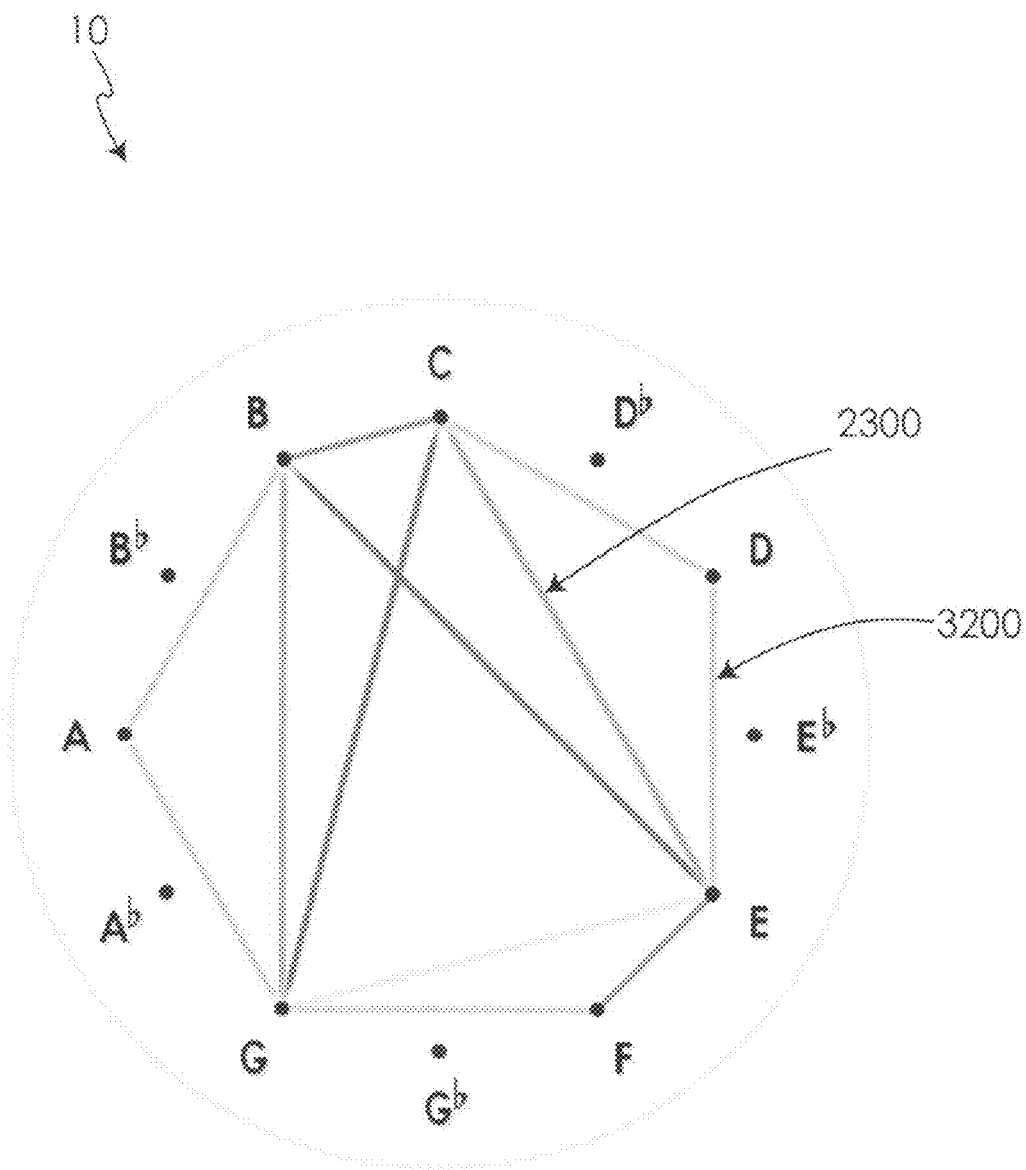
FIG. 36 is a diagram of a twelve-tone circle showing a C major seventh chord within the C major scale.

Referring again to the diagram of the major scale 3200, with specific reference to FIGS. 35 and 36, focus specifically at the top-most point 10.12 of this pattern. Traveling in a clockwise direction, as in all of the MASTER KEY™ diagrams, the top point 10.12 represents the starting point of the C major scale. If each of the scale points were numbered 1 through 7, this would be point number 1. Now, instead of traveling along the path in adjacent steps on the scale 3200, leap to every other note of the scale, stopping after the second leap on note number 5. We now have three notes determined, all of them fitting within the first mode of the major scale 3200, i.e., . . . 1,2,3,4,5,6,7 . . . or 1,3,5. Note that, as illustrated in FIG. 35, these three notes connect into a triangle and that the triangle is a recognizable one; it is, in fact, the C major triad 1900. Leaping once more along the scale 3200 adds a fourth point to the shape, which happens to be the seventh note of the scale 3200, and thus we have the appropriate seventh chord of the given mode: in this case a C major seventh chord 2300, i.e., . . . 1,2,3,4,5,6,7 . . . or . . . 1,3,5,7. This is illustrated in FIG. 36. One can repeat this same process, over and over, starting on any one of the seven points of each scale. Each of these modes will have a particular three-note and four-note shape that will always be present whenever that 'parent' mode is being played.

Figure 37:
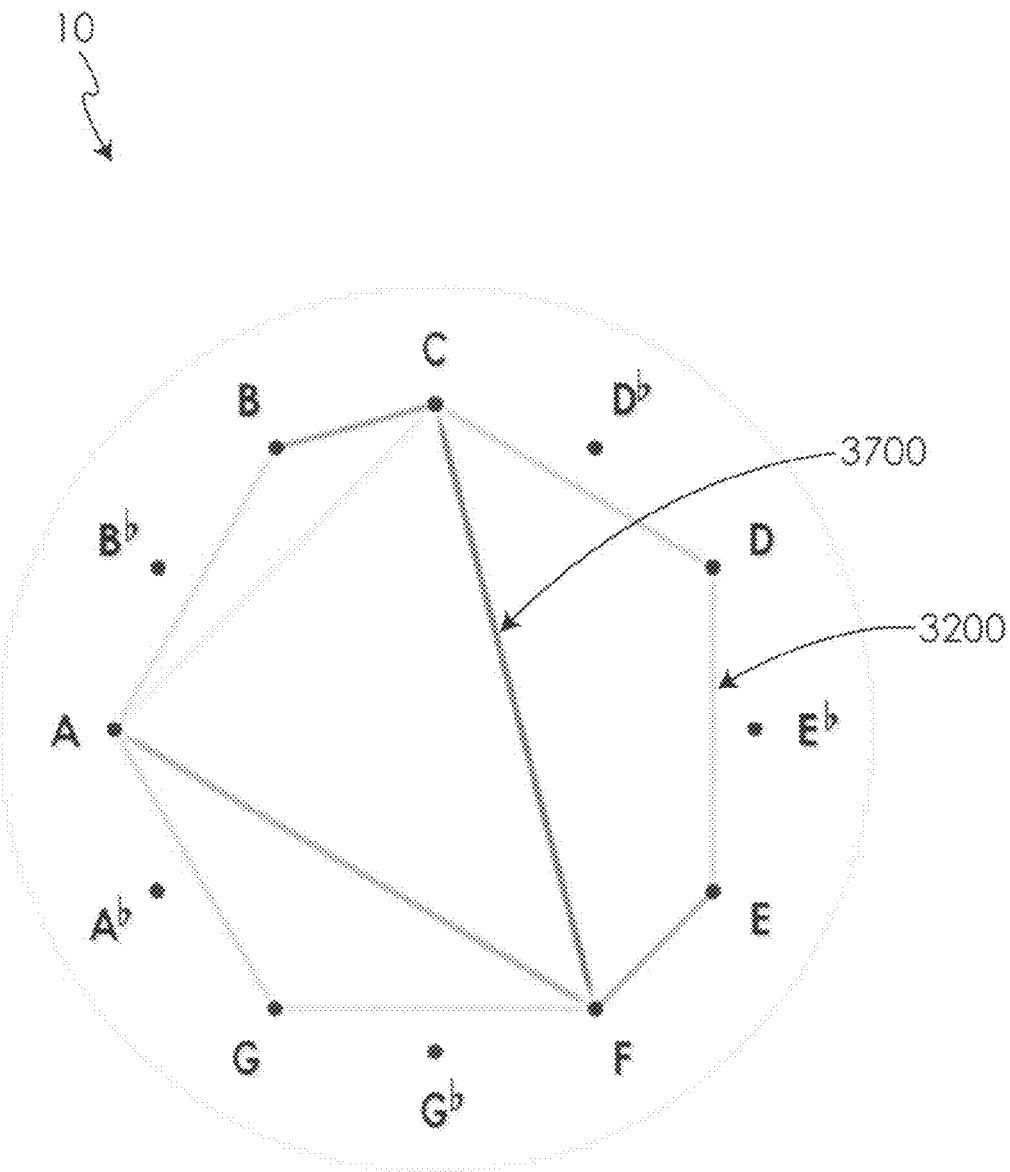
FIG. 37 is a diagram of a twelve-tone circle showing an F major triad within the C major scale.
Figure 38:
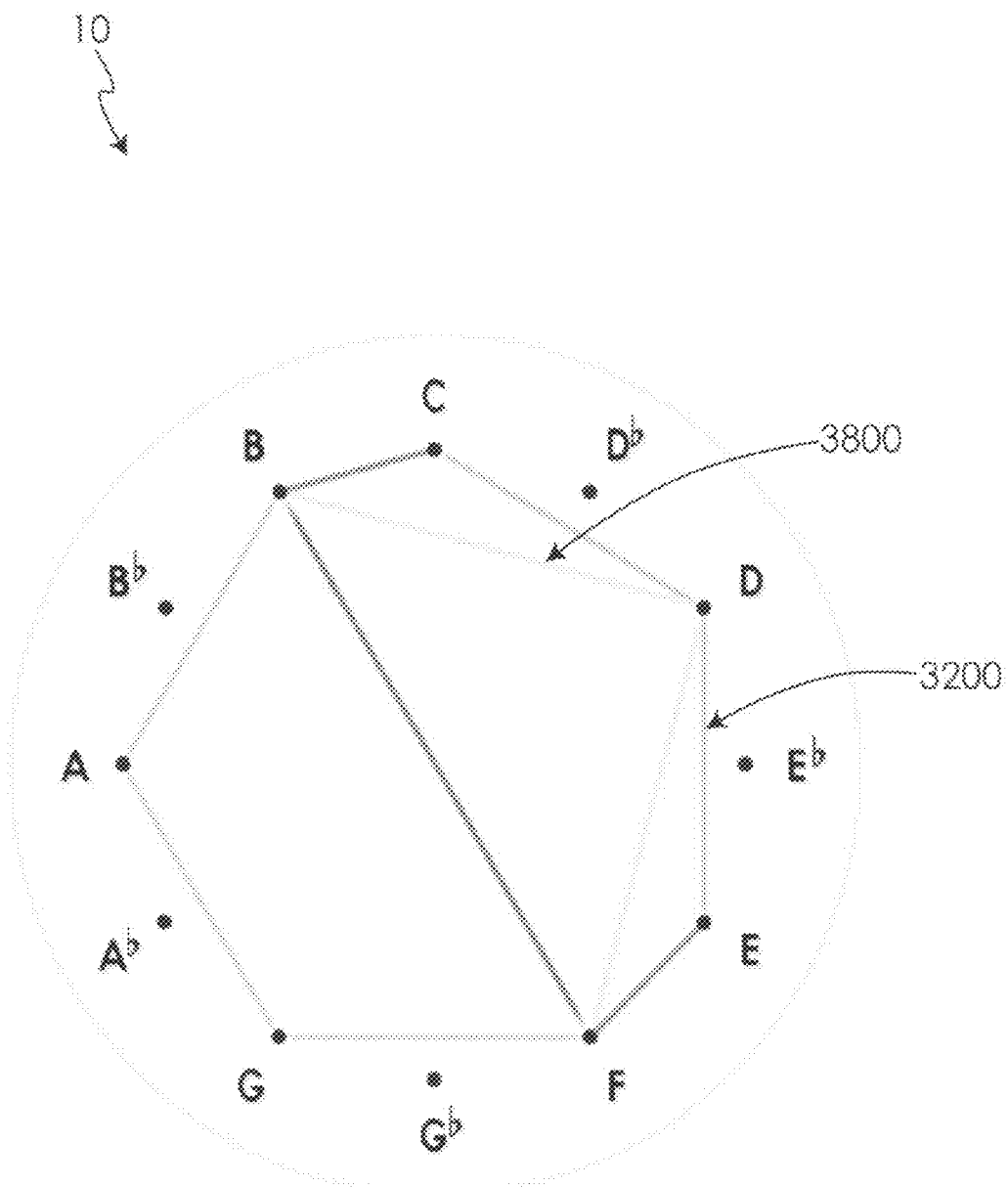
FIG. 38 is a diagram of a twelve-tone circle showing a B diminished triad within the C major scale.
Figure 39:
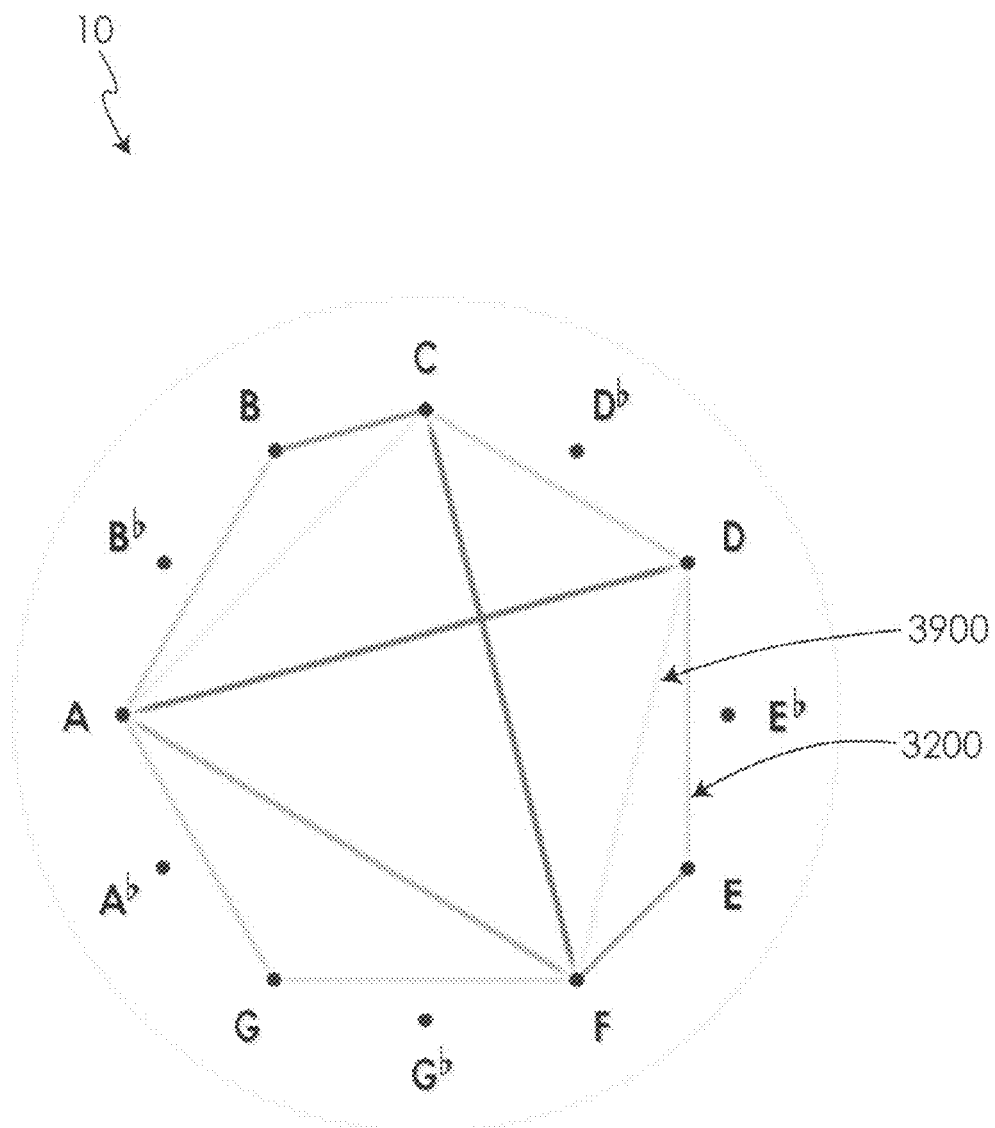
FIG. 39 is a diagram of a twelve-tone circle showing a D minor seventh chord within the C major scale.
Figure 40:
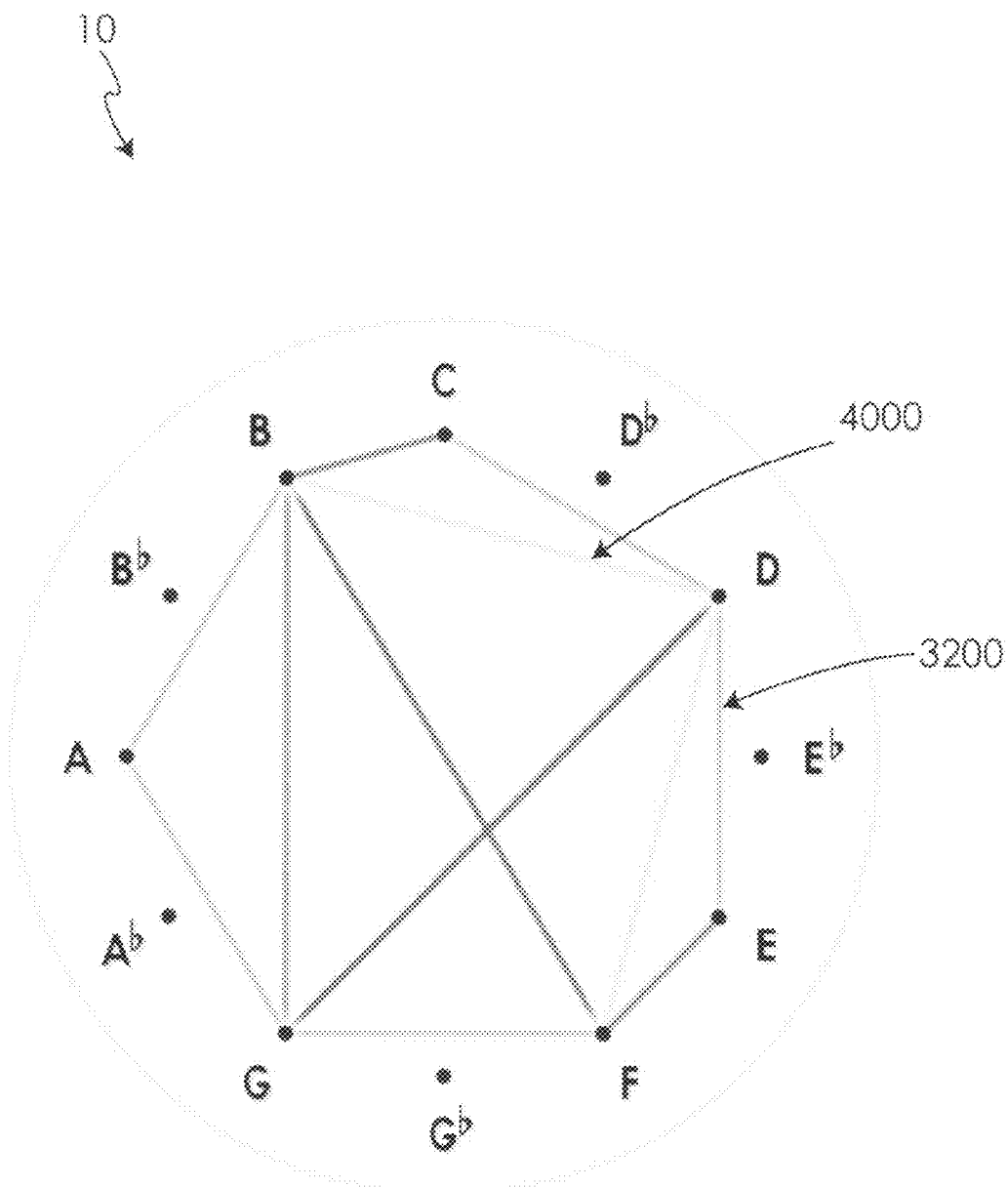
FIG. 40 is a diagram of a twelve-tone circle showing a G dominant seventh chord within the C major scale.
Figure 41:
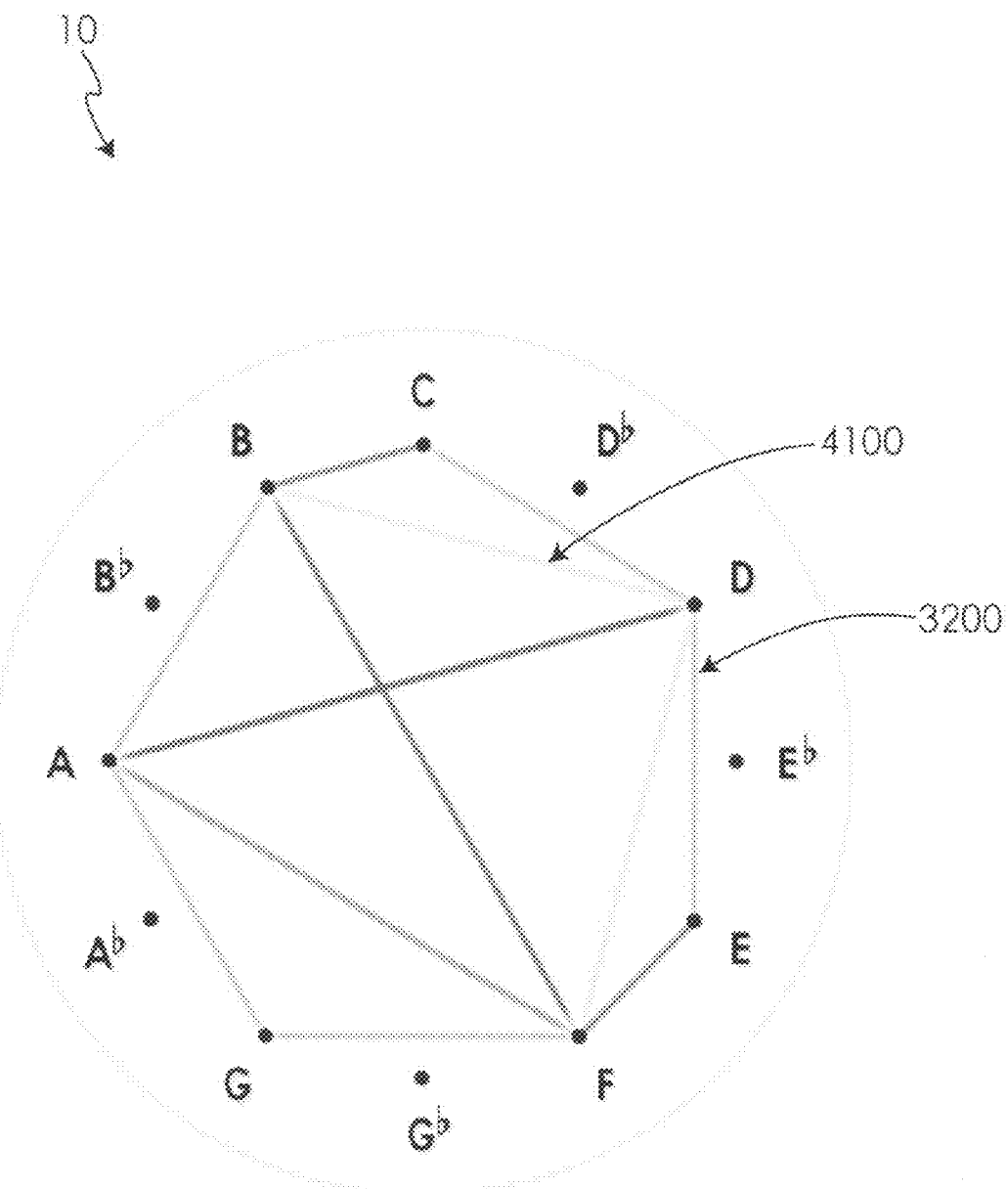
FIG. 41 is a diagram of a twelve-tone circle showing a B half diminished seventh chord within the C major scale.

For example, if we apply the three note pattern to the mode . . . 4,5,6,7,1,2,3 . . . we get the F major triad 3700 within the C major scale 3200, i.e. . . . 4,5,6,7,1,2,3 . . . or 4,6,1. This is illustrated in FIG. 37. Similarly, if we apply the three note pattern to the mode . . . 7,1,2,3,4,5,6 . . . we get the B diminished triad 3800 within the C major scale 3200, i.e. . . . 7,1,2,3,4,5,6 . . . or 7,2,4. This is illustrated in FIG. 38. Another example is to apply the four note pattern to the mode . . . 2,3,4,5,6,7,1 . . . , which produces the D minor seventh chord 3900 within the C major scale, i.e. . . . 2,3,4,5,6,7,1 . . . or 2,4,6,1. This is illustrated in FIG. 39. Similarly, if we apply the four note pattern to the mode . . . 5,6,7,1,2,3,4 . . . we get the G dominant seventh chord 4000 within the C major scale 3200, i.e. . . . 5,6,7,1,2,3,4 . . . or 5,7,2, 4. This is illustrated in FIG. 40. Finally, if we apply the four note pattern to the mode . . . 7,1,2,3,4,5,6 . . . we produce the B half diminished seventh chord 4100 within the C major scale, i.e. . . . 7,1,2,3,4,5,6 . . . or 7,2,4,6. This is illustrated in FIG. 41. From the above examples, it can be seen that all of the different chord structures within the key of C major may be created by using either the three note pattern or the four note pattern while starting at one of the seven points on (i.e. in one of the seven modes of) the C major scale. All of the chords in any of the other scales (major 3200, harmonic minor 3300 or melodic minor 3400) may be similarly constructed.

Figure 42:
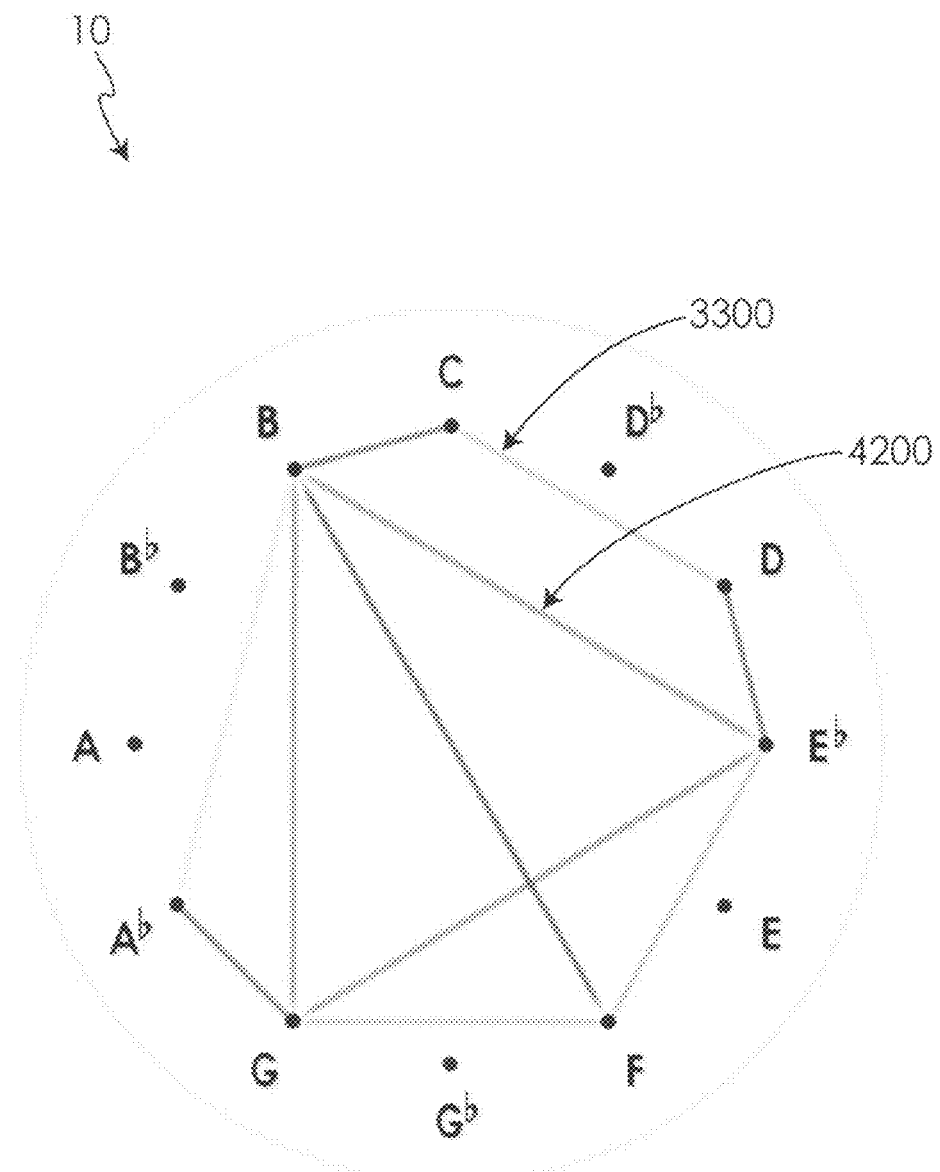
FIG. 42 is a diagram of a twelve-tone circle showing a G augmented flat-seventh chord within the C harmonic minor scale.
Figure 43:
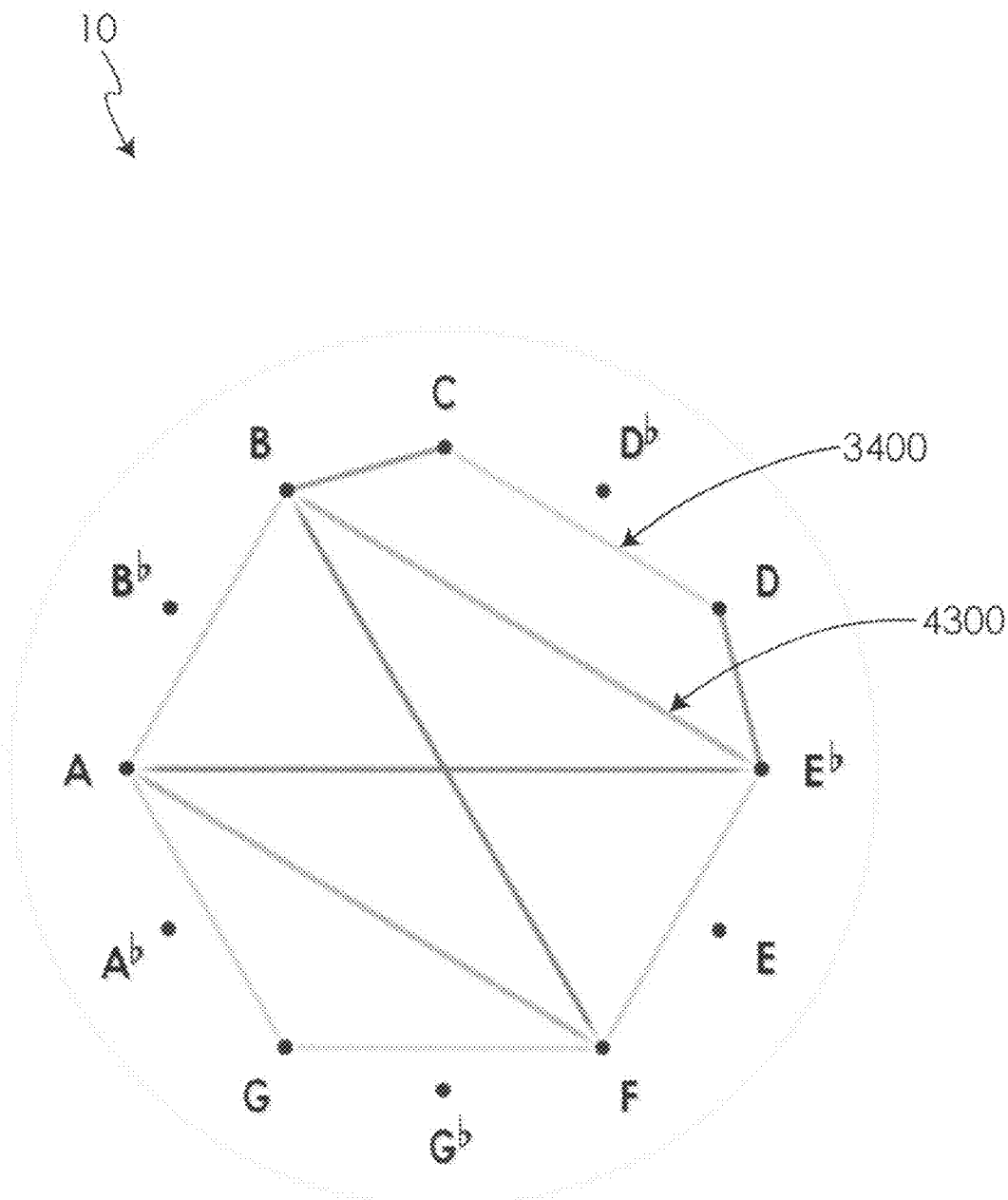
FIG. 43 is a diagram of a twelve-tone circle showing an F flat-five seventh chord within the C melodic-minor scale.

After building each of the respective three and four-note shapes from each mode of the three main scales 3200, 3300 and 3400, one will find that there is only a limited number of shapes that can be created: that is, four three-note shapes and seven four-note shapes. There are, in fact, nine four note shapes presented in the previously described diagrams. The last two four-note shapes represent the two jazz chords: namely, the augmented flat-seventh chord 3000 and the flat-five seventh chord 3100. These two shapes are found frequently within the jazz idiom, and although they are not built in exactly the same manner as the other four-note shapes, they are still derived, like everything else, directly from the scales. The augmented flat-seventh chord 3000 is built from the fifth mode of the harmonic-minor scale 3300 using the following mode degrees: . . . 1,2,3,4,5,6,7 . . . or . . . 1,3,6,1. Therefore, applying this pattern to the fifth mode we have . . . 5,6,7,1,2, 3,4 . . . or 5,7,3,4. FIG. 42 illustrates the C harmonic-minor scale 3300 and the G augmented flat-seventh chord 4200 formed therein using the 5,7,3,4 pattern. The flat-five seventh chord 3100 is built from the fourth mode of the melodic-minor scale 3400 on mode degrees . . . 1,2,3,4,5,6,7 . . . or . . . 1,3,4,7. Therefore, applying this pattern to the fourth mode we have . . . 4,5,6,7,1,2,3 . . . or 4,6,7,3. FIG. 43 illustrates the C melodic-minor scale 3400 and the F flat-five seventh chord 4300 formed therein using the 4,6,7,3 pattern.

As can be seen from the above description, the musical language is built primarily from the three seven-note scales: the major scale 3200, the harmonic-minor scale 3300, and the melodic-minor scale 3400. Upon each of the starting points of a scale, i.e., each of the seven notes or modes, it is possible to build a particular triad (three-note shape) and a particular seventh-chord (four note shape).

*Three Scales; *Seven Notes Each; *Twenty-one possible starting points.

If a person builds every type of three and four-note chord on every one of the twenty one starting points, after removing the repeated chords, a person will be left with only: four 'triads' (three note shapes-triangles), seven 'seventh chords' (four note shapes-trapezoids), and two Jazz 'seventh-chords' (four-note shapes-trapezoids).

Since the number seven (seven notes) is a prime number and does not fit symmetrically into the number twelve (twelve tones), our current system of musical notation is inherently flawed, resulting in confusion when trying to learn the musical language. The explanation contained herein, in conjunction with the MASTER KEY™ diagrams circumvent this problem, revealing a visual translation of the language of music. With the use of a computer, for example, it becomes possible to see how the structures and patterns of music actually interweave and align themselves to one another in real time, as described in greater detail hereinbelow.

The previously described diagrams have been shown in two dimensions; however, music is not a circle as much as it is a helix. Every twelfth note is one helix turn higher or lower than the preceding level. What this means is that music can be viewed not only as a circle but as something that will look very much like a DNA helix, specifically, a helix of approximately ten and one-half turns (i.e. octaves). There are only a small number of helix turns in the complete spectrum of audible sound; from the lowest auditory sound to the highest auditory sound.

Figure 44:
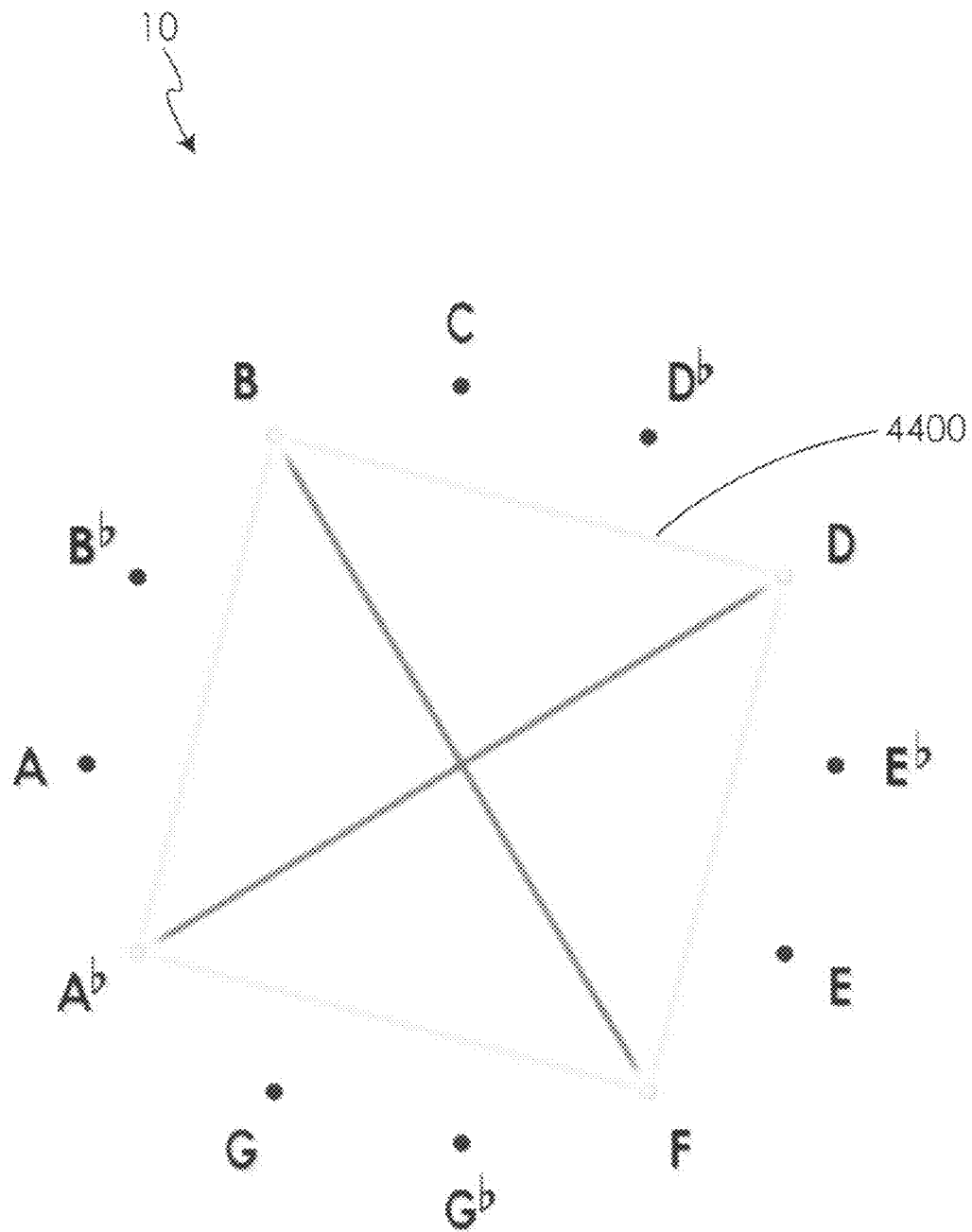
FIG. 44 is a diagram of a twelve-tone circle showing a B fully diminished seventh chord.

For example, FIG. 44 illustrates a B fully diminished seventh chord 4400 drawn on the twelve-tone circle 10. While this diagram is very useful for illustrating the notes that comprise the chord and the intervals between the notes, it only gives information about the notes as they relate to each other, i.e. their relative pitch to one another. The diagram of FIG. 44 does not give any information about the absolute pitch of any of the notes, i.e. what octave the notes are in.

Figure 45:
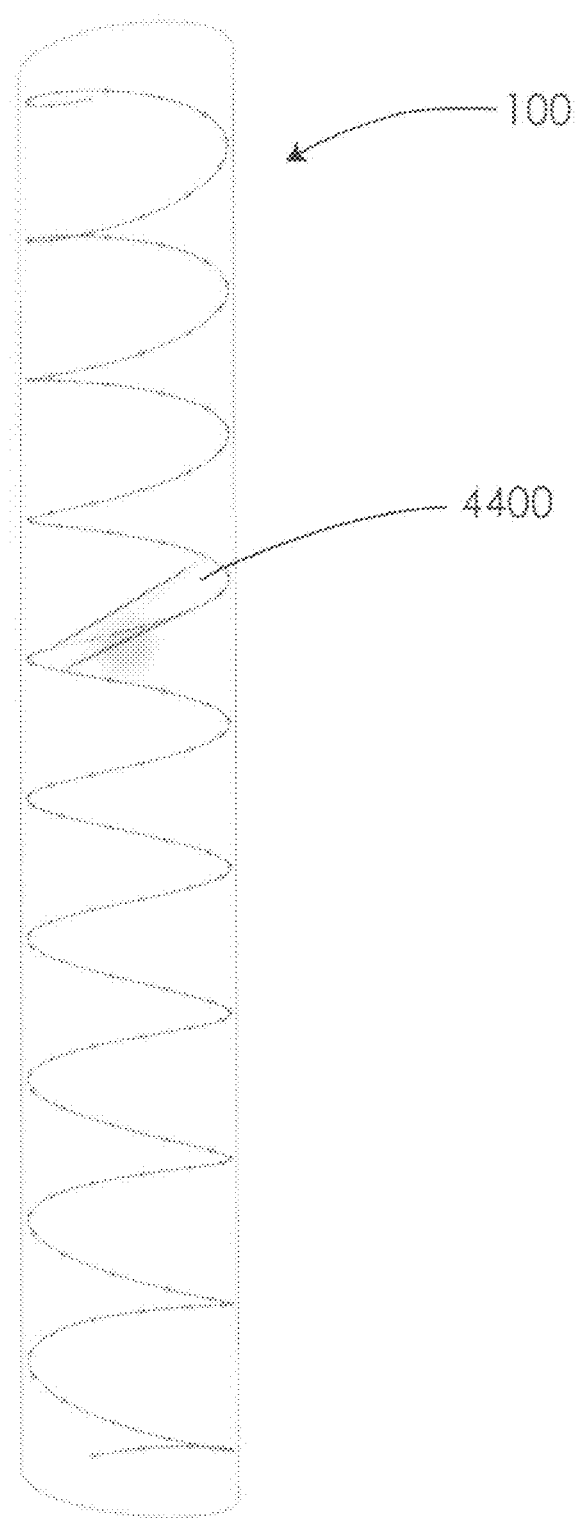
FIGS. 45-47 are diagrams of a helix showing a B diminished seventh chord.
Figure 46:
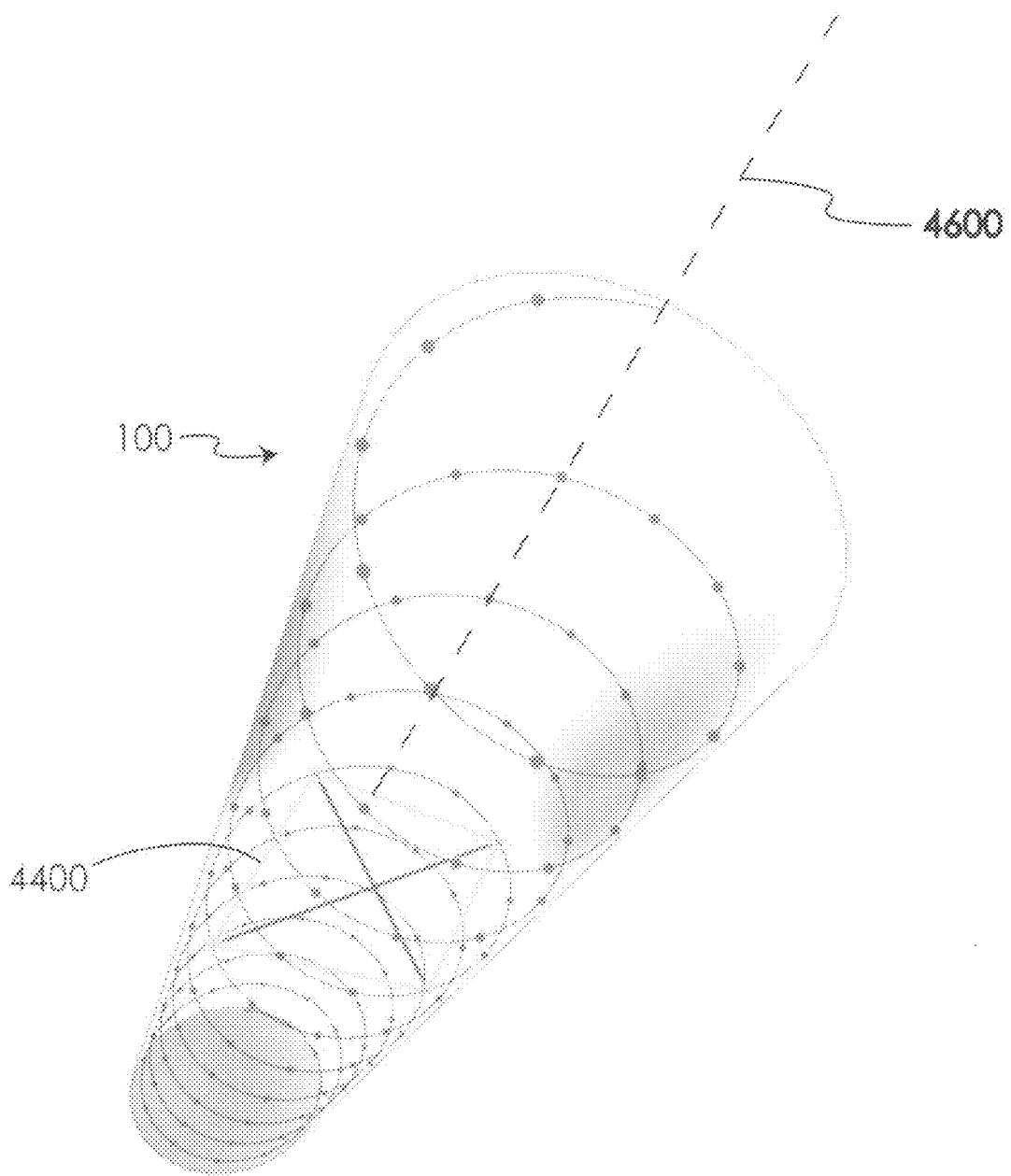
Figure 47:
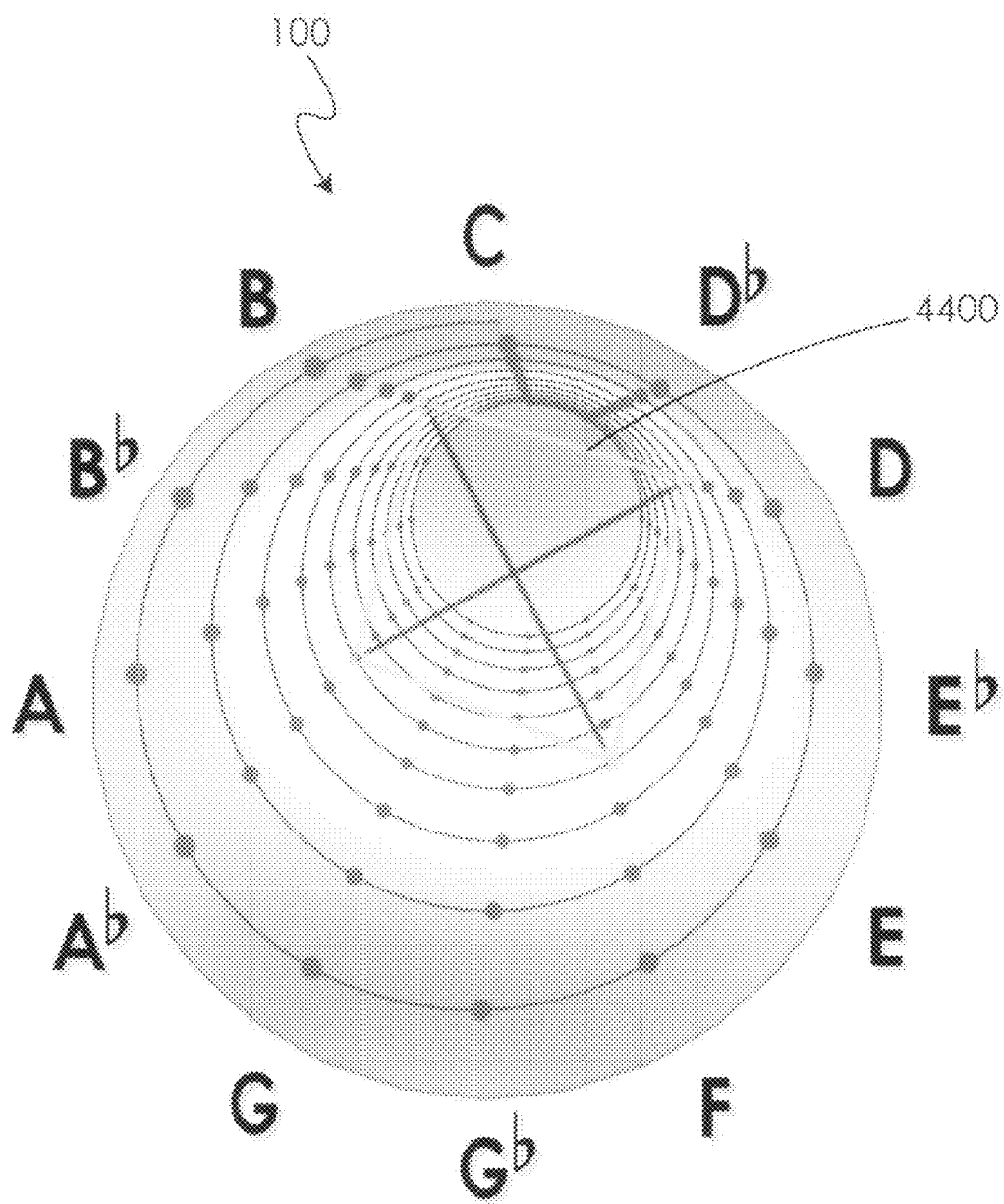
Figure 48:
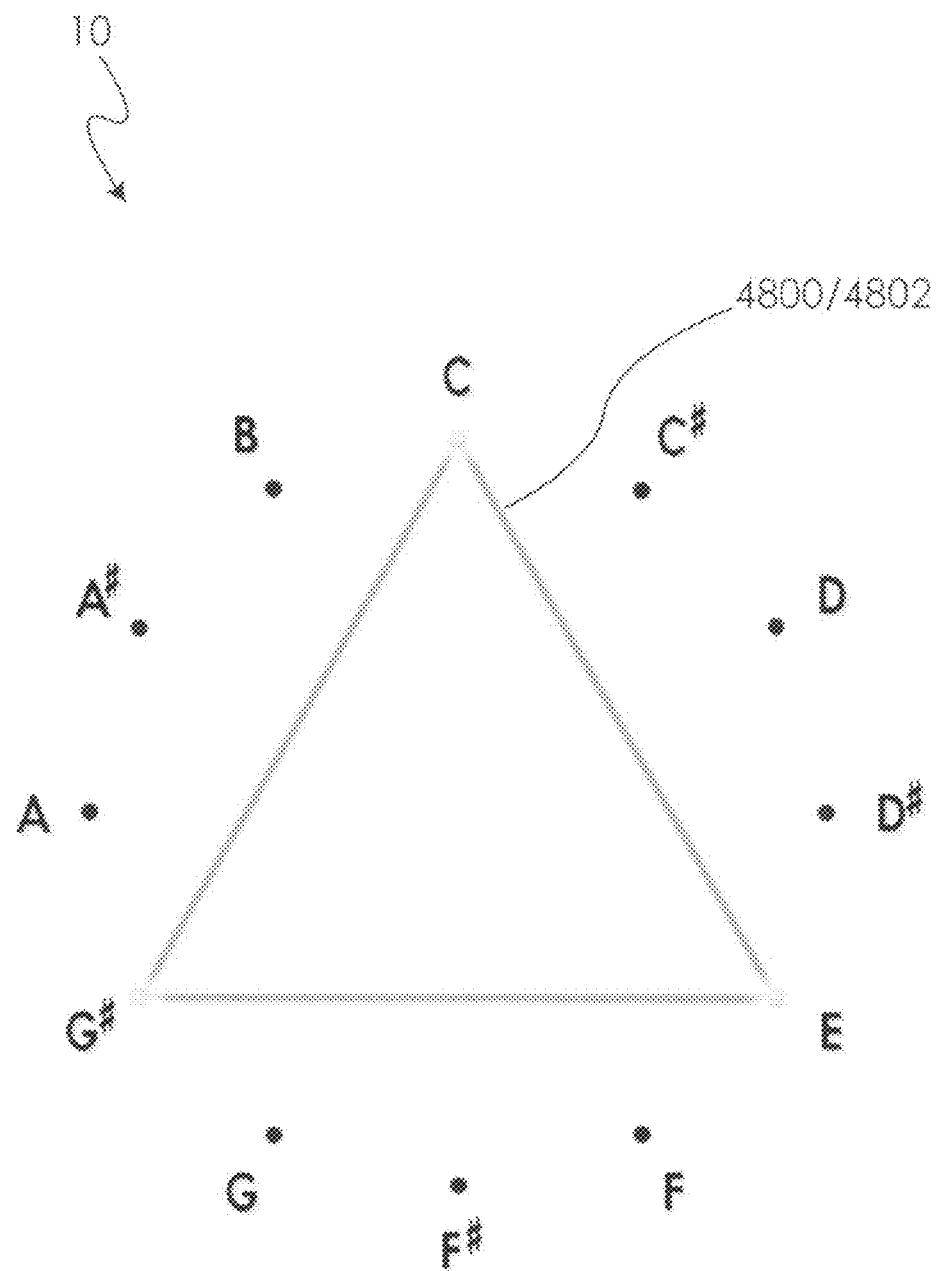
FIG. 48 is a diagram of a twelve-tone circle showing two C augmented triads played simultaneously.

In order to convey such information, the present disclosure also comprehends the use of three-dimensional representations of the twelve-tone circle 10, in which the notes are arranged in a helix 100, as illustrated in FIGS. 45 through 47. In FIG. 45, the helix 100 is seen from the side, and the placement of the chord 4400 therein reveals the octave in which it is being played by virtue of which turn of the helix it appears. In FIG. 46, the helix 100 has been rotated to give the viewer a perspective view. Again, the absolute pitch of the notes in the chord 4400 is indicated by the position of each note on the helix 100. It will be appreciated that in some embodiments, the like notes in all octaves lie in a substantially straight line. For example, in FIG. 46 all of the notes C in each octave lie on the line 4600. Note that in some embodiments, the helix 100 is illustrated with shading to delineate the surface of the helix 100.

As the helix 100 is further rotated, we can create the nearly end-on view of FIG. 47. Although the chord 4400 is viewed in almost the same perspective as when it appears in the twelve-tone circle 10 of FIG. 44, the perspective of FIG. 47 still allows the viewer to determine in which octave the chord 4400 is being played. In some embodiments, the note labels may be added around the helix 100 for nearly end-on views in order to provide the viewer with points of reference.

Figure 49:
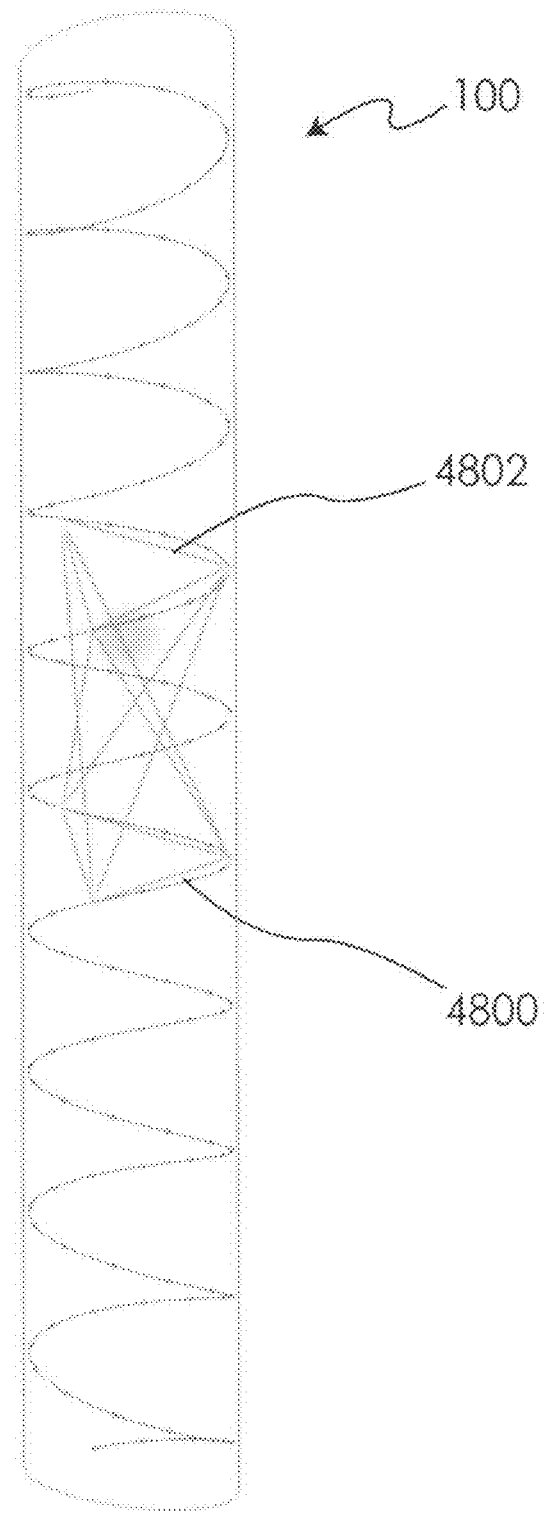
FIGS. 49-51 are diagrams of a helix showing two C augmented triads played simultaneously.
Figure 50:
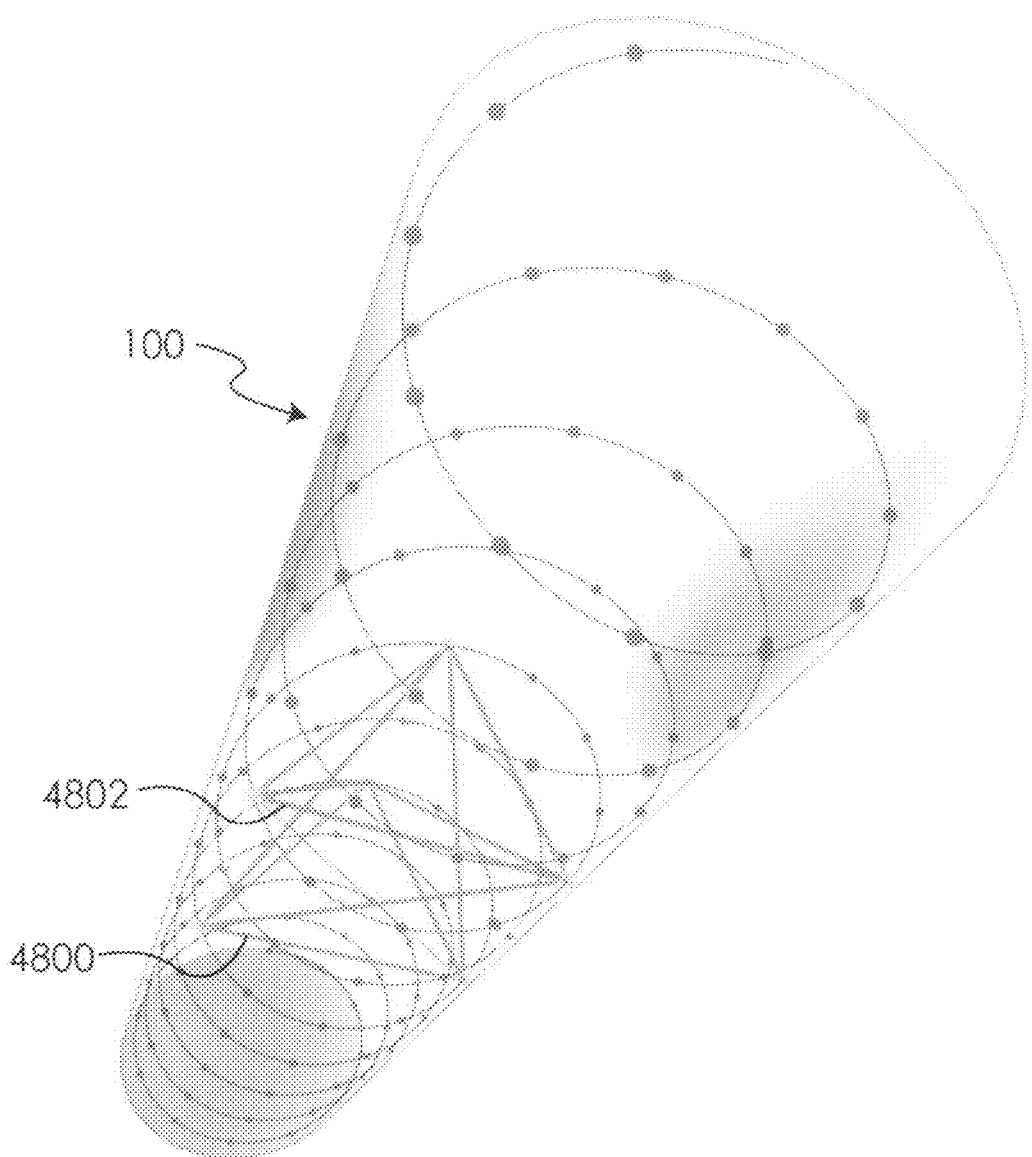
Figure 51:
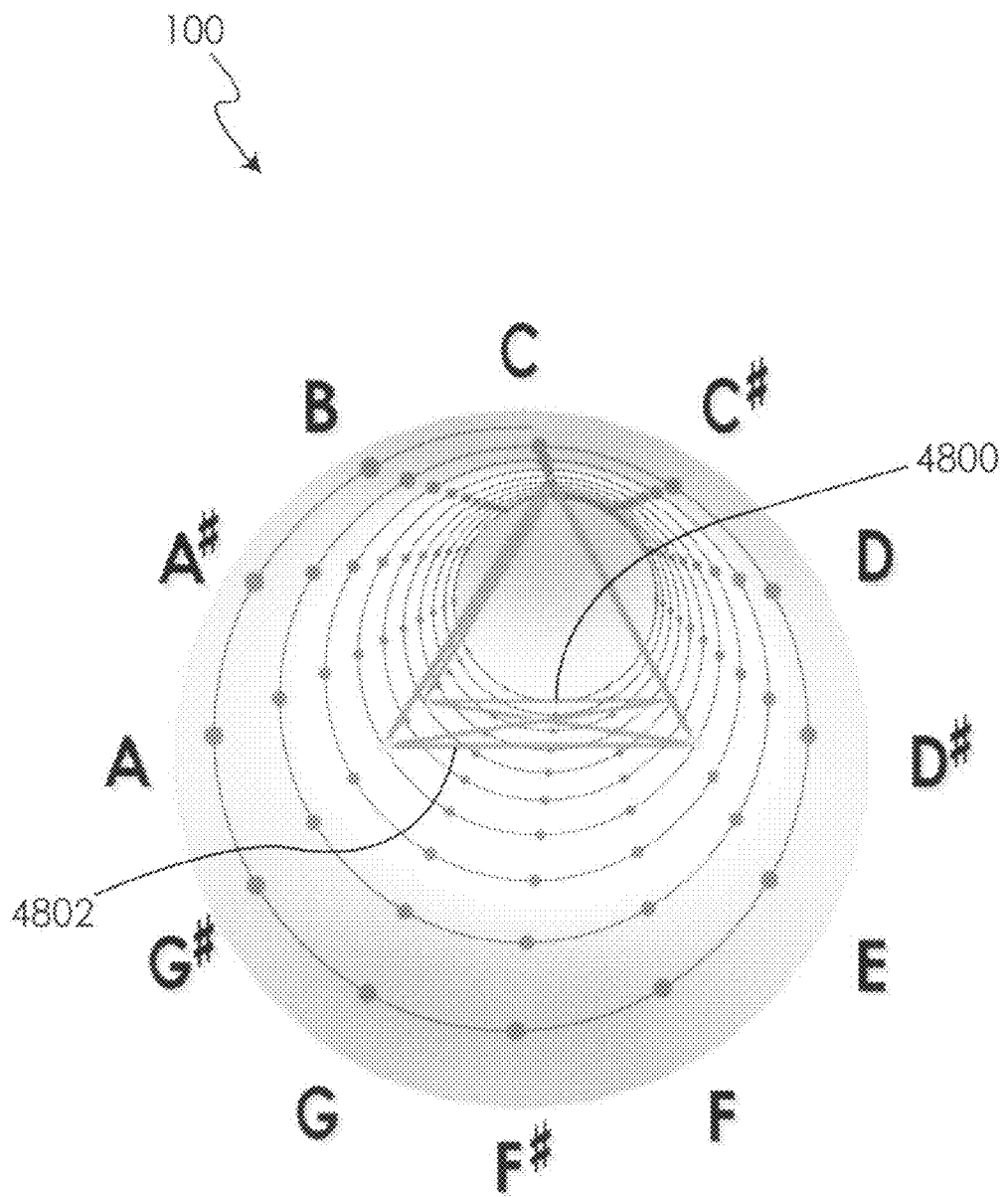
Figure 52:
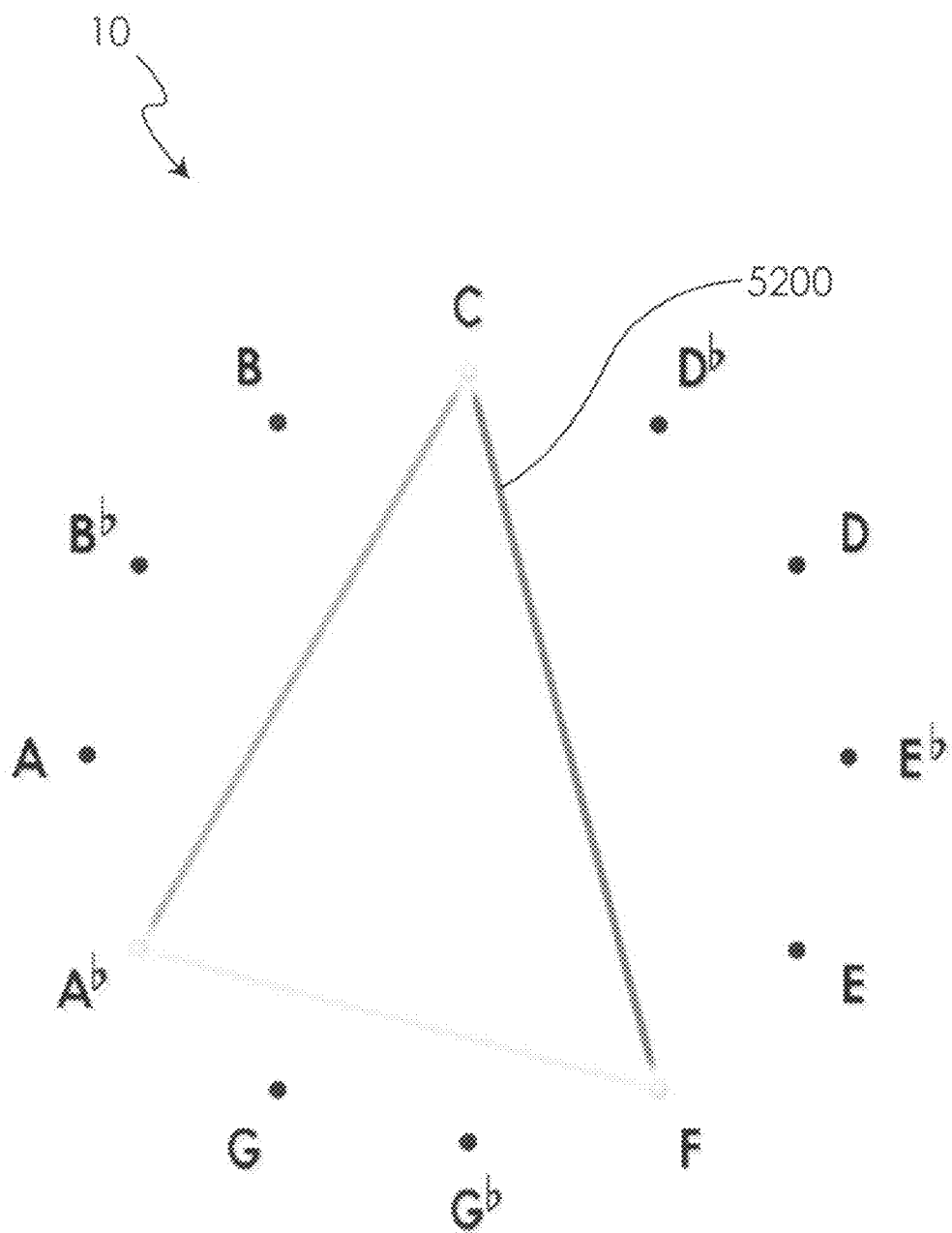
FIG. 52 is a diagram of a twelve-tone circle showing an F minor triad.
Figure 53:
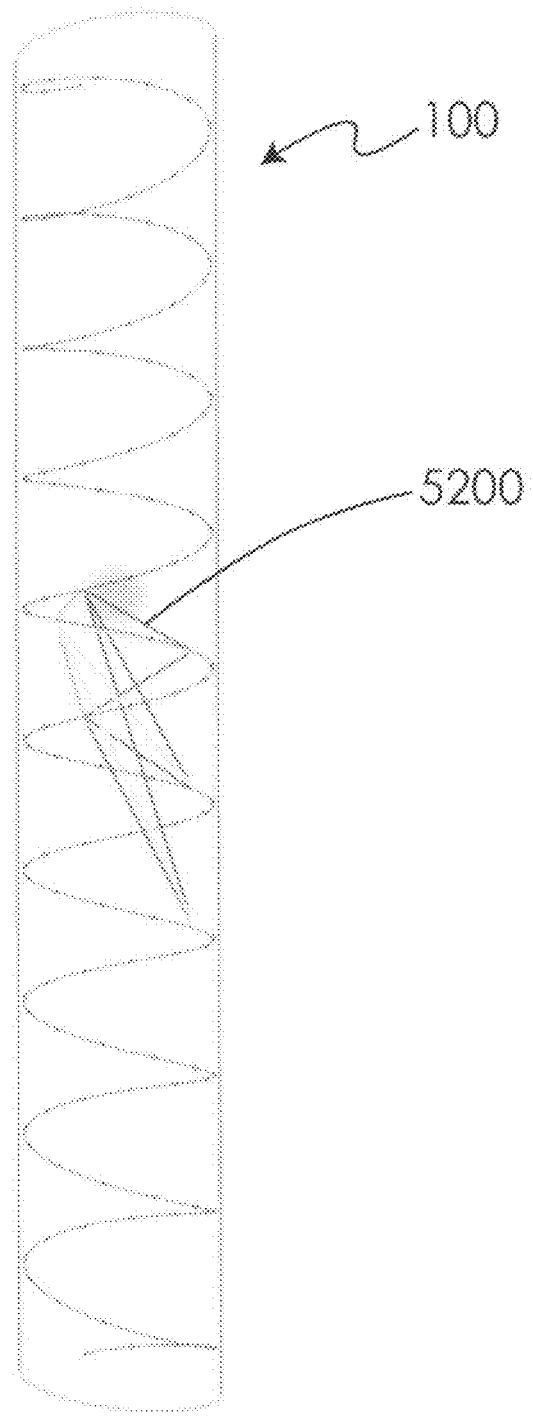
FIGS. 53-55 are diagrams of a helix showing an F minor triad covering three octaves.
Figure 54:
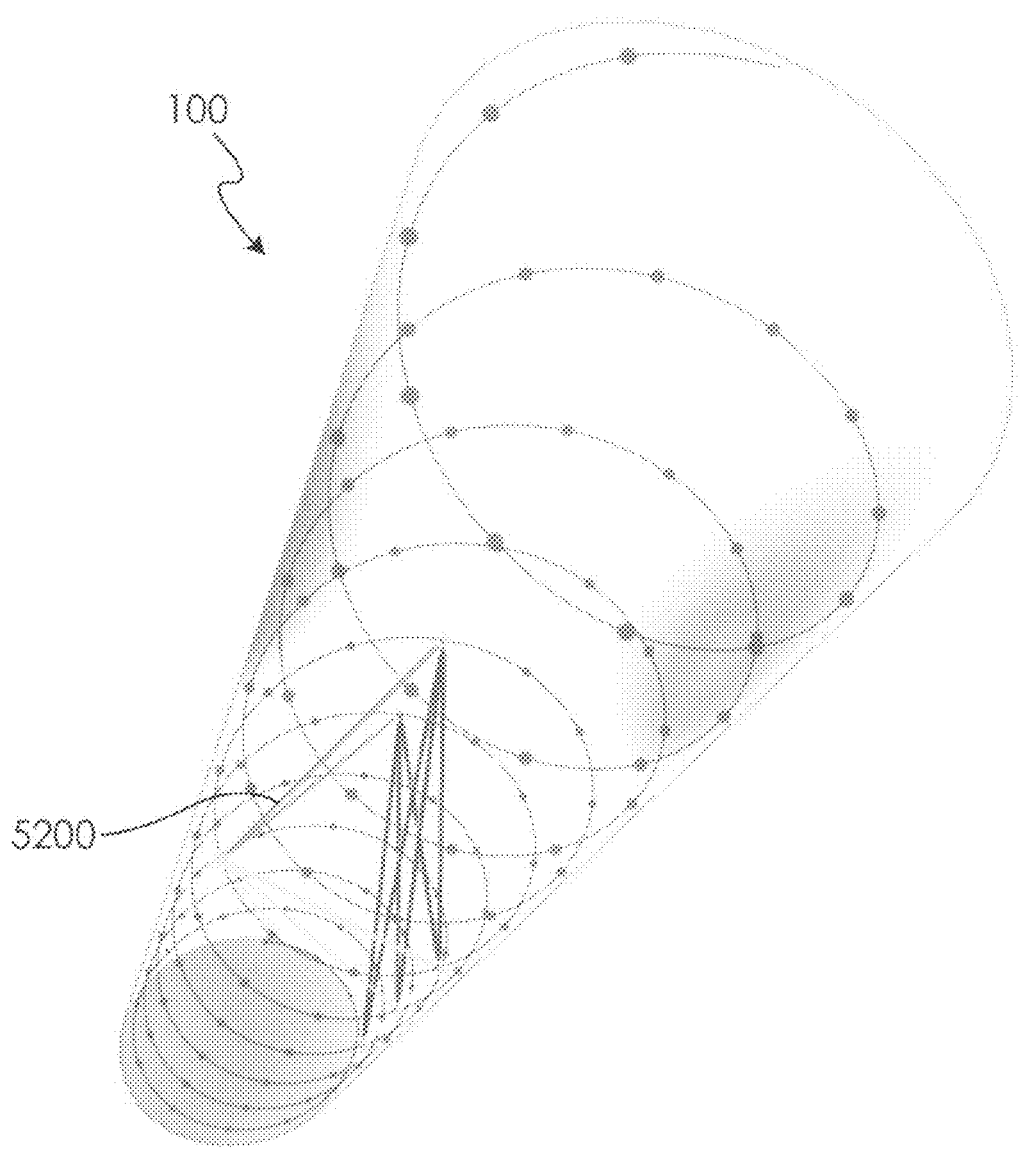
Figure 55:
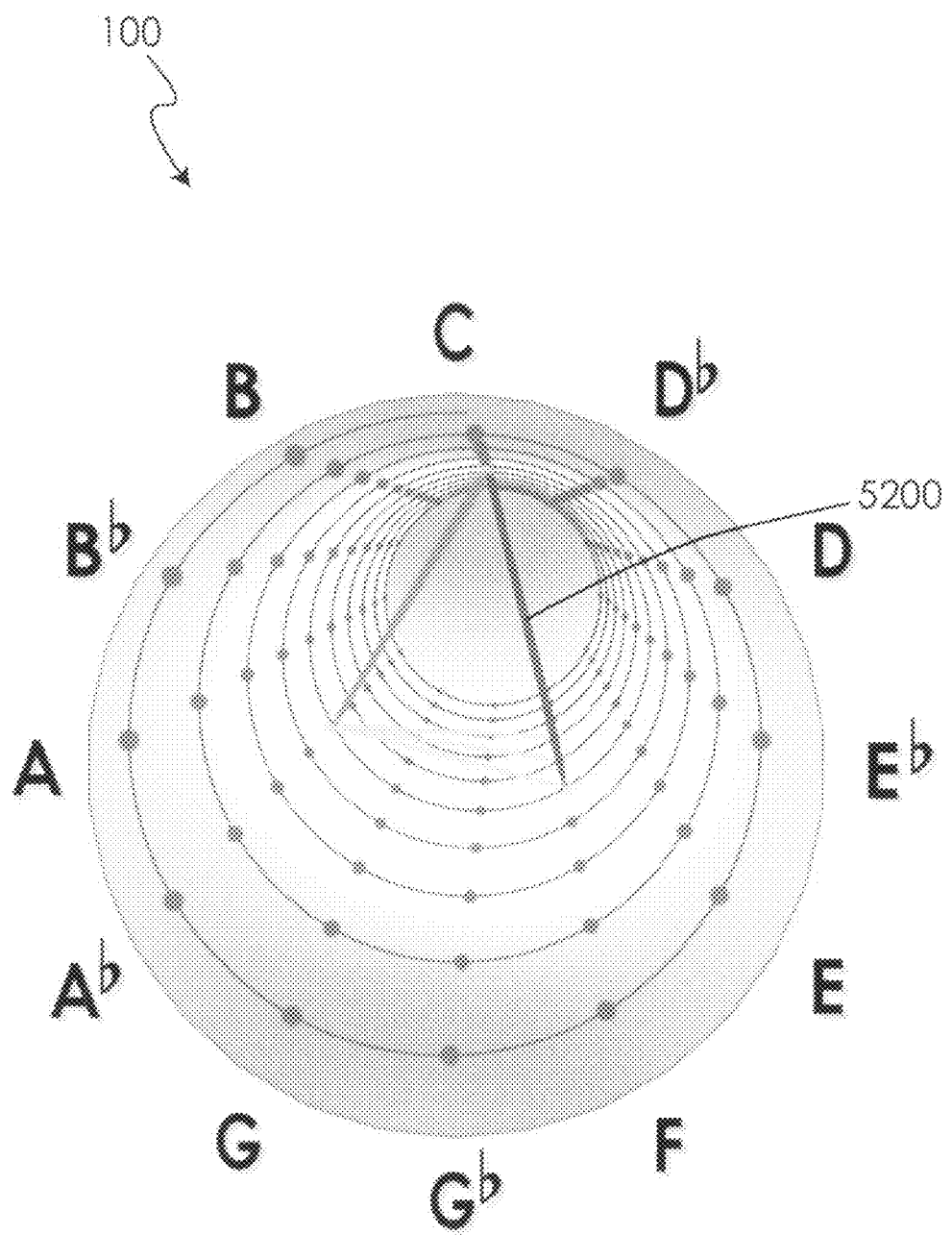
Figure 56:
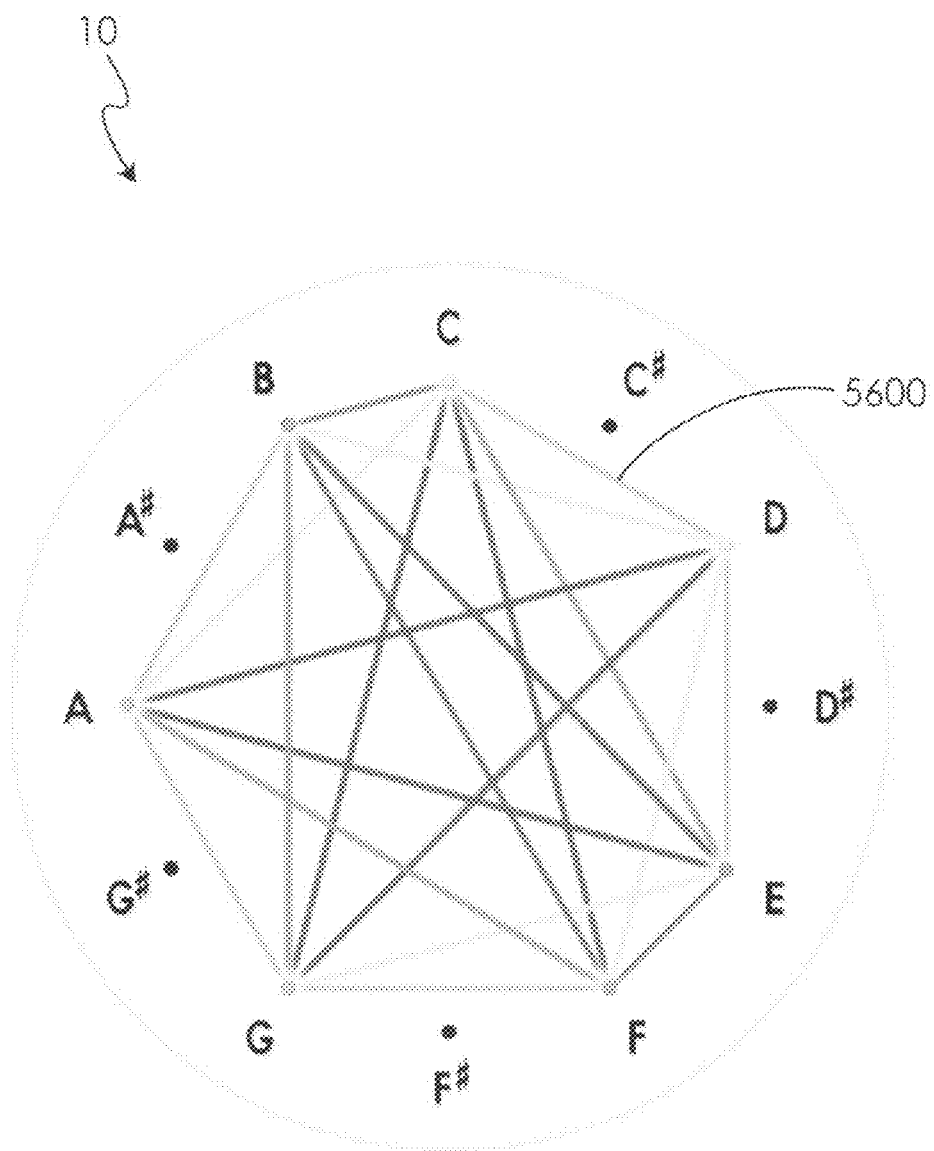
FIG. 56 is a diagram of a twelve-tone circle showing a C major scale.

The helix 100 becomes an even more powerful visualization tool when notes are played across octaves. For example, FIGS. 48-51 illustrates two C augmented triads 4800 and 4802 played simultaneously, where the chord 4802 is two octaves higher than the chord 4800. On the twelve-tone circle 10 of FIG. 48, it is not possible to see that two separate chords are being played, as the three notes and three intervals within both of the chords 4800 and 4802 completely overlap on the circle 10. But when viewed in the helix 100 as shown in FIGS. 49-51, it becomes apparent that there are, in fact, two chords 4800 and 4802 being sounded simultaneously two octaves apart.

Another example of the benefits of the helix 100 for music visualization is illustrated in FIGS. 52-55, where an F minor triad 5200 is being played. In the twelve-tone circle 10 of FIG. 52, we see the familiar shape of the minor triad with its root at F. However, in the helical views of FIGS. 53-55, we can see that the chord 5200 has been augmented from a simple three note structure, and actually covers three successive octaves. The $A^b$ note is being played in the upper octave, the C note in the upper and middle octaves, and the F note in all three octaves. By displaying the notes and their intervals in the helix 100, the viewer is able to easily see the components and internal relationships of the complex chord 5200, as well as its position in the overall spectrum of sound.

Figure 57:
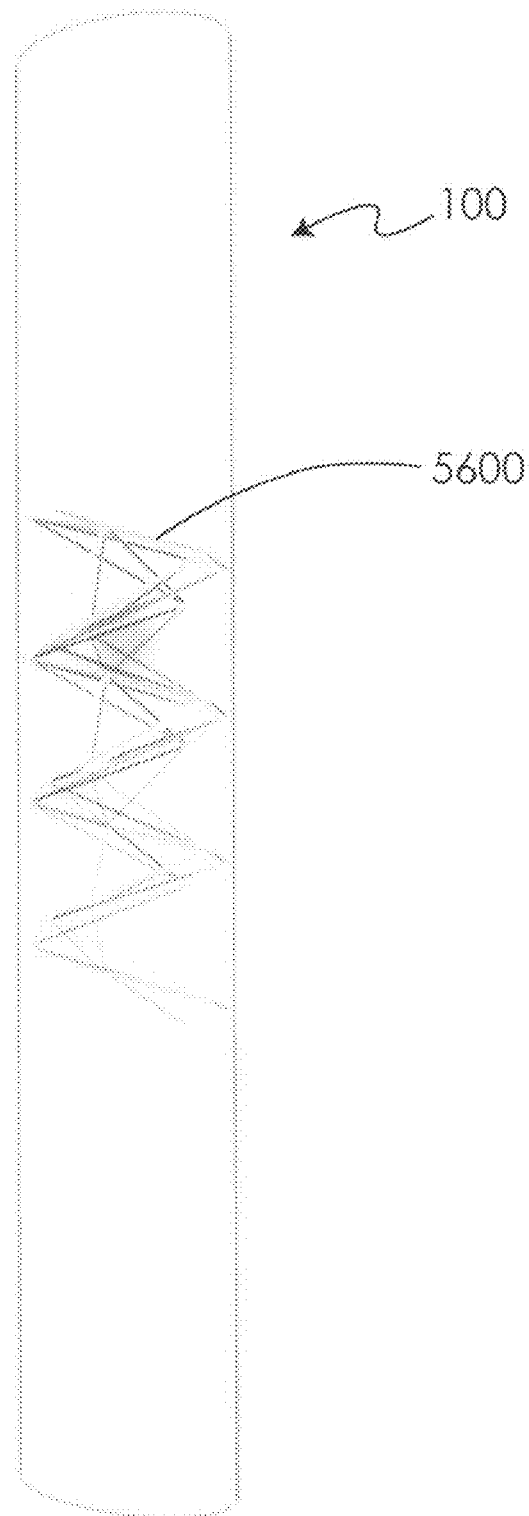
FIGS. 57-59 are diagrams of a helix showing a C major scale.
Figure 58:
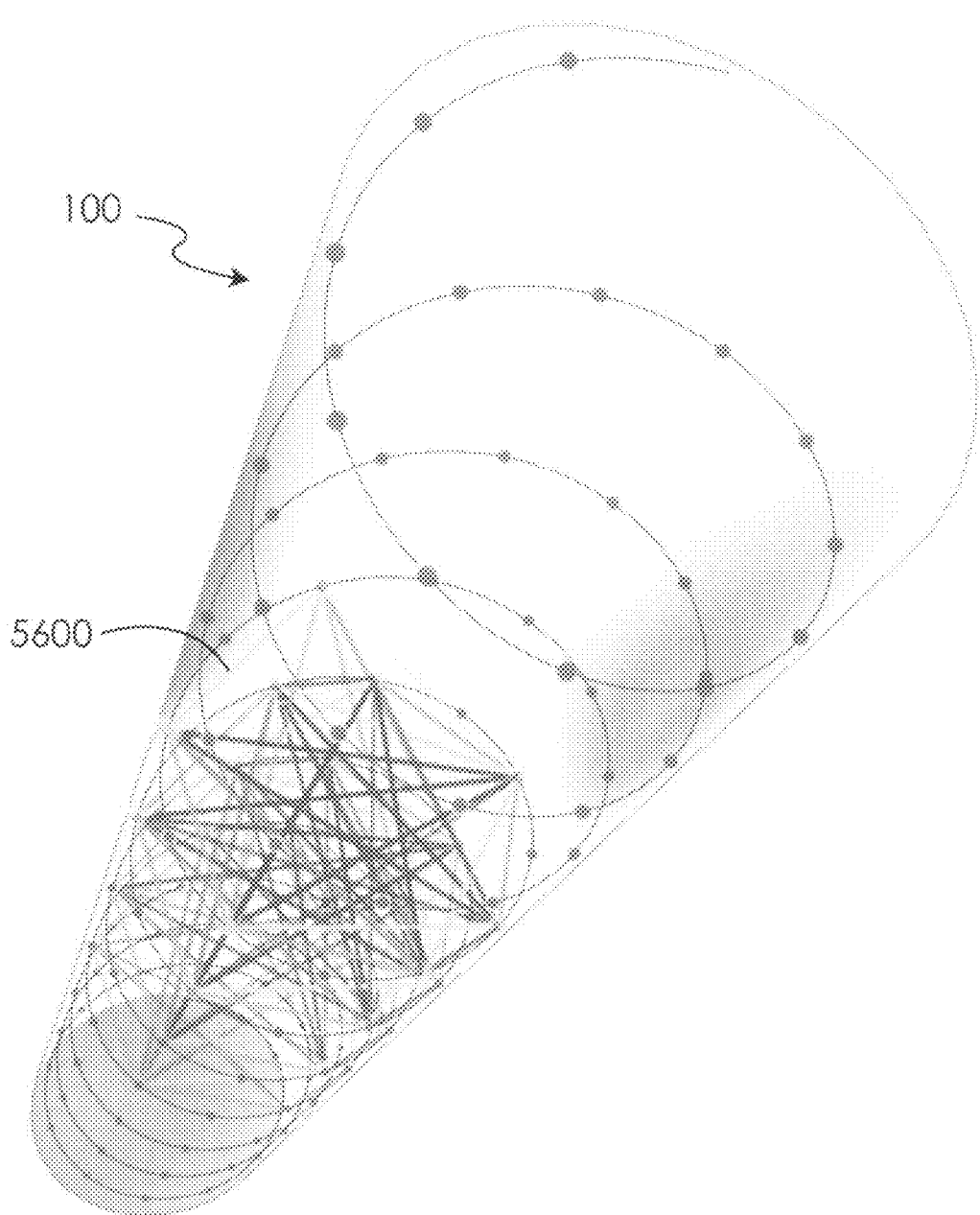
Figure 59:
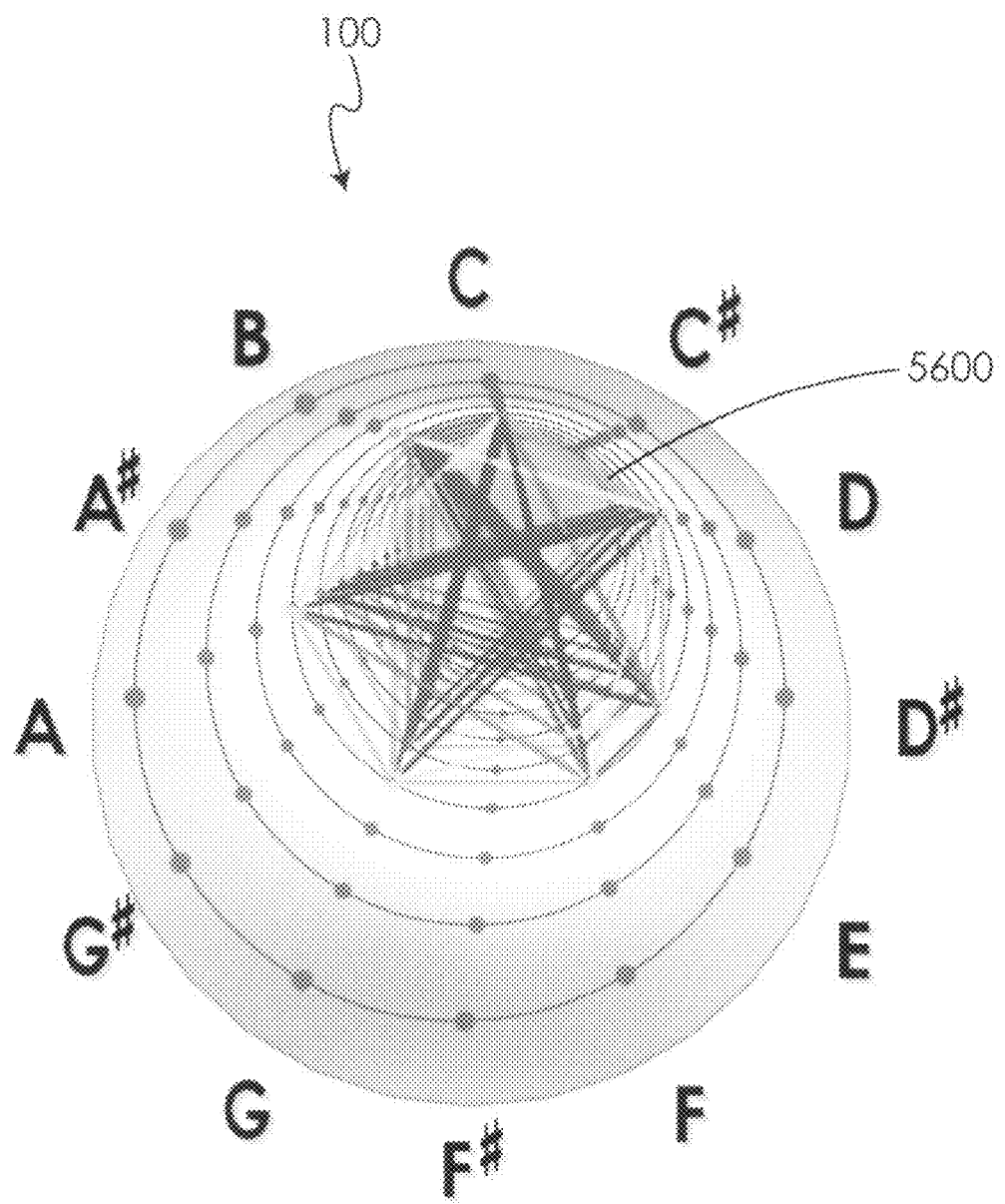

A dramatic example of the power of the helix 100 is found in FIGS. 56 through 59, where a C major scale 5600 is being played. Viewing the notes on the twelve-tone circle 10 of FIG. 56, we see the scale 5600 that looks identical to the C major scale 3200 of FIG. 32, with the internal intervals drawn in. However, looking at the same scale 5600 on the helix 100, as illustrated in FIGS. 57-59, we can see that the C major scale 5600 is being played across three and one-half octaves. Again, we can also see the scale's position in the overall spectrum of sound when viewing it in the helix 100.

Figure 60:
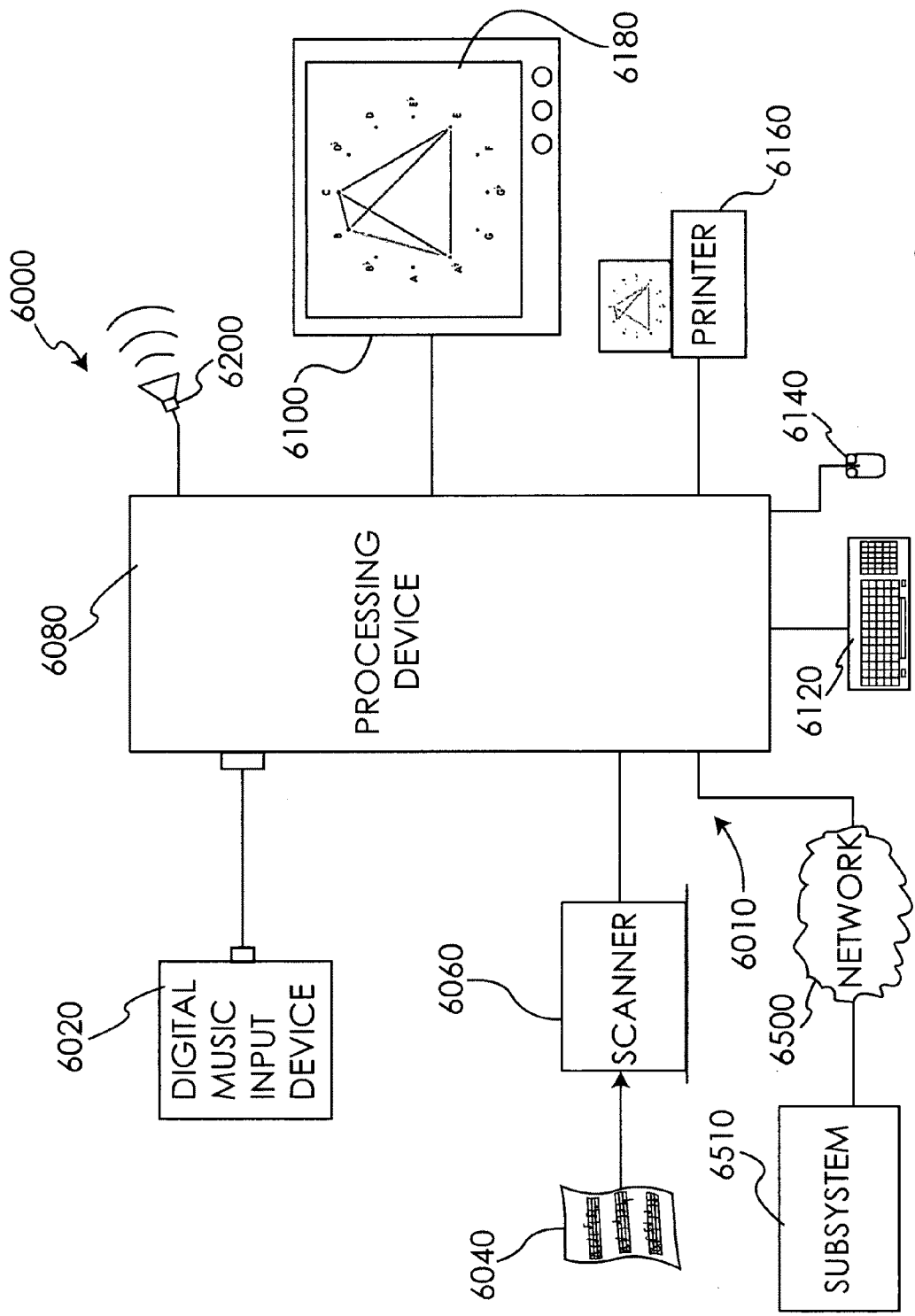
FIG. 60 is a schematic block diagram showing a music and sound visualization system according to one embodiment.

With reference now to FIG. 60, there is shown a processor-based system for providing visual representation of music and sounds, indicated generally at 6000. The system 6000 may include a first subsystem 6010 including a digital music input device 6020, a sheet music input device 6060 for inputting sheet music 6040, a processing device 6080, a display 6100, user input devices such as keyboard 6120 and mouse 6140, a printer device 6160 and one or more speakers 6200. These devices are coupled to allow the input of music or other sounds, and the input of musical notation or other sound notation, into the processing device so that the music or sounds may be produced by the speaker 6200 and the visual representations of the music or sounds may be displayed, printed or manipulated by users.

The digital music input device 6020 may include a MIDI (Musical Instrument Digital Interface) instrument coupled via a MIDI port with the processing device 6080, a digital music player such as an MP3 device or CD player, an analog music player, instrument or device with appropriate interface, transponder and analog-to-digital converter, or a digital music file, as well as other input devices and systems. As an example, a keyboard with a MIDI interface may be connected to the processing device 6080 and the diagrams discussed herein may be displayed on the display 6100 as the keyboard is played. Any musical instrument may be so interfaced.

The scanner 6060 may be configured to scan written sheet music 6040 in standard or other notation for input as a digital file into the processing device 6080. Appropriate software running on a processor in the processing device 6080 may convert this digital file into an appropriate digital music file representative of the music notated on the scanned sheet music 6040. Additionally, the user input devices 6120, 6140 may be utilized to interface with music composition or other software running on the processing device 6080 (or on another processor) to generate the appropriate digital music files.

The processing device 6080 may be implemented on a personal computer, a workstation computer, a laptop computer, a palmtop computer, a wireless terminal having computing capabilities (such as a cell phone having a Windows CE or Palm operating system), a game terminal, or the like. It will be apparent to those of ordinary skill in the art that other computer system architectures may also be employed.

In general, such a processing device 6080, when implemented using a computer, comprises a bus for communicating information, a processor coupled with the bus for processing information, a main memory coupled to the bus for storing information and instructions for the processor, a read-only memory coupled to the bus for storing static information and instructions for the processor. The monitor 6100 is coupled to the bus for displaying information for a computer user and the input devices 6120, 6140 are coupled to the bus for communicating information and command selections to the processor. A mass storage interface for communicating with a data storage device containing digital information may also be included in processing device 6080 as well as a network interface for communicating with a network.

The processor may be any of a wide variety of general purpose processors or microprocessors such as the PENTIUM microprocessor manufactured by Intel Corporation, a POWER PC manufactured by IBM Corporation, a SPARC processor manufactured by Sun Corporation, or the like. It will be apparent to those of ordinary skill in the art, however, that other varieties of processors may also be used in an particular computer system. Display device 6100 may be a liquid crystal device (LCD), a cathode ray tube (CRT), a plasma monitor, or other suitable display device. The mass storage interface may allow the processor access to the digital information the data storage devices via the bus. The mass storage interface may be a universal serial bus (USB) interface, an integrated drive electronics (IDE) interface, a serial advanced technology attachment (SATA) interface or the like, coupled to the bus for transferring information and instructions. The data storage device may be a conventional hard disk drive, a floppy disk drive, a flash device (such as a jump drive or SD card), an optical drive such as a compact disc (CD) drive, digital versatile disc (DVD) drive, HD DVD drive, BLUE-RAY DVD drive, or another magnetic, solid state, or optical data storage device, along with the associated medium (a floppy disk, a CD-ROM, a DVD, etc.)

In general, the processor retrieves processing instructions and data from the data storage device using the mass storage interface and downloads this information into random access memory for execution. The processor then executes an instruction stream from random access memory or read-only memory. Command selections and information that is input at input devices 6120, 6140 are used to direct the flow of instructions executed by the processor. Equivalent input devices 6140 may also be a pointing device such as a conventional trackball device. The results of this processing execution are then displayed on display device 6100.

The processing device 6080 is configured to generate an output for display on the monitor 6100 and/or for driving the printer 6160 to print a hardcopy. Preferably, the video output to monitor 6100 is also a graphical user interface, allowing the user to interact with the displayed information.

The system 6000 may also include one or more subsystems 6510 substantially similar to subsystem 6010 and communicating with subsystem 6010 via a network 6500, such as a LAN, WAN or the internet. Subsystems 6010 and 6510 may be configured to act as a web server, a client or both and will preferably be browser enabled. Thus with system 6000, remote teaching and music exchange may occur between users.

In addition to visualizing music played on an instrument through a MIDI interface, the system 6000 can implement software operating as a musical note extractor, thereby allowing the viewing of MP3 or other digitally formatted music. The note extractor examines the digital music file and determines the individual notes contained in the music. This application can be installed in any MP3 or digital music format playing device that also plays video, such as MP3-capable cell phones with video screens and MP3-based gaming systems like PSP. The structure of musical compositions from the classical masters to today's popular bands can then be visualized as the user listens to the music.

Figure 61:
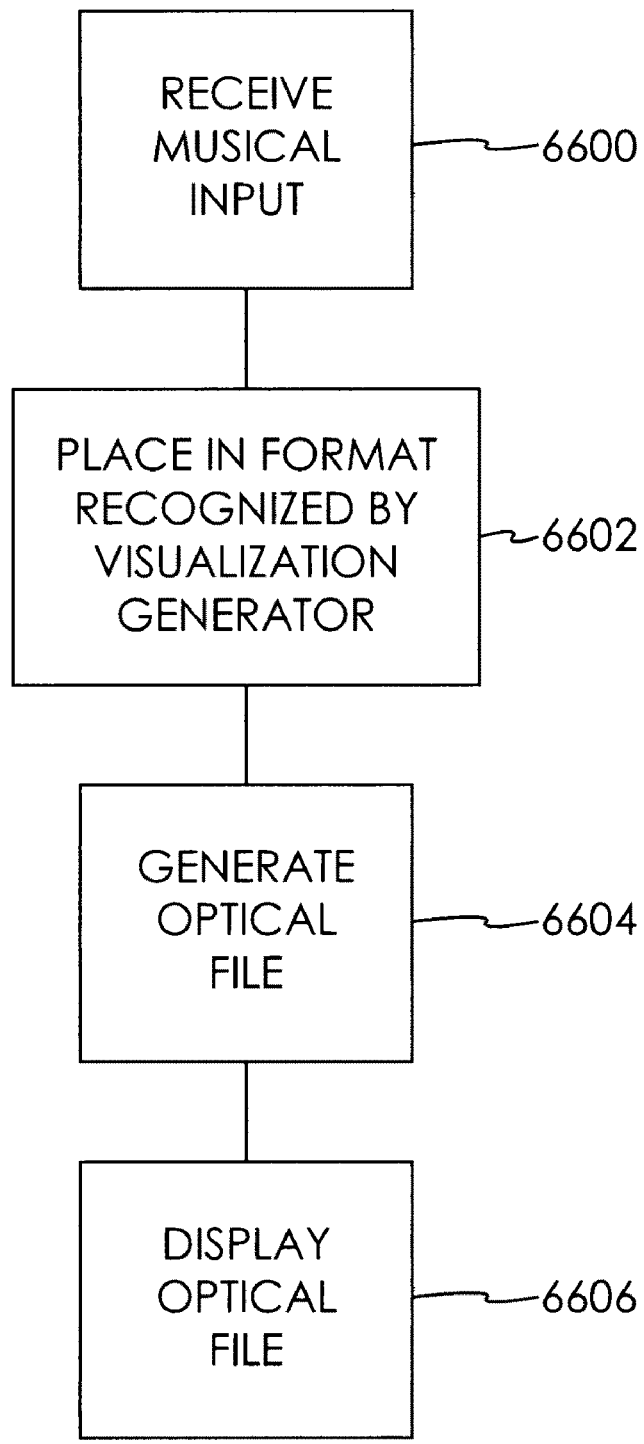
FIG. 61 is a schematic process flow diagram showing a method for visualizing music and sound according to one embodiment.

In one embodiment, the system 6000 may be utilized to execute the process schematically illustrated in FIG. 61. The system 6000 receives various forms of musical input at step 6600. The musical input may be in the form of live music performed utilizing a MIDI enabled instrument, and electronic instrument, a miked instrument (acoustic or electric), recorded music played via an MP3, CD, tape or record player (just to name a few non-limiting examples), a digital music file, a file containing scanned and digitized sheet music, music composed by a user interacting with composition software, etc. At step 6602, the received musical input is placed into a format that is recognized by the visualization generator. In one embodiment, this format is a MIDI file that contains digital representations of a sound's pitch and duration the instant it is created. At step 6604, an optical file is generated for displaying a visualization of the music according to the methods disclosed herein. At step 6606, the optical file is displayed so that a visualization of the music represented by the received musical input can be viewed by the user.

One important embodiment is obviously in the market of direct music education, where it now becomes possible to communicate an unprecedented foundation of the musical language. Any instrument may be learned through the techniques described herein. By directly visualizing how a given chord or chord sequence is supposed to appear, a student can easily correct a wrong note or finger position. Parts for additional or particular instruments can be composed and easily added to a musical piece, or removed if desired. A student can be "led along" a musical learning curve, by matching patterns on a computer screen while playing increasingly more difficult pieces.

Because the previously described diagrams reveal such a complete, but finite, number of musical shapes, it is possible to create a checklist of each of the various musical shapes for each particular musical instrument. This provides the ability to select various pieces of written music for each instrument that promote a gradual and increasingly complex method of teaching. Students can then check off the various musical shapes or patterns as they are played and learned. It is possible to create a repertoire of music for any given instrument that guarantees the playing (and learning) of every musical shape in the MASTER KEY™ diagrams. This results in the most complete foundation possible for an instrument, just by learning a prearranged collection of music.

The systems and method described herein lend themselves well to interactive computer learning software for teaching students how to play any instrument. One of the benefits of the current invention is that it offers the ability for an average person to learn to play, and even compose, music of an incredible quality and depth. Musical performance and composition via the internet (as facilitated by the system 6000) enables a community of musicians and educators from around the planet working and learning together.

The systems and methods described herein also lend themselves well to a variety of other applications, involving music or any other sound, since the circle, polygon or helix may be divided up into billions of potential subdivisions. For example, the present invention may be used to visualize rhythmic patterns based upon the frequency of the rhythmic sound; to improve the understanding of traditional musical notation through visual feedback; to promote early childhood development through the provision of visual stimulation in conjunction with aural stimulation; to provide visual displays for use with audio equalization and balancing systems; to assist in tuning a musical performance venue through visualization of the acoustic properties of the venue; to assist in mixing and editing musical recordings; to enable software programs to automatically compose musical compositions using the music structures identified herein; to assist with the calibration of a transmission system through the use of visual feedback; to tune musical instruments; and to compare musical works to automatically determine their similarities and differences (e.g. for copyright disputes).

Since the systems and methods of the present invention can provide visualization of any sound, they are not limited only to musical applications. For example, the present invention may be used in a voice recognition system having visualization components; for a recognition system for any type of sound (e.g. a glass break detector); for the archiving of environmental sounds using visualization components; to visualize sounds including a time domain component, where information about the envelope of the sound from attack to decay is presented to the viewer; to assist with speech therapy by providing visual feedback to the student; to assist in teaching deaf students to speak by providing visual feedback to the student; to provide voice training to singers by providing visual feedback related to the notes they are attempting to sing; to assist with instruction in obtaining or losing an accent or dialect by providing visual feedback to the student; to assist with foreign language instruction by providing visual feedback to the student; to provide foreign language translation using visualization techniques; to provide medical treatment using visualization of audio spectrum components (e.g. a heartbeat monitor, EKG analysis software, ultrasound analysis software, etc.); for use in noise reduction filters (e.g. for cell phones, hearing aids, etc.); and to provide identity verification through visualization feedback.

Those having ordinary skill in the art will appreciate that the systems and methods of the present invention can be applied to any activity where an analysis of sound is useful, regardless of whether that sound is in the form of music or even if it is within the range of the audible human spectrum.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed:

1. A method for visualizing music, comprising the steps of:
   (a) placing twelve labels in a pattern of a circle, said twelve labels corresponding to twelve respective notes in an octave, such that moving clockwise or counter-clockwise between adjacent ones of said labels represents a musical half-step;
(b) identifying an occurrence of a first one of the twelve notes;
(c) identifying an occurrence of a second one of the twelve notes;
(d) identifying a first label corresponding to the first note;
(e) identifying a second label corresponding to the second note;
(f) creating a first line connecting the first label and the second label, wherein:
(1) the first line is a first color if the first note and the second note are separated by a half step;
(2) the first line is a second color if the first note and the second note are separated by a whole step;
(3) the first line is a third color if the first note and the second note are separated by a minor third;
(4) the first line is a fourth color if the first note and the second note are separated by a major third;
(5) the first line is a fifth color if the first note and the second note are separated by a perfect fourth; and
(6) the first line is a sixth color if the first note and the second note are separated by a tri-tone.

2. The method of claim 1, wherein step (a) further comprises arranging each of the twelve labels to be substantially evenly spaced from each adjacent label.

3. The method of claim 2, wherein step (a) further comprises arranging each of the twelve labels to be spaced 30 degrees from each adjacent label.

4. The method of claim 1, further comprising the step of:
(g) if the first note and the second note comprise the same note, highlighting the label corresponding to the note.

5. The method of claim 1, wherein the first color is red, the second color is orange, the third color is yellow, the fourth color is green, the fifth color is blue and the sixth color is purple.

6. The method of claim 1, wherein:
the first color has a first frequency that is lower than a second frequency of the second color; and
the second frequency is lower than a third frequency of the third color; and
the third frequency is lower than a fourth frequency of the fourth color; and
the fourth frequency is lower than a fifth frequency of the fifth color; and
the fifth frequency is lower than a sixth frequency of the sixth color.

7. The method of claim 1, wherein said occurrence of the first note comprises playing the first note on an instrument.

8. The method of claim 1, wherein said occurrence of the first note comprises generating the first note from a recorded data file.

9. The method of claim 1, further comprising the step of:
(g) erasing the line a predetermined time after at least one of the first and second notes ceases to occur.

10. The method of claim 1, further comprising the steps of:
(g) identifying the occurrence of a third one of the twelve notes;
(h) identifying a third label corresponding to the third note;
(i) creating a second line connecting the second label and the third label; and
(j) creating a third line connecting the third label and the first label.

11. A method for visualizing music, comprising the steps of:
(a) placing a plurality of labels in a pattern of a helix, wherein:
(1) each turn of the helix has a respective group of twelve labels corresponding to twelve respective notes in a respective octave; and
(2) moving clockwise or counter-clockwise on the helix between any one of said labels represents a musical half-step;
(b) identifying an occurrence of a first note;
(c) identifying which of the twelve respective notes and which respective octave corresponds to the first note;
(d) identifying an occurrence of a second note;
(e) identifying which of the twelve respective notes and which respective octave corresponds to the second note;
(f) identifying a first label corresponding to the first note;
(g) identifying a second label corresponding to the second note;
(h) creating a first line connecting the first label and the second label, wherein:
(1) the first line is a first color if the first note and the second note are separated by a half step;
(2) the first line is a second color if the first note and the second note are separated by a whole step;
(3) the first line is a third color if the first note and the second note are separated by a minor third;
(4) the first line is a fourth color if the first note and the second note are separated by a major third;
(5) the first line is a fifth color if the first note and the second note are separated by a perfect fourth; and
(6) the first line is a sixth color if the first note and the second note are separated by a tri-tone.

12. The method of claim 11, wherein like notes from all octaves lie in a substantially straight line.

13. The method of claim 11, wherein step (a) further comprises arranging the labels to be substantially evenly spaced around the helix.

14. The method of claim 13, wherein step (a) further comprises arranging each of the labels to be spaced 30 degrees from each adjacent label.

15. The method of claim 11, wherein the first color is red, the second color is orange, the third color is yellow, the fourth color is green, the fifth color is blue and the sixth color is purple.

16. The method of claim 11, wherein:
the first color has a first frequency that is lower than a second frequency of the second color; and
the second frequency is lower than a third frequency of the third color; and
the third frequency is lower than a fourth frequency of the fourth color; and
the fourth frequency is lower than a fifth frequency of the fifth color; and
the fifth frequency is lower than a sixth frequency of the sixth color.

17. The method of claim 11, wherein said occurrence of the first note comprises playing the first note on an instrument.

18. The method of claim 11, wherein said occurrence of the first note comprises generating the first note from a recorded data file.

19. The method of claim 11, further comprising the step of:
(i) erasing the line a predetermined time after at least one of the first and second notes ceases to occur.

20. The method of claim 11, further comprising the steps of:
(i) identifying the occurrence of a third note;
(j) identifying which of the twelve respective notes and which respective octave corresponds to the third note;

(k) identifying a third label corresponding to the third note;
(l) creating a second line connecting the second label and the third label; and
(m) creating a third line connecting the third label and the first label.

21. A method for visualizing music, comprising the steps of:
   (a) placing a plurality of labels in a pattern of a helix, wherein:
      (1) each turn of the helix has a respective plurality of labels corresponding to a plurality of respective notes in a respective octave; and
      (2) moving clockwise or counter-clockwise on the helix between any one of said labels represents a first interval;
   (b) identifying an occurrence of a first note;
   (c) identifying which of the plurality of respective notes and which respective octave corresponds to the first note;
   (d) identifying an occurrence of a second note;
   (e) identifying which of the plurality of respective notes and which respective octave corresponds to the second note;
   (f) identifying a first label corresponding to the first note;
   (g) identifying a second label corresponding to the second note;
   (h) creating a first line connecting the first label and the second label, wherein:
      (1) the first line is a first color if the first note and the second note are separated by the first interval;
      (2) the first line is a second color if the first note and the second note are separated by a second interval;
      (3) the first line is a third color if the first note and the second note are separated by a third interval;
      (4) the first line is a fourth color if the first note and the second note are separated by a fourth interval;
      (5) the first line is a fifth color if the first note and the second note are separated by a fifth interval; and
      (6) the first line is a sixth color if the first note and the second note are separated by a sixth interval.

22. The method of claim 21, wherein like notes from all octaves lie in a substantially straight line.

23. The method of claim 21, wherein step (a) further comprises arranging the labels to be substantially evenly spaced around the helix.

24. The method of claim 23, wherein the plurality of labels comprises twelve labels and step (a) further comprises arranging each of the labels to be spaced 30 degrees from each adjacent label.

25. The method of claim 21, wherein the first color is red, the second color is orange, the third color is yellow, the fourth color is green, the fifth color is blue and the sixth color is purple.

26. The method of claim 21, wherein:
   the first color has a first frequency that is lower than a second frequency of the second color; and
   the second frequency is lower than a third frequency of the third color; and
   the third frequency is lower than a fourth frequency of the fourth color; and
   the fourth frequency is lower than a fifth frequency of the fifth color; and
   the fifth frequency is lower than a sixth frequency of the sixth color.

27. The method of claim 21, wherein the first interval is a half-step, the second interval is a whole step, the third interval is a minor third, the fourth interval is a major third, the fifth interval is a perfect fourth, and the sixth interval is a tri-tone.

28. The method of claim 21, wherein said occurrence of the first note comprises playing the first note on an instrument.

29. The method of claim 21 wherein said occurrence of the first note comprises generating the first note from a recorded data file.

30. The method of claim 21, further comprising the step of:
   (i) erasing the line a predetermined time after at least one of the first and second notes ceases to occur.

31. The method of claim 21, further comprising the steps of:
   (i) identifying the occurrence of a third note;
   (j) identifying which of the plurality of respective notes and which respective octave corresponds to the third note;
   (k) identifying a third label corresponding to the third note;
   (l) creating a second line connecting the second label and the third label; and
   (m) creating a third line connecting the third label and the first label.

32. A method for visualizing sound, comprising the steps of:
   (a) placing a plurality of labels in a pattern of a helix, wherein:
      (1) each turn of the helix has a respective plurality of labels corresponding to a plurality of respective sounds in a respective plurality of frequency ranges; and
      (2) moving clockwise or counter-clockwise on the helix between any one of said labels represents a first frequency interval;
   (b) identifying an occurrence of a first sound;
   (c) identifying which of the plurality of respective sounds and which respective plurality of frequency ranges corresponds to the first sound;
   (d) identifying an occurrence of a second sound;
   (e) identifying which of the plurality of respective sounds and which respective plurality of frequency ranges corresponds to the second sound;
   (f) identifying a first label corresponding to the first sound;
   (g) identifying a second label corresponding to the second sound;
   (h) creating a first line connecting the first label and the second label, wherein:
      (1) the first line is a first color if the first sound and the second sound are separated by the first frequency interval;
      (2) the first line is a second color if the first sound and the second sound are separated by a second frequency interval;
      (3) the first line is a third color if the first sound and the second sound are separated by a third frequency interval;
      (4) the first line is a fourth color if the first sound and the second sound are separated by a fourth frequency interval;
      (5) the first line is a fifth color if the first sound and the second sound are separated by a fifth frequency interval; and
      (6) the first line is a sixth color if the first sound and the second sound are separated by a sixth frequency interval.

33. The method of claim 32, wherein the plurality of respective sounds comprise a plurality of musical notes and the plurality of frequency ranges comprise a plurality of octaves.

34. The method of claim 33, wherein like notes from all octaves lie in a substantially straight line.

35. The method of claim 32, wherein step (a) further comprises arranging the labels to be substantially evenly spaced around the helix.

36. The method of claim 33, wherein the plurality of labels comprises twelve labels and step (a) further comprises arranging each of the labels to be spaced 30 degrees from each adjacent label.

37. The method of claim 32, wherein the first color is red, the second color is orange, the third color is yellow, the fourth color is green, the fifth color is blue and the sixth color is purple.

38. The method of claim 32, wherein the first interval is a half-step, the second interval is a whole step, the third interval is a minor third, the fourth interval is a major third, the fifth interval is a perfect fourth, and the sixth interval is a tri-tone.

39. The method of claim 32, wherein said occurrence of the first sound comprises playing the first sound on an instrument.

40. The method of claim 32, wherein said occurrence of the first sound comprises generating the first sound from a recorded data file.

41. The method of claim 32, further comprising the step of:
 (i) erasing the line a predetermined time after at least one of the first and second sounds ceases to occur.

42. The method of claim 32, further comprising the steps of:
 (i) identifying the occurrence of a third sound;
 (j) identifying which of the plurality of respective sounds and which respective frequency range corresponds to the third sound;
 (k) identifying a third label corresponding to the third sound;
 (l) creating a second line connecting the second label and the third label; and
 (m) creating a third line connecting the third label and the first label.

* * * * *